United States Patent [19]

Traister

[11] 4,204,670
[45] May 27, 1980

[54] SORTER FOR A REPRODUCTION MACHINE

[75] Inventor: Robert L. Traister, Penfield, N.Y.

[73] Assignee: Xerox Corporation, Stamford, Conn.

[21] Appl. No.: 829,022

[22] Filed: Aug. 30, 1977

[51] Int. Cl.² ............................................. B65H 39/10
[52] U.S. Cl. ....................................... 271/287; 271/259
[58] Field of Search ................. 271/258, 259, 265, 64, 271/173; 209/566

[56] References Cited

U.S. PATENT DOCUMENTS

| | | | |
|---|---|---|---|
| 3,626,956 | 12/1971 | Sauder | 271/259 X |
| 3,878,540 | 4/1975 | Kawai | 271/259 X |
| 4,003,569 | 1/1977 | Andrews | 271/259 |

Primary Examiner—Richard A. Schacher
Attorney, Agent, or Firm—John E. Beck; Frederick E. McMullen; Ronald F. Chapuran

[57] ABSTRACT

A system for controlling a sorter for receiving copy sheets from a reproduction machine processor. The sorter includes a plurality of bins for holding collated books of copy sheets. The control system provides a fault detection feature which insures that the copy sheets are placed in the correct bin. As each sheet enters the sorter, a timer is caused to begin running. When a sheet enters a bin, the timer is read and a fault is declared if the sheet did not reach the bin within a predetermined time range. Other features include bin module selection capabilities and automatic starting of the processor after a module has been unloaded.

7 Claims, 49 Drawing Figures

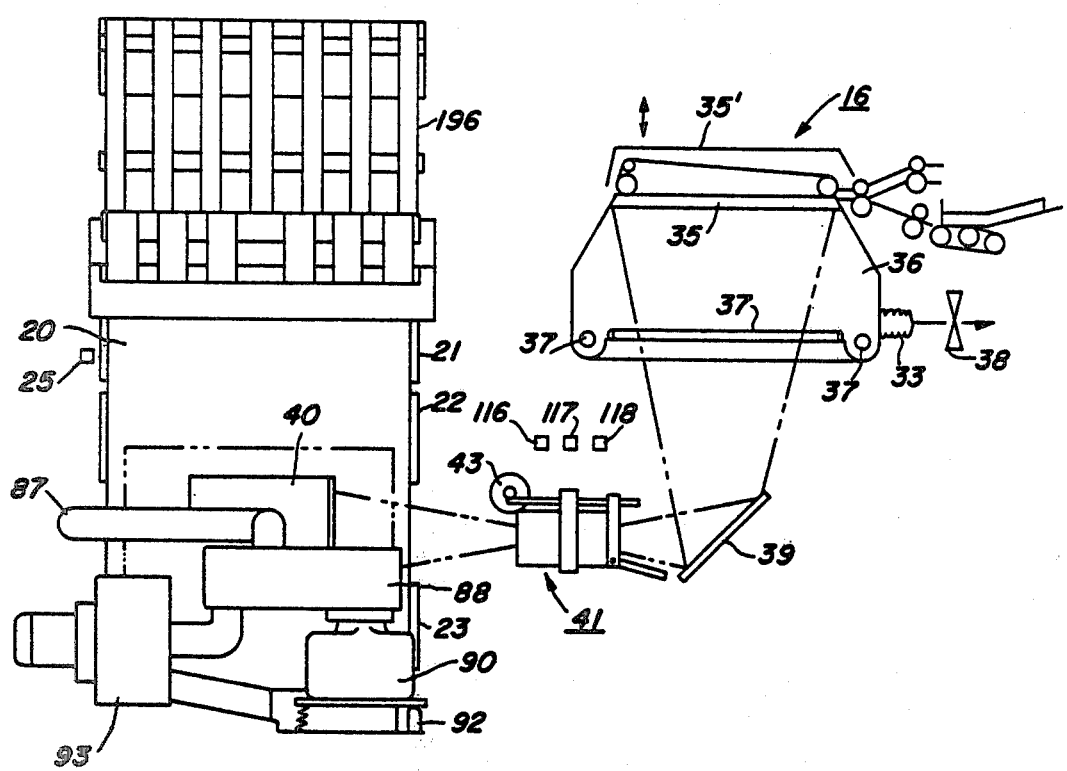

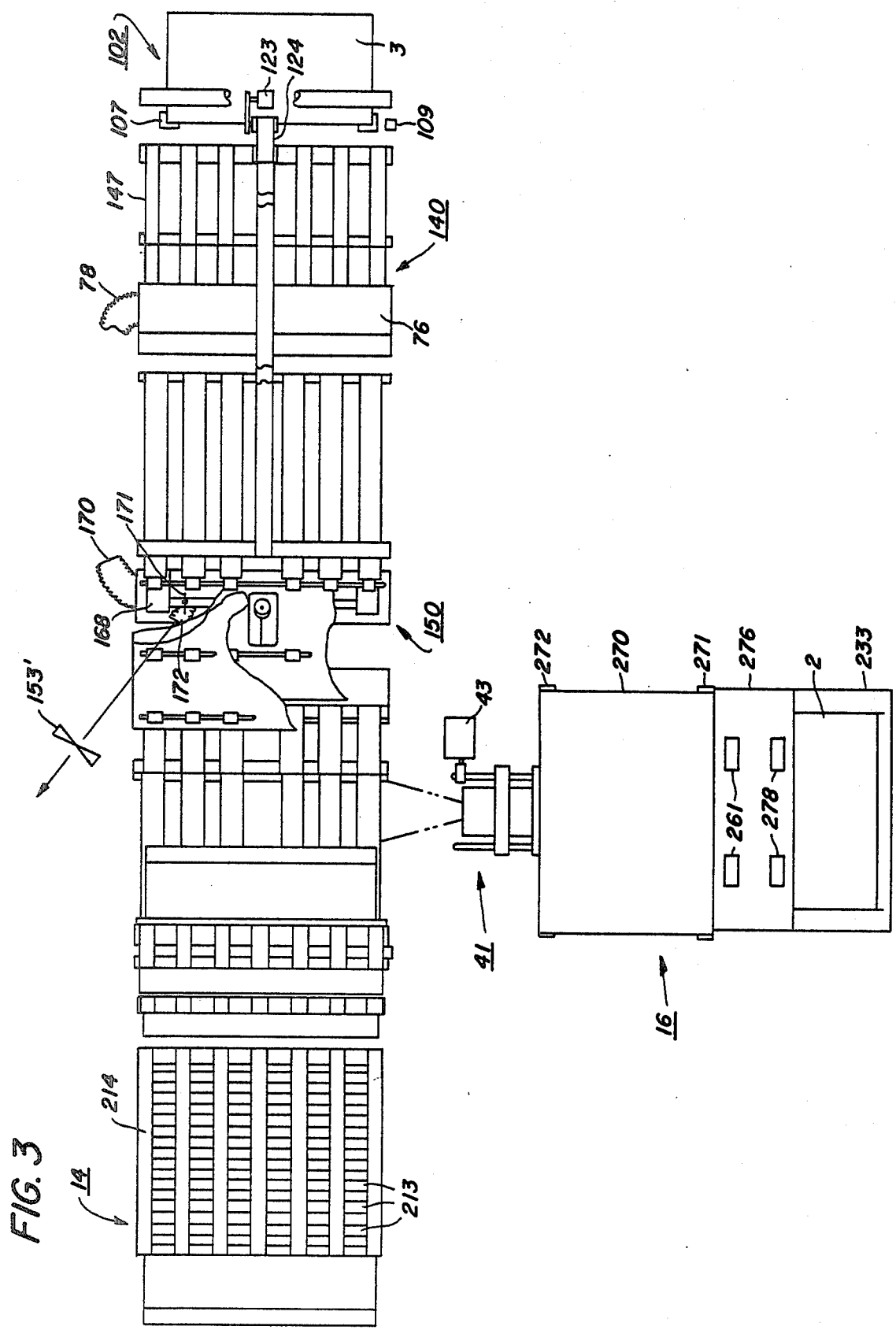

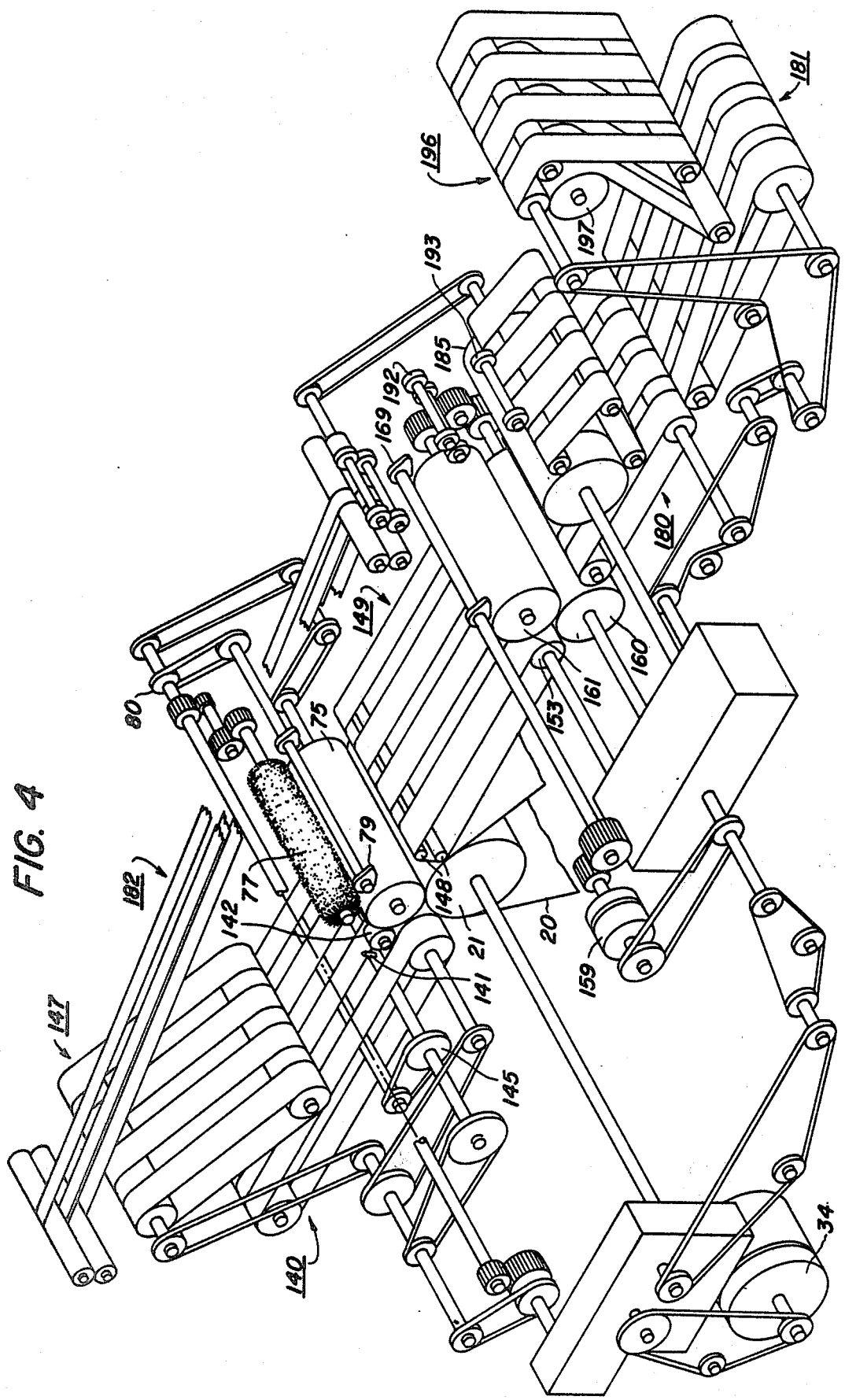

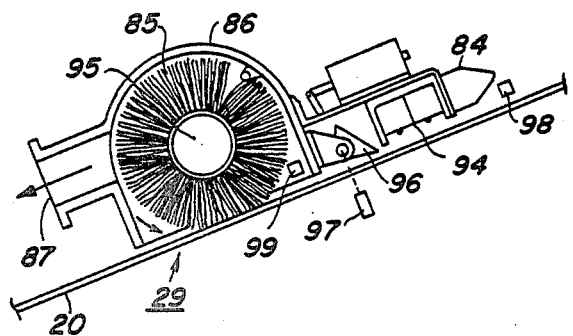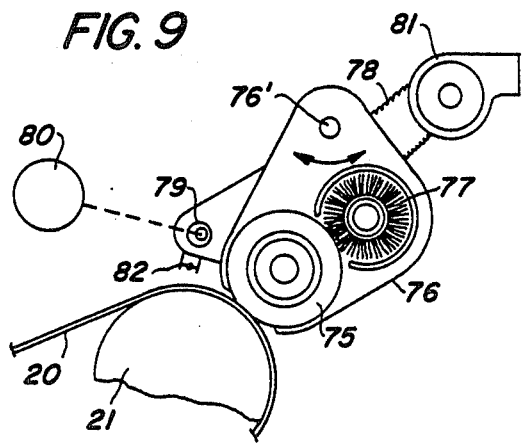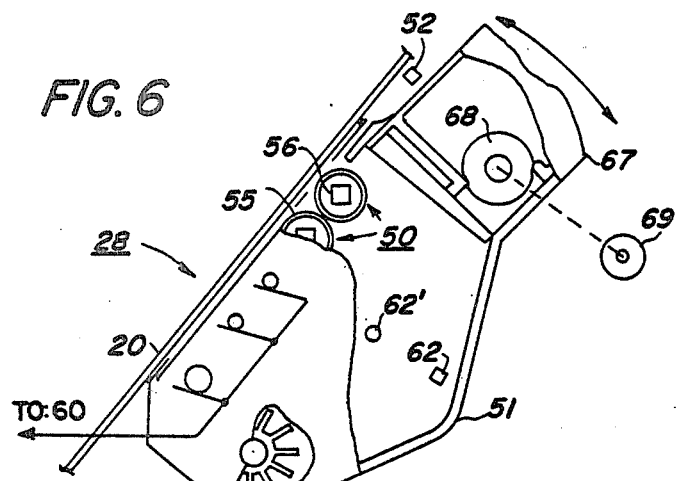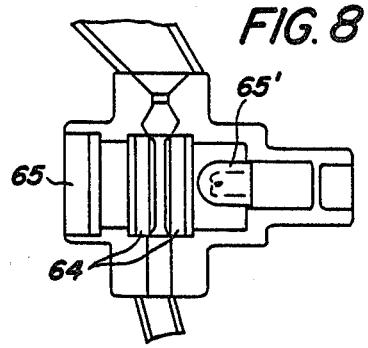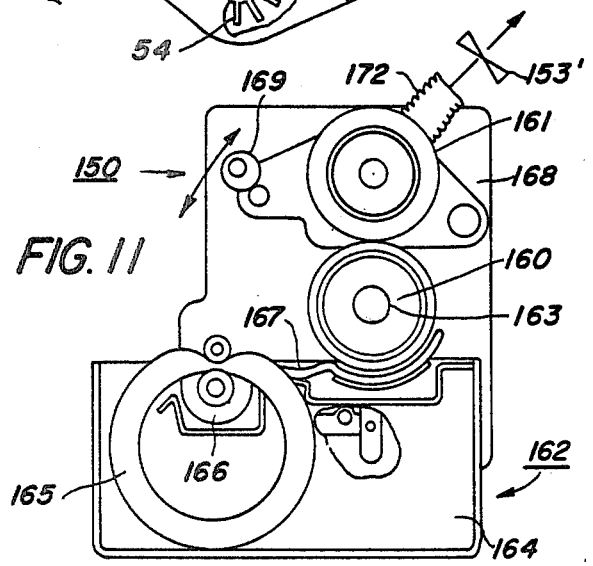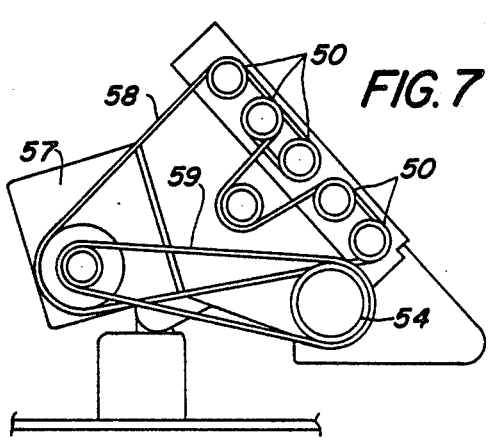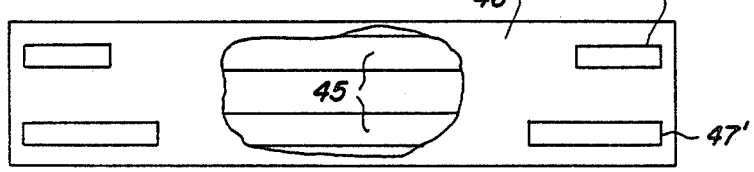

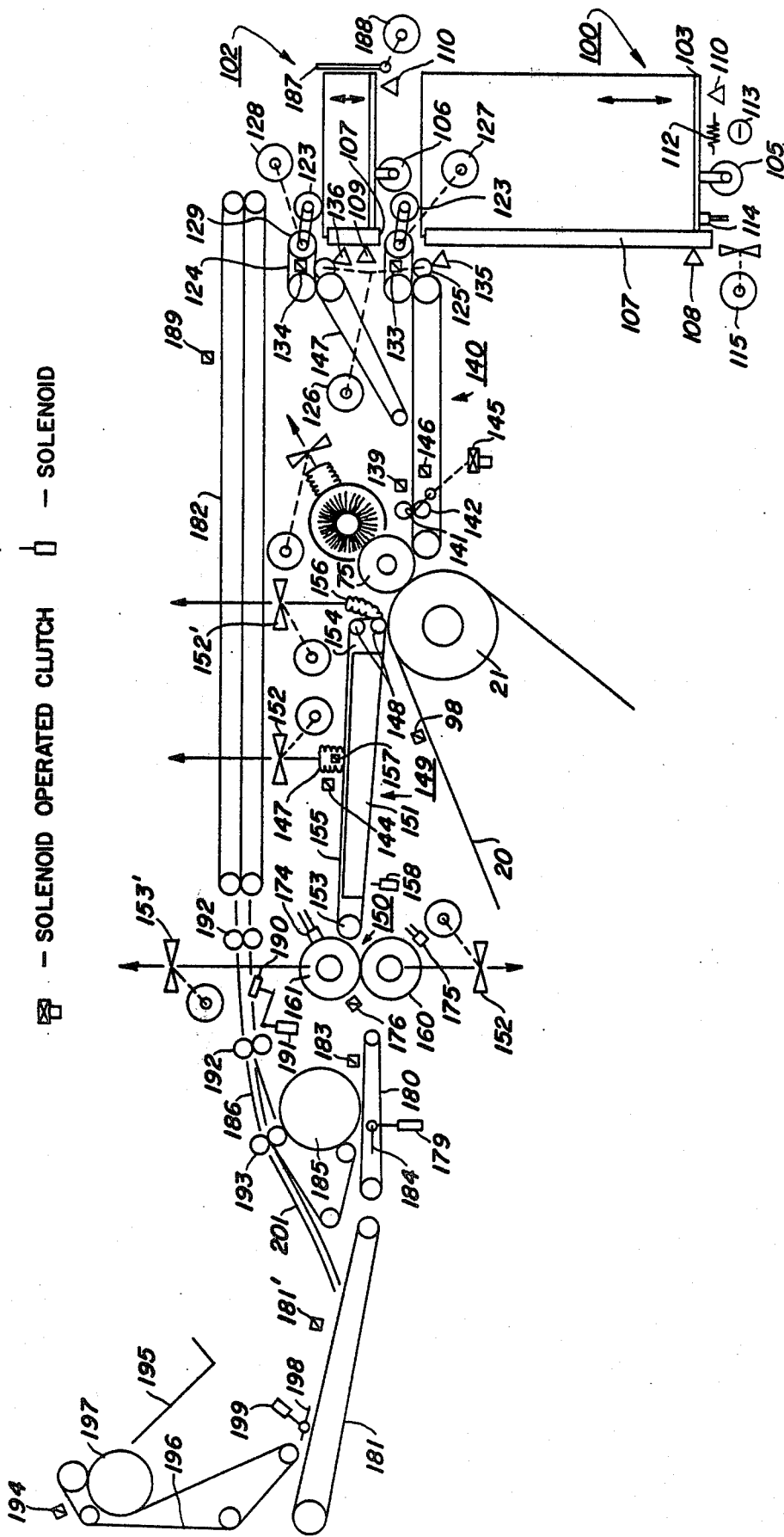

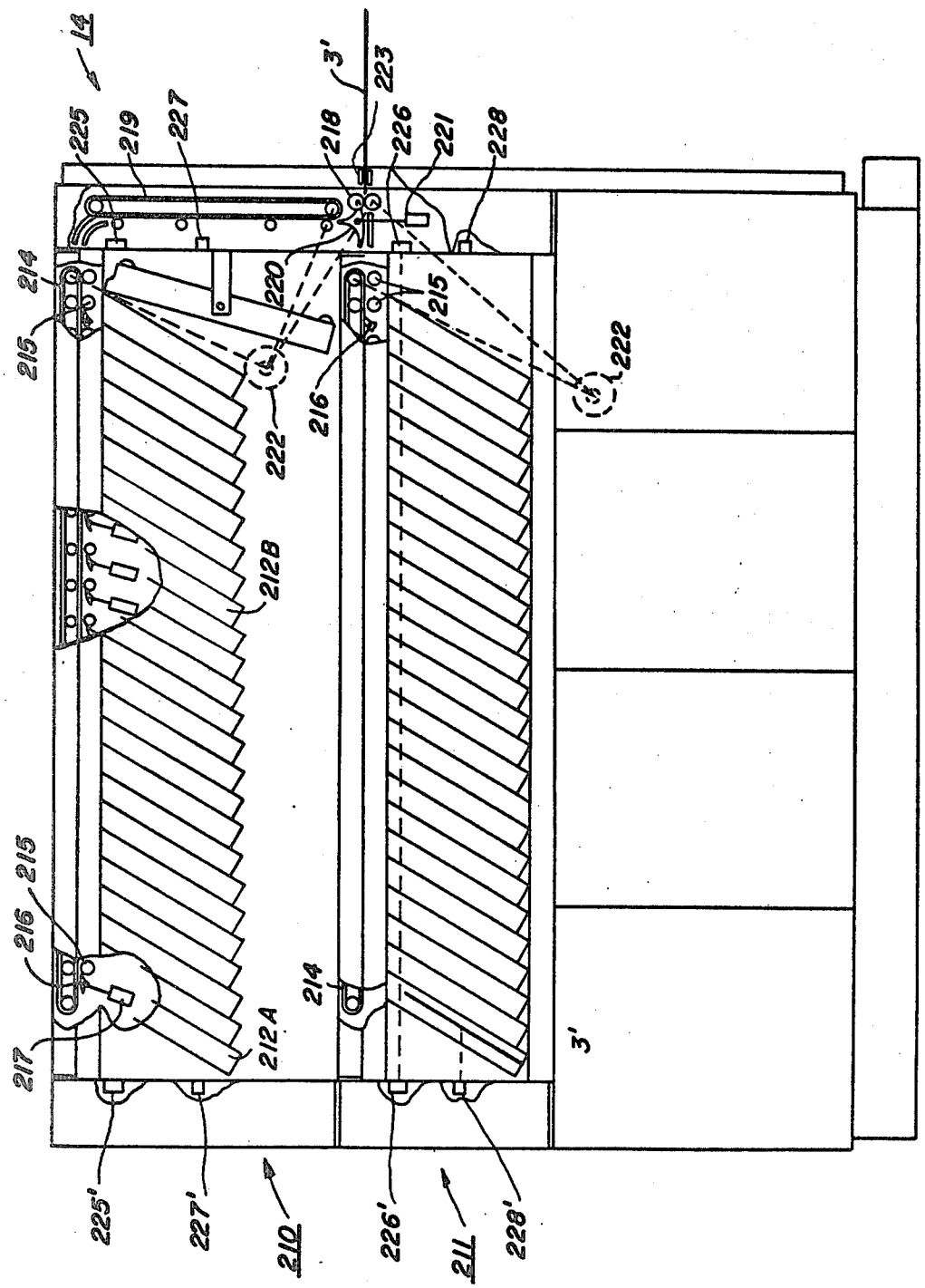

MEMORY READY

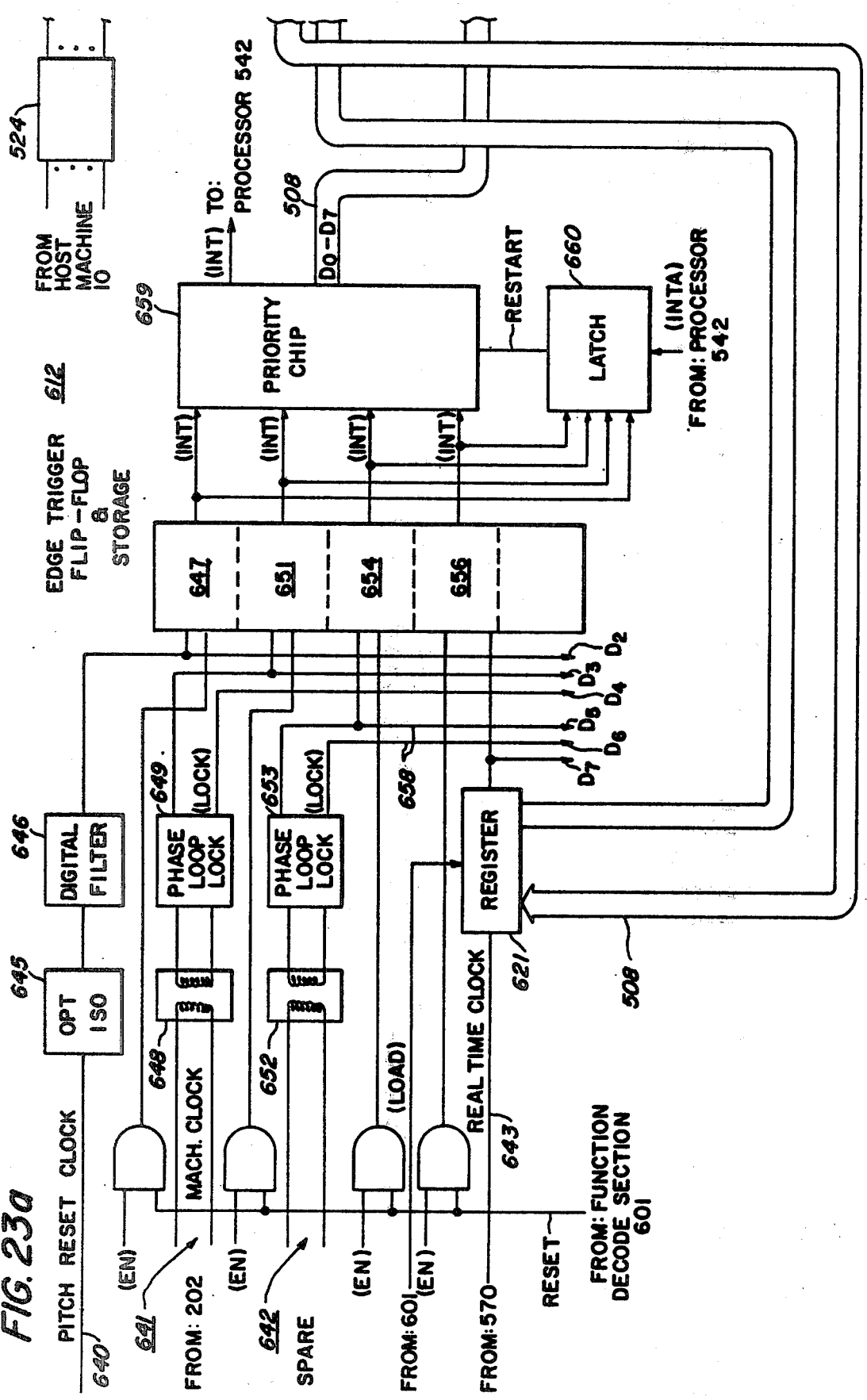

FIG.29

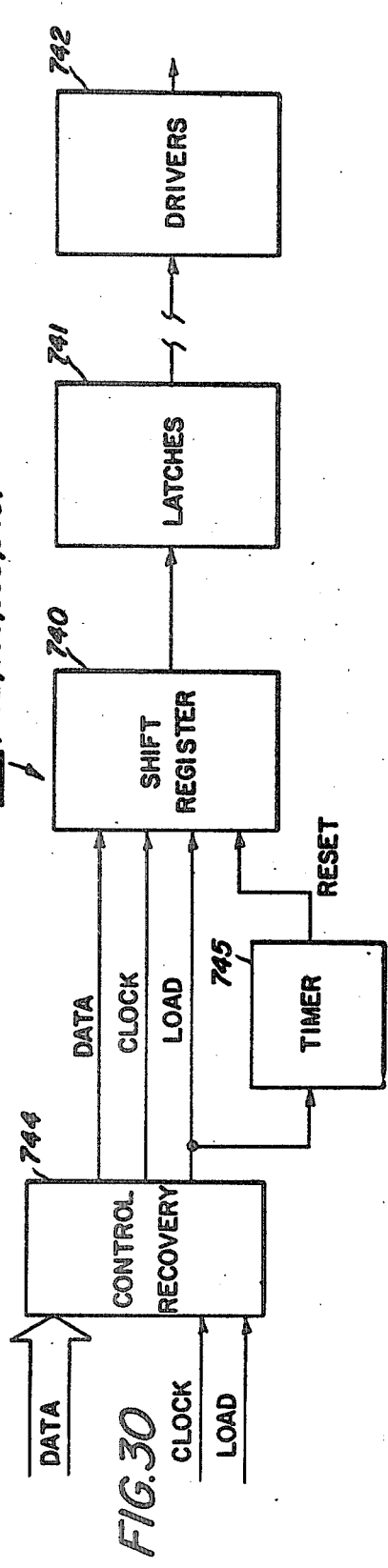

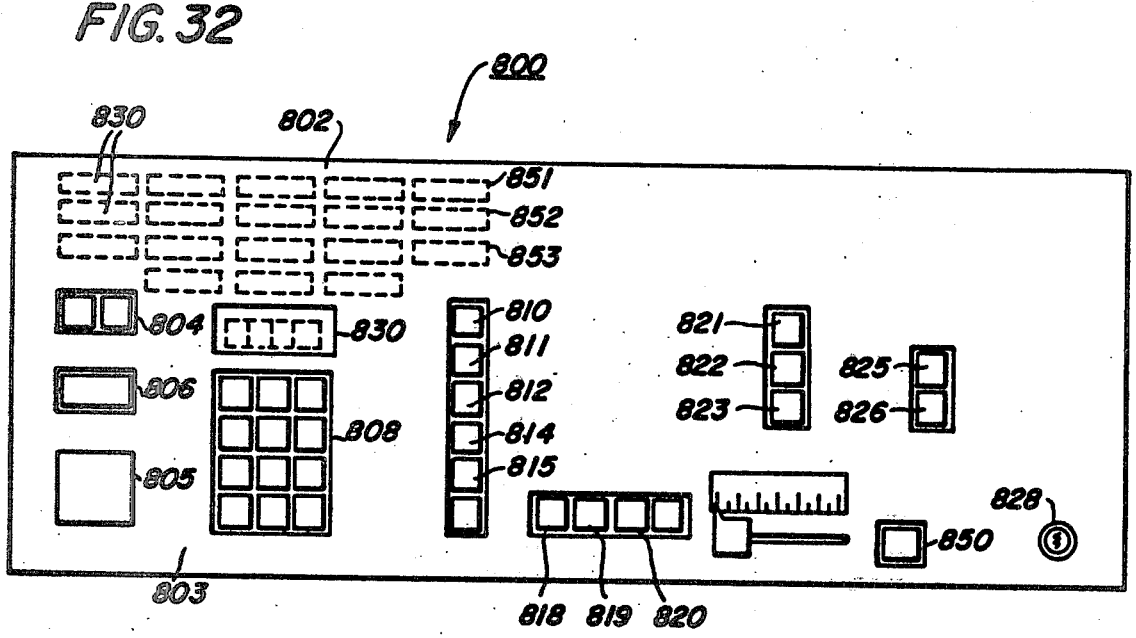

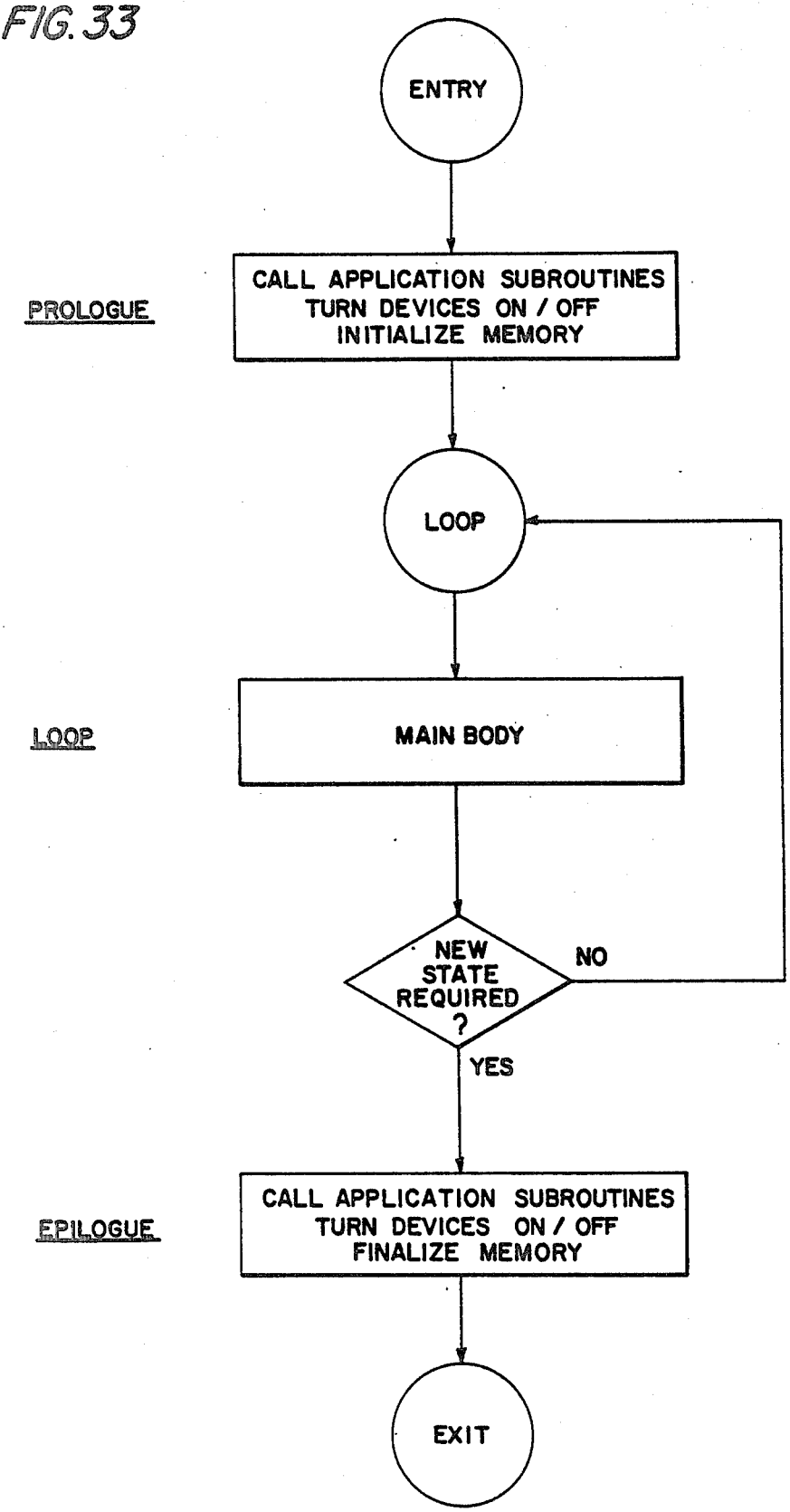

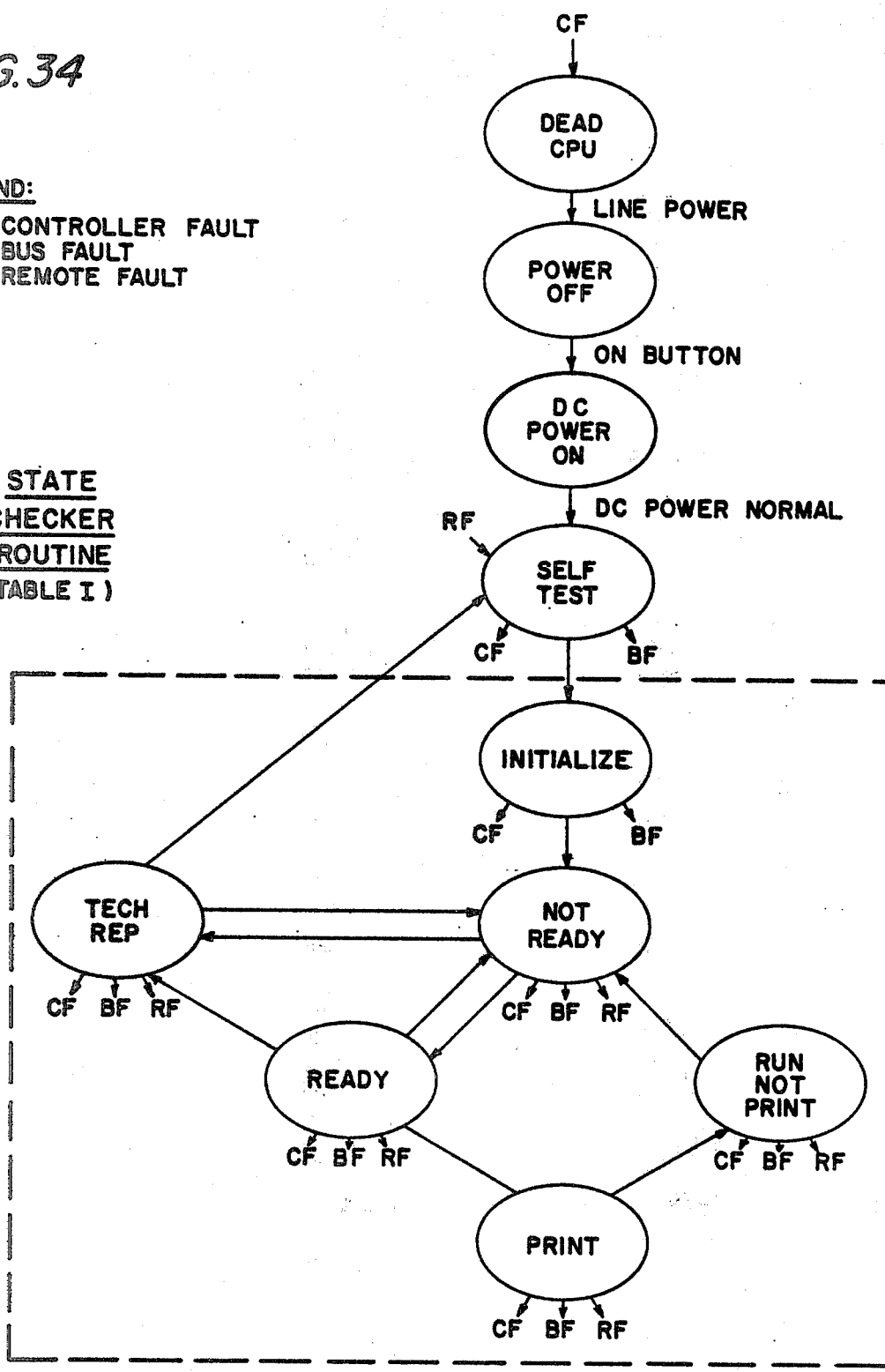

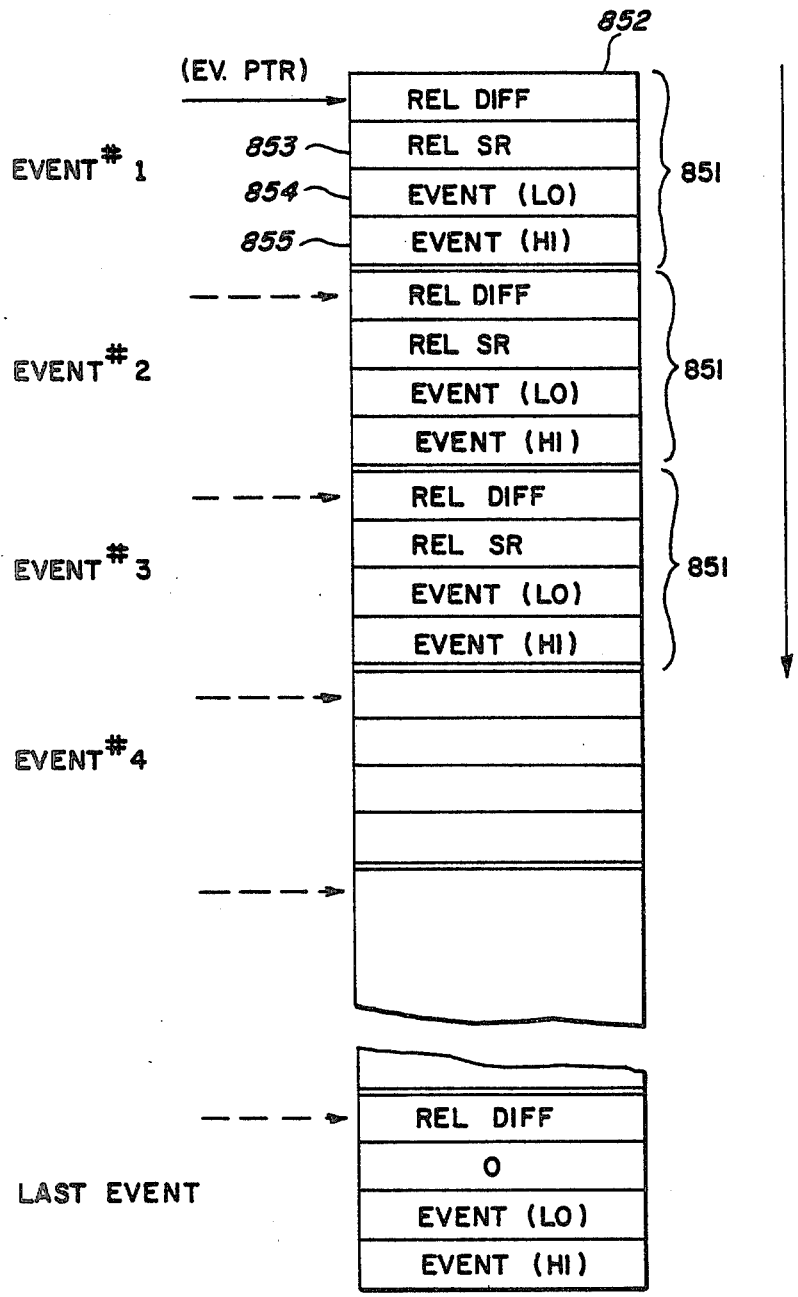

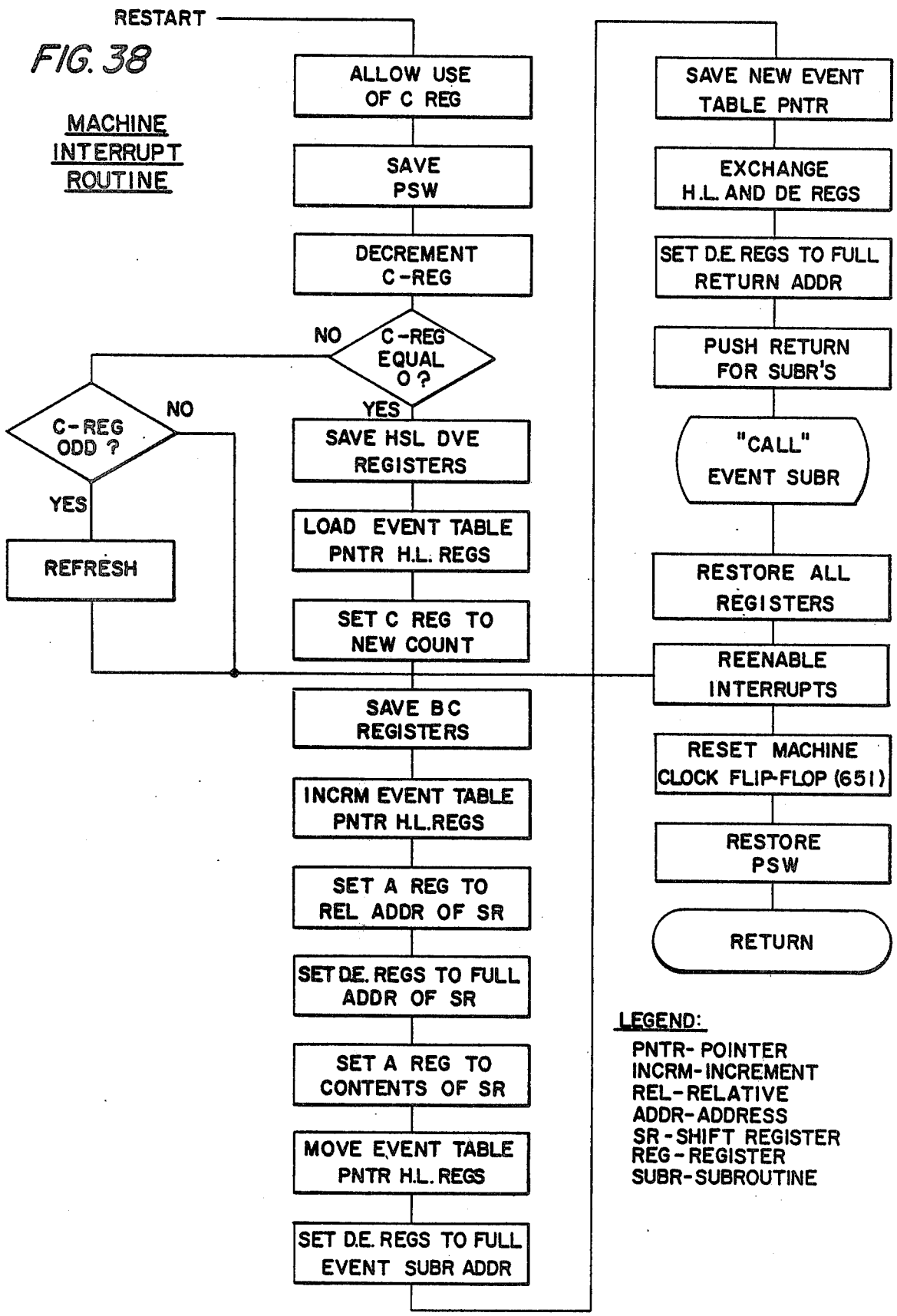

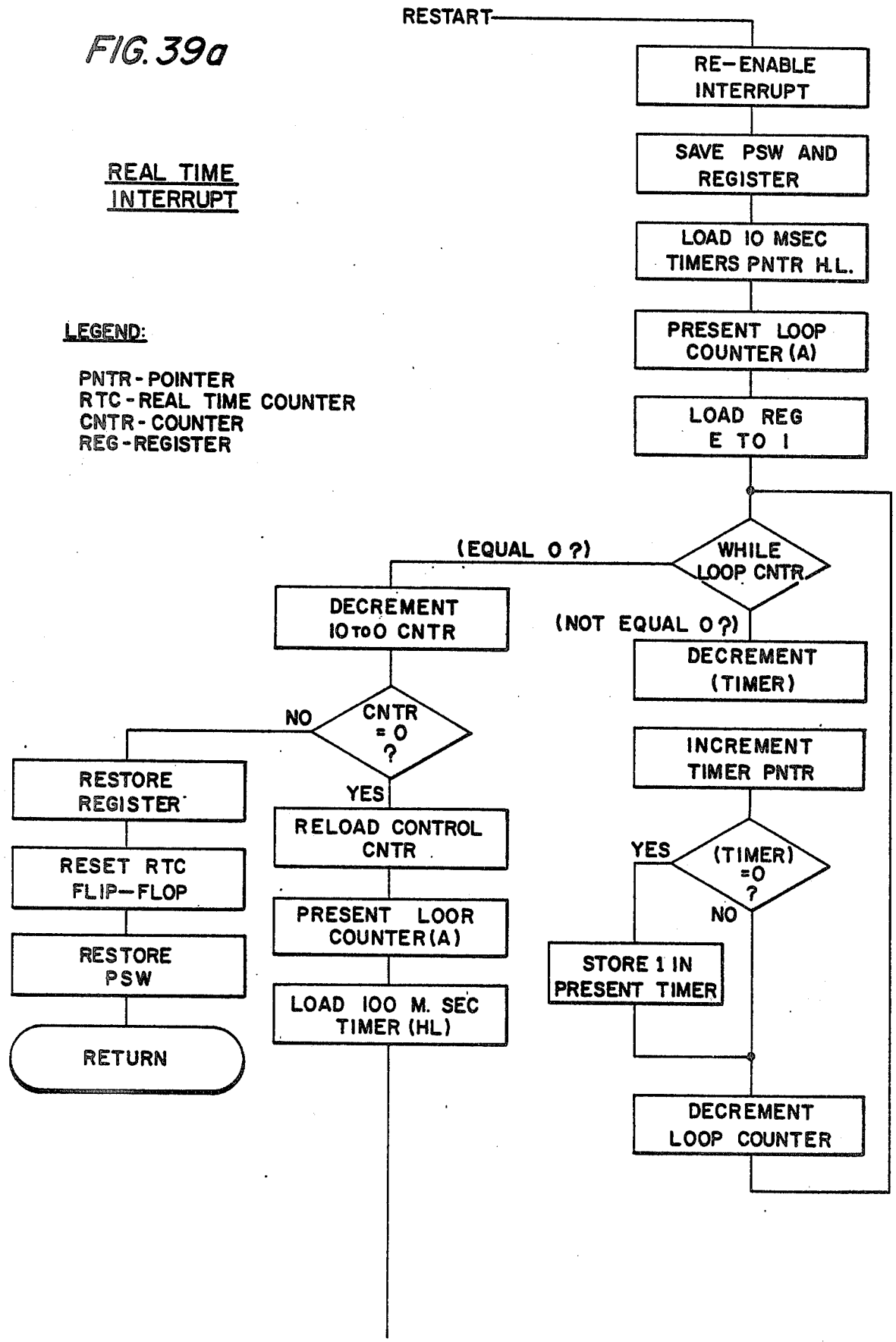

SORTER FOR A REPRODUCTION MACHINE

BACKGROUND OF THE INVENTION

This invention relates to reproduction machines, and more particularly, to an improved control system for a sorter utilized by such machines.

Generally, reproduction machine sorters are utilized to collate copy sheets from the machine processor, thus forming books from them. Known sorters generally include a plurality of bins or storage trays and means for placing the copy sheets into each of the bins, in seriatum. Unfortunately, as with all automatic paper handling devices, there is a potential for paper jams to occur. A variety of systems have been utilized to detect such malfunctions. For example, in the Xerox 9200 copier/duplicator, each copy is detected when it leaves the processor and a check is made to make sure that it has reached at least one of the bins in the sorter. However, there has heretofore been no method of determining if it has been placed in the correct bin to maintain proper collation.

OBJECTS AND SUMMARY OF THE INVENTION

Therefore, it is the primary object of this invention to provide a control system for a sorter which insures that copies from a reproduction machine processor are placed in the correct bin to maintain proper collation.

It is a further object to accomplish the above objective, while only using a minimal number of paper sensing devices.

These and other objects of this invention is accomplished by starting a timer when each copy sheet is detected leaving the machine processor (i.e. entering the sorter device) and by reading the time on the timer when the sheet has entered a bin. If the time is not within a predetermined range, preferably a prior calculated proper time of arrival to the correct bin, then a fault is indicated signalling that the copy has not been placed in the necessary bin needed for proper collation.

Other objects of this invention include a control system for auomatically starting the machine processor when the sorter bins have been unloaded. Still another object is to provide the operator with the ability to select into which bins the copies are desired to be placed providing that such a selection does not unduly disturb normal machine operation.

BRIEF DESCRIPTION OF THE DRAWINGS

Even further objects and advantages will be apparent from the ensuing description and drawings in which:

FIG. 2 is a vertical sectional view of the apparatus shown in FIG. 1 along the image plane;

FIG. 3 is a top plane view of the apparatus shown in FIG. 1;

FIG. 4 is an isometric view showing the drive train for the apparatus shown in FIG. 1;

FIG. 5 is an enlarged view showing details of the photoreceptor edge fade-out mechanism for the apparatus shown in FIG. 1;

FIG. 6 is an enlarged view showing details of the developing mechanism for the apparatus shown in FIG. 1;

FIG. 7 is an enlarged view showing details of the developing mechanism drive;

FIG. 8 is an enlarged view showing details of the developability control for the apparatus shown in FIG. 1;

FIG. 9 is an enlarged view showing details of the transfer roll support mechanism for the apparatus shown in FIG. 1;

FIG. 10 is an enlarged view showing details of the photoreceptor cleaning mechanism for the apparatus shown in FIG. 1;

FIG. 11 is an enlarged view showing details of the fuser for the apparatus shown in FIG. 1;

FIG. 12 is a schematic view showing the paper path and sensors of the apparatus shown in FIG. 1;

FIG. 13 is an enlarged view showing details of the copy sorter for the apparatus shown in FIG. 1;

FIG. 18$b$ is a timing chart of Direct Memory access (DMA) Read and Write cycles;

FIG. 19$b$ is a chart illustrating the output wave form of the clock shown in FIG. 19$a$;

FIG. 29 is a block diagram of the input matrix module;

FIG. 30 is a block diagram of a typical remote;

FIG. 31 is a block diagram of the sorter remote;

FIG. 32 is a view of the control console for inputting copy run instructions to the apparatus shown in FIG. 1;

FIG. 33 is a flow chart illustrating a typical machine state;

FIG. 34 is a flow chart of the machine state routine;

FIG. 35 is a view showing the event table layout;

FIG. 38 is a flow chart of the machine clock interrupt routine;

DETAILED DESCRIPTION OF THE PREFERRED EMBODIMENT OF THE INVENTION

Figure 1:
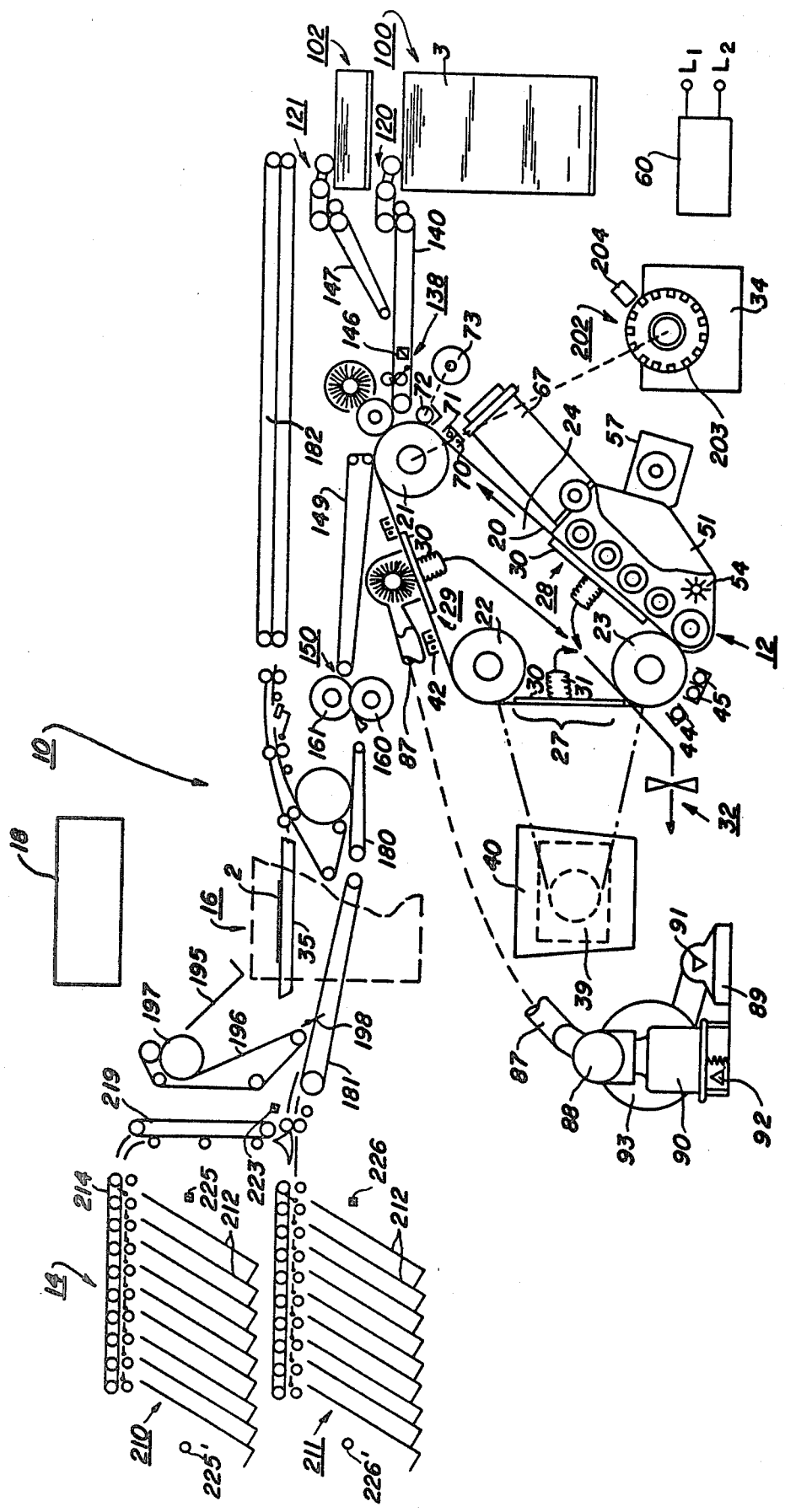
FIG. 1 is a schematic representation of an exemplary reproduction apparatus incorporating the control system of the present invention.

Referring particularly to FIGS. 1-3 of the drawings, there is shown, in schematic outline, an electrostatic reproduction machine, identified by numeral 10, incorporating the control arrangement of the present invention. To facilitate description, the reproduction machine 10 is divided into a main electrostatic xerographic processor 12, sorter 14, document handler 16, and controller 18. Other processor, sorter and/or document handler types and constructions, and different combinations thereof may instead be envisioned.

PROCESSOR

Processor 12 utilizes a photoreceptor in the form of an endless photoconductive belt 20 supported in generally triangular configuration by rolls 21, 22, 23. Belt supporting rolls 21, 22, 23 are in turn rotatably journaled on subframe 24.

In the exemplarly processor illustrated, belt 20 comprises a photoconductive layer of selenium, which is the light receiving surface and imaging medium, on a conductive substrate. Other photoreceptor types and forms, such as comprising organic materials or of multilayers or a drum may instead be envisioned. Still other forms may comprise scroll type arrangements wherein webs of photoconductive material may be played in and out of the interior of supporting cylinders.

Suitable biasing means (not shown) are provided on subframe 24 to tension the photoreceptor belt 20 and insure movement of belt 20 along a prescribed operating path. Belt tracking switch 25 (shown in FIG. 2) monitors movement of belt 20 from side to side. Belt 20 is supported so as to provide a trio of substantially flat belt runs opposite exposure, developing, and cleaning stations 27, 28, 29 respectfully. To enhance belt flatness at these stations, vacuum platens 30 are provided under belt 20 at each belt run. Conduits 31 communicate vacuum platens 30 with a vacuum pump 32. Photoconductive belt 20 moves in the direction indicated by the solid line arrow, drive thereto being effected through roll 21, which in turn is driven by main drive motor 34, as seen in FIG. 4.

Processor 12 includes a generally rectangular, horizontal transparent platen 35 on which each original 2 to be copied is disposed. A two or four sided illumination assembly, consisting of internal reflectors 36 and flash lamps 37 (shown in FIG. 2) disposed below and along at least two sides of platen 35, is provided for illuminating the original 2 on platen 35. To control temperatures within the illumination space, the assembly is coupled through conduit 33 with a vacuum pump 38 which is adapted to withdraw overly heated air from the space. To retain the original 2 in place on platen 35 and prevent escape of extraneous light from the illumination assembly, a platen cover 35' may be provided.

The light image generated by the illustration system is projected via mirrors 39, 40 and a variable magnification lens assembly 41 onto the photoreceptive belt 20 at the exposure station 27. Reversible motor 43 is provided to move the main lens and add on lens elements that comprise the lens assembly 41 to different predetermined positions and combinations to provide the preselected image sizes corresponding to push button selectors 818, 819, 820 on operator module 800. (See FIG. 32) Sensors 116, 117, 118 signal the present disposition of lens assembly 41. Exposure of the previously charged belt 20 selectively discharges the photoconductive belt to produce on belt 20 an electrostatic latent image of the original 2. To prepare belt 20 for imaging, belt 20 is uniformly charged to a preselected level by charge corotron 42 upstream of the exposure station 27.

To prevent development of charged but unwanted image areas, erase lamps 44, 45 are provided. Lamp 44, which is referred to herein as the pitch fadeout lamp, is supported in transverse relationship to belt 20, lamp 44 extending across substantially the entire width of belt 20 to erase (i.e. discharge) areas of belt 20 before the first image, between successive images, and after the last image. Lamps 45, which are referred to herein as edge fadeout lamps, serve to erase areas bordering each side of the images. Referring particularly to FIG. 5, edge fadeout lamps 45, which extend transversely to belt 20, are disposed within a housing 46 having a pair of transversely extending openings 47, 47' of differing length adjacent each edge of belt 20. By selectively actuating one or the other of the lamps 45, the width of the area bordering the sides of the image that is erased can be controlled.

Referring to FIGS. 1, 6 and 7, magnetic brush rolls 50 are provided in a developer housing 51 at delevoping station 28. Housing 51 is pivotally supported adjacent the lower end thereof with interlock switch 52 to sense disposition of housing 51 in operative position adjacent belt 20. The bottom of housing 51 forms a sump within which a supply of developing material is contained. A rotatable auger 54 in the sump area serves to mix the developing material and bring the material into operative relationship with the lowermost of the magnetic brush rolls 50.

As will be understood by those skilled in the art, the electrostatically attractable developing material commonly used in magnetic brush developing apparatus of the type shown comprises a pigmented resinous powder, referred to as toner, and larger granular beads referred to as carrier. To provide the necessary magnetic properties, the carrier is comprised of a magnetizable material such as steel. By virtue of the magnetic fields established by developing rolls 50 and the interrelationship therebetween, a blanket of developing material is formed along the surfaces of developing rolls 50 adjacent the belt 20 and extending from one roll to another. Toner is attracted to the electrostatic latent image from the carrier bristles to produce a visible powder image on the surface of belt 20.

Magnetic brush rolls 50 each comprise a rotatable exterior sleeve 55 with relatively stationary magnet 56 inside. Sleeves 55 are rotated in unison and at substantially the same speed as belt 20 by a developer drive motor 57 through a belt and pulley arrangement 58. A second belt and pulley arrangement 59 drives auger 54.

To regulate development of the latent electrostatic images on belt 20, magnetic brush sleeves 55 are electrically biased. A suitable power supply 60 is provided for this purpose with the amount of bias being regulated by controller 18.

Developing material is returned to the upper portion of developer housing 51 for reuse and is accomplished by utilizing a photocell 62 which monitors the level of developing material in housing 51 and a photocell lamp 62' spaced opposite to the photocell 62 in cooperative relationship therewith. The disclosed machine is also provided with automatic developability control which maintains an optimum proportion of toner-to-carrier material by sensing toner concentration and replenishing toner, as needed. As shown in FIG. 8, the automatic developability control comprises a pair of transparent plates 64 mounted in spaced, parallel arrangement in developer housing 51 such that a portion of the returning developing material passes therebetween. A suitable circuit, not shown, alternately places a charge on the plates 64 to attract toner thereto. Photocell 65 on one side of the plate pair senses the developer material as the material passes therebetween. Lamp 65' on the opposite side of plate pair 64 provides reference illumination. In this arrangement, the returning developing material is alternately attracted and repelled to and from plate 64. The accumulation of toner, i.e. density determines the amount of light transmitted from lamp 65' to photocell 65. Photocell 65 monitors the density of the returning developing material with the signal output therefrom being used by controller 18 to control the amount of fresh or make-up toner to be added to developer housing 51 from toner supply container 67.

To discharge toner from container 67, rotatable dispensing roll 68 is provided in the inlet to developer housing 51. Motor 69 drives roll 68. When fresh toner is required, as determined by the signal from photocell 65, controller 18 actuates motor 69 to turn roll 68 for a timed interval. The rotating roll 68, which is comprised of a relatively porous sponge-like material, carries toner particles thereon into developer housing 51 where it is discharged. Pre-transfer corotron 70 and lamp 71 are provided downstream of magnetic brush rolls 50 to regulate developed image charges before transfer.

A magnetic pick-off roll 72 is rotatably supported opposite belt 20 downstream of pre-transfer lamp 71, roll 72 serving to scavenge leftover carrier from belt 20 preparatory to transfer of the developed image to the copy sheet 3. Motor 73 turns roll 72 in the same direction and at substantially the same speed as belt 20 to prevent scoring or scratching of belt 20. One type of magnetic pick-off roll is shown in U.S. Pat. No. 3,834,804, issued Oct. 10, 1974 to Bhagat et al.

Referring to FIGS. 4, 9 and 12, to transfer developed images from belt 20 to the copy sheets 3, a transfer roll 75 is provided. Transfer roll 75, which forms part of the copy sheet feed path, is rotatably supported within a transfer roll housing opposite belt support roll 21. Housing 76 is pivotally mounted at 76' to permit the transfer roll assembly to be moved into and out of operative relationship with belt 20. A transfer roll cleaning brush 77 is rotatably journalled in transfer roll housing 76 with the brush periphery in contact with transfer roll 90. Transfer roll 75 is driven through contact with belt 20 while cleaning brush 77 is coupled to main drive motor 34. To remove toner, housing 76 is connected through conduit 78 with vacuum pump 81. To facilitate and control transfer of the developed images from belt 20 to the copy sheets 3, a suitable electrical bias is applied to transfer roll 75.

To permit transfer roll 75 to be moved into and out of operative relationship with belt 20, cam 79 is provided in driving contact with transfer roll housing 76. Cam 79 is driven from motor 34 through an electromagnetically operated one revolution clutch 80. Spring means (not shown) serves to maintain housing 76 in driving engagement with cam 79.

To facilitate separation of the copy sheets 3 from belt 20 following transfer of developed images, a detack corotron 82 is provided. Corotron 82 generates a charge designed to neutralize or reduce the charges tending to retain the copy sheet on belt 20. Corotron 82 is supported on transfer roll housing 76 opposite belt 20 and downstream of transfer roll 75.

Referring to FIGS. 1, 2 and 10, to prepare belt 20 for cleaning, residual charges on belt 20 are removed by discharge lamp 84 and preclean corotron 94. A cleaning brush 85, rotatably supported within an evacuated semicircular shaped brush housing 86 at cleaning station 29, serves to remove residual developer from belt 20. Motor 95 drives brush 85, brush 85 turning in a direction opposite that of belt 20.

Vacuum conduit 87 couples brush housing 86 through a centrifugal type separator 88 with the suction side of vacuum pump 93. A final filter 89 on the outlet of motor 93 traps particles that pass through separator 88. The heavier toner particles separated by separator 88 drop into and are collected in one or more collecting bottles 90. Pressure sensor 91 monitors the condition of final filter 89 while a sensor 92 monitors the level of toner particles in collecting bottles 90.

To obviate the danger of copy sheets remaining on belt 20 and becoming entangled with the belt cleaning mechanism, a deflector 96 is provided upstream of cleaning brush 85. Deflector 96, which is pivotally supported on the brush housing 86, is operated by solenoid 97. In the normal or off position, deflector 96 is spaced from belt 20 (the solid line position shown in the drawings). Energization of solenoid 97 pivots deflector 96 downwardly to bring the deflector leading edge into close proximity to belt 20.

Sensors 98, 99 are provided on each side of deflector 96 for sensing the presence of copy material on belt 20. A signal output from upstream sensor 98 triggers solenoid 97 to pivot deflector 96 into position to intercept the copy sheet on belt 20. The signal from sensor 98 also initiates a system shutdown cycle (mis-strip jam) wherein the various operating components are, within a prescribed interval, brought to a stop. The interval permits any copy sheet present in fuser 150 to be removed, sheet trap solenoid 158 (FIG. 12) having been actuated to prevent the next copy sheet from entering fuser 150 and becoming trapped therein. The signal from sensor 99, indicating failure of deflector 96 to intercept or remove the copy sheet from belt 20, triggers an immediate or hard stop (sheet on selenium jam) of the processor. In such instances the power to drive motor 34 is interrupted to bring belt 20 and the other components driven therefrom to an immediate stop.

Referring particularly to FIGS. 1 and 12, copy sheets 3 comprise precut paper sheets supplied from either main or auxiliary paper trays 100, 102. Each paper tray has a platform or base 103 for supporting in stack-like fashion a quantity of sheets. The tray platforms 103 are supported for vertical up and down movement by motors 105, 106. Side guide pairs 107, in each tray 100, 102 delimit the tray side boundaries, the guide pairs being adjustable toward and away from one another in accommodation of different size sheets. Sensors 108, 109 respond to the position of each side guide pair 107, the output of sensors 108, 109 serving to regulate operation of edge fadeout lamps 45 and fuser cooling valve 171 (FIG. 3). Lower limit switches 110 on each tray prevent overtravel of the tray platform in a downward direction.

A heater 112 is provided below the platform 103 of main tray 100 to warm the tray area and enhance feeding of sheets therefrom. Humidstat 113 and thermostat 114 control operation of heater 112 in response to the temperature/humidity conditions of main tray 100. Fan 115 is provided to circulate air within tray 100.

To advance the sheets 3 from either main or auxiliary tray 100, 102, main and auxiliary sheet feeders 120, 121 are provided. Feeders 120, 121 each include a nudger roll 123 to engage and advance the topmost sheet in the paper tray forward into the nip formed by a feed belt 124 and retard roll 125. Retard rolls 125, which are driven at an extremely low speed by motor 126, cooperate with the feed belts 124 to restrict feeding of sheets from trays 100, 102 to one sheet at a time.

Feed belts 124 are driven by main and auxiliary sheet feed motors 127, 128 respectively. Nudger rolls 123 are supported for pivotal movement about the axis of feed belt drive shaft 129 with drive to the nudger rolls taken from drive shaft 129. Stack height sensors 133, 134 are provided for the main and auxiliary trays, the pivoting nudger rolls 123 serving to operate sensors 133, 134 in response to the sheet stack height. Main and auxiliary tray misfeed sensors 135, 136 are provided at the tray outlets.

Main transport 140 extends from main paper tray 100 to a point slightly upstream of the nip formed by photoconductive belt 20 and transfer roll 75. Transport 140 is driven from main motor 34. To register sheets 3 with the images developed on belt 20, sheet register fingers 141 are provided, fingers 141 being arranged to move into and out of the path of the sheets on transport 140 once each revolution (see also FIG. 4). Registration fingers 141 are driven from main motor 34 through electromagnetic clutch 145. A timing or reset switch 146 is set once on each revolution of sheet register fingers 141. Sensor 139 monitors transport 140 for jams. Further amplification of sheet register system may be found in U.S. Pat. No. 3,781,004, issued Dec. 25, 1973 to Buddendeck et al.

Pinch roll pair 142 is interspaced between transport belts that comprise main transport 140 on the downstream side of register fingers 141. Pinch roll pair 142 are driven from main motor 34.

Auxiliary transport 147 extends from auxiliary tray 102 to main transport 140 at a point upstream of sheet register fingers 141. Transport 147 is driven from motor 34.

To maintain the sheets in driving contact with the belts of transports 140, 147, suitable guides or retainers (not shown) may be provided along the belt runs.

The image bearing sheets leaving the nip formed by photoconductive belt 20 and transfer roll 75 are picked off by belts 155 of the leading edge of vacuum transport 149. Belt 155, which are perforated for the admission of vacuum therethrough, ride on forward roller pair 148 and rear roll 153. A pair of internal vacuum plenums 151, 154 are provided, the leading plenum 154 cooperating with belts 155 to pick up the sheets leaving the belt/transfer roll nip. Transport 149 conveys the image bearing sheets to fuser 150. Vacuum conduits 147, 156 communicate plenums 151, 154 with vacuum pumps 152, 152'. A pressure sensor 157 monitors operation of vacuum pump 152. Sensor 144 monitors transport 149 for jams.

To prevent the sheet on transport 148 from being carried into fuser 150 in the event of a jam or malfunction, a trap solenoid 158 is provided below transport 149. Energization of solenoid 158 raises the armature thereof into contact with the lower face of plenum 154 to intercept and stop the sheet moving therepast.

Referring particularly to FIGS. 4, 10 and 12, fuser 150 comprises a lower heated fusing roll 160 and upper pressure roll 161. Rolls 160, 161 are supported for rotation in fuser housing 162. The core of fusing roll 160 is hollow for receipt of heating rod 163 therewithin.

Housing 162 includes a sump 164 for holding a quantity of liquid release agent, herein termed oil. Dispensing belt 165, moves through sump 164 to pick up the oil, belt 165 being driven by motor 166. A blanket-like wick 167 carries the oil from belt 165 to the surface of fusing roll 160.

Pressure roll 161 is supported within an upper pivotal section 168 of housing 162. This enables pressure roll 161 to be moved into and out of operative contact fusing roll 160. Cam shaft 169 in the lower portion of fuser housing 162 serves to move housing section 168 and pressure roll 161 into operative relationship with fusing roll 160 against a suitable bias (not shown). Cam shaft 169 is coupled to main motor 34 through an electromagnetically operated one revolution clutch 159.

Fuser section 168 is evacuated, conduit 170 coupling housing section 168 with vacuum pump 152. The ends of housing section 168 are separated into vacuum compartments opposite the ends of pressure roll 161 thereunder to cool the roll ends where smaller size copy sheets 3 are being processed. Vacuum valve 171 (FIG. 3) in conduit 172 regulates communication of the vacuum compartments with vacuum pump 153' in response to the size sheets as sensed by side guide sensors 108, 109 in paper trays 100, 102.

Fuser roll 160 is driven from main motor 34. Pressure roll 161 is drivingly coupled to fuser roll 160 for rotation therewith.

Thermostat 174 (FIG. 12) in fuser housing 162 controls operation of heating rod 163 in response to temperature. Sensor 175 protects against fuser overtemperature. To protect against trapping of a sheet in fuser 150 in the event of a jam, sensor 176 is provided.

Following fuser 150, the sheet is carried by post fuser transport 180 to either discharge transport 181 or, where duplex or two sided copies are desired, to return transport 182. Sheet sensor 183 monitors passage of the sheets from fuser 150. Transports 180, 181 are driven from main motor 34. Sensor 181' monitors transport 181 for jams. Suitable retaining means may be provided to retain the sheets on transports 180, 181.

A deflector 184, when extended, directs sheets on transport 180 onto conveyor roll 185 and into chute 186 leading to return transport 182. Solenoid 179, when energized raises 184 into the sheet path. Return transport 182 carries the sheets back to auxiliary tray 102. Sensor 189 monitors transport 182 for jams. The forward stop 187 of tray 102 is supported for oscillating movement. Motor 188 drives stop 187 back and forth tap sheets returned to auxiliary tray 102 into alignment for refeeding.

To invert duplex copy sheets following fusing of the second or duplex image, a displaceable sheet stop 190 is provided adjacent the discharge end of chute 186. Stop 190 is pivotally supported for swinging movement into and out of chute 186. Solenoid 191 is provided to move stop 190 selectively into or out of chute 186. Pinch roll pairs, 192, 193 serve to draw the sheet trapped in chute 186 by stop 190 and carry the sheet forward onto discharge transport 181. Further description of the inverter mechanism may be found in U.S. Pat. No. 3,856,295, issued Dec. 24, 1974, to John H. Looney.

Output tray 195 receives unsorted copies. Transport 196 a portion of which is wrapped around a turn around roll 197, serves to carry the finished copies to tray 195. Sensor 194 monitors transport 196 for jams. To route copies into output tray 195, a deflector 198 is provided. Deflector solenoid 199, when energized, turns deflector 198 to intercept sheets on conveyor 181 and route the sheets onto conveyor 196.

When output tray 195 is not used, the sheets are carried by conveyor 181 to sorter 14.

SORTER

Referring particularly to FIG. 13, sorter 14 comprises upper and lower modules 210, 211. Each module 210, 211 consists of series of spaced downwardly inclined bins 212 for receipt of finished copies 3'. Conveyors 214 along the top of each module, cooperate with idler rolls 215 adjacent the inlet to each bin to transport the copies into juxtaposition with the bins. Individual deflectors 216 at each bin cooperate, when depressed, with the adjoining idler roll 215 to turn the copies into the bin associated therewith. An operating solenoid 217 is provided for each deflector 216.

A driven roll pair 218 is provided at the inlet to sorter 14. A generally vertical conveyor 219 serves to bring copies 3' to the upper module 210. Module selection deflector 220 routes the copies selectively to either the upper or lower module 210, 211 respectively. Solenoid 221 operates deflector 220.

Motor 222 is provided for each module to drive the conveyors 214 and 219 of upper module 210 and conveyor 214 of lower module 211. Roll pair 218 is similarly drivingly coupled to motor 222.

Photoelectric type sensor 223 detects the entry of copies 3' into the inlet of sorter 14. Similarly, to detect copies 3' entering the bins 212, sensors 225, 226 are provided at one end of each module 210, 211 respectively. Sensor lamps 225', 226' are disposed adjacent the other end of the bin array. To detect the presence of copies in the bins 212, a second set of photoelectric type sensors 227, 228 is provided for each module, on a level with a tray cutout (not shown). Reference lamps 227', 228' are disposed opposite sensors 227, 228.

DOCUMENT HANDLER

Figure 14:
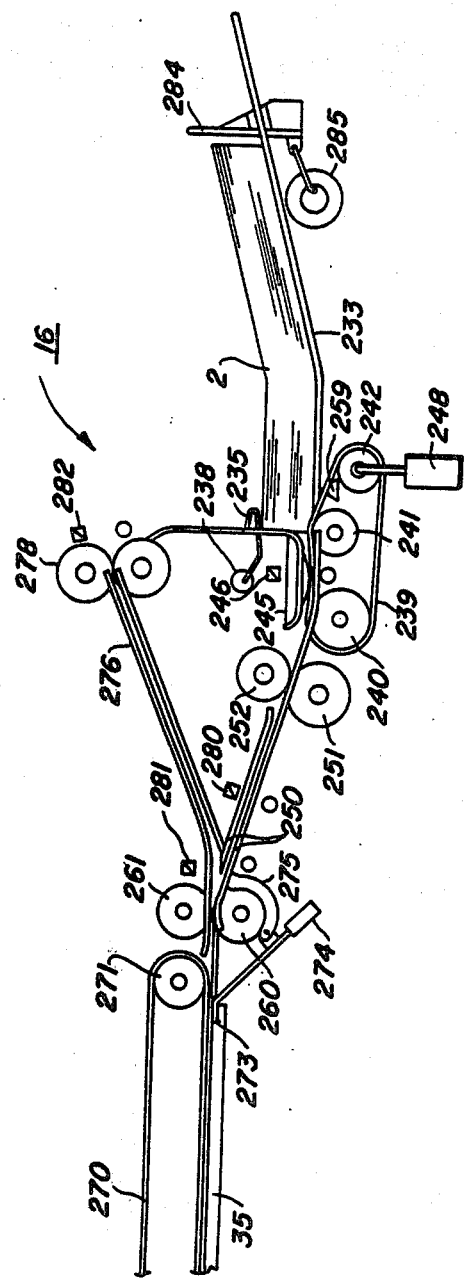
FIG. 14 is a schematic view showing details of the document handler for the apparatus shown in FIG. 1.
Figure 15:
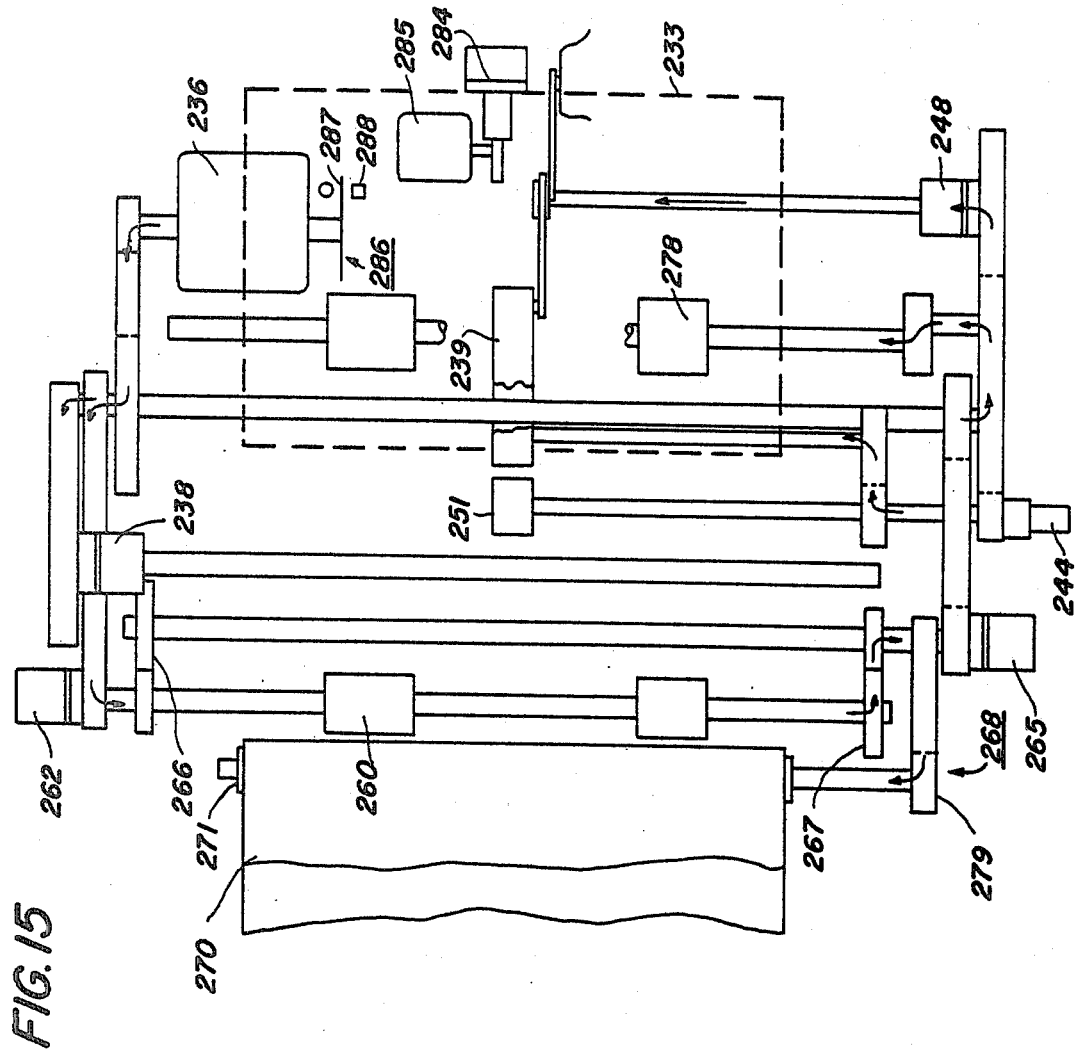
FIG. 15 is a view showing details of the drive mechanism for the document handler shown in FIG. 14.

Referring particularly to FIGS. 14 and 15, document handler 16 includes a tray 233 into which originals or documents 2 to be copies are placed by the operator following which a cover (not shown) is closed. A movable bail or separator 235, driven in an oscillatory path from motor 236 through a solenoid operated one revolution clutch 238, is provided to maintain document separation.

A document feed belt 239 is supported on drive and idler rolls 240, 241 and kicker roll 242 under tray 233, tray 233 being suitably apertured to permit the belt surface to project therewithin. Feedbelt 239 is driven by motor 236 through electromagnetic clutch 244. Gude 245, disposed near the discharge end of feed belt 239, cooperates with belt 239 to form a nip between which the documents pass.

A photoelectric type sensor 246 is disposed adjacent the discharge end of belt 239. Sensor 246 responds on failure of a document to feed within a predetermined interval to actuate solenoid operated clutch 248 which raises kicker roll 242 and increases the surface area of feed belt 239 in contact with the documents. Another sensor 259 located underneath tray 233 provides an output signal when the last document 2 of each set has left the tray 233.

Document guides 250 route the document fed from tray 233 via roll pair 251, 252 to platen 35. Roll 251 is drivingly coupled to motor 236 through electromagnetic clutch 244. Contact of roll 251 with roll 252 turns roll 252.

Roll pair 260, 261 at the entrance to platen 35 advance the document onto platen 35, roll 260 being driven through electromagnetic clutch 262 in the forward direction. Contact of roll 260 with roll 261 turns roll 261 in the document feeding direction. Roll 260 is selectively coupled through gearset 268 with motor 236 through electromagnetic clutch 265 so that on engagement of clutch 265 and disengagement of clutch 262, roll 260 and roll 261 therewith turn in the reverse direction to carry the document back to tray 233 via return chute 276. One way clutches 266, 267 permit free wheeling of the roll drive shafts.

The document leaving roll pair 260, 261 is carried by platen feed belt 270 onto platen 35, belt 270 being comprised of a suitable flexible material having an exterior surface of xerographic white. Belt 270 is carried about drive and idler rolls 271, 272. Roll 271 is drivingly coupled to motor 236 for rotation in either a forward or reverse direction through clutches 262, 265. Engagement of clutch 262 operates through belt and pulley drive 279 to drive belt in the forward direction, engagement of clutch 265 operates through drive 279 to drive belt 270 in the reverse direction.

To locate the document in predetermined position on platen 35, a register 273 is provided at the platen inlet for engagement with the document trailing edge. For this purpose, control of platen belt 270 is such that following transporting of the document onto plate 35 and beyond register 273, belt 270 is reversed to carry the document backwards against register 273.

To remove the document from platen 35 following copying, register 273 is retracted to an inoperative position. Solenoid 274 is provided for moving register 273.

A document deflector 275, is provided to route the document leaving platen 35 into return chute 276. For this purpose, platen belt 270 and pinch roll pair 260, 261 are reversed through engagement of clutch 265. Discharge roll pair 278, driven by motor 236, carry the returning document into tray 233.

To monitor movement of the documents in document handler 16 and detect jams and other malfunctions, photoelectric type sensors 246 and 280, 281 and 282 are disposed along the document routes.

To align documents 2 returned to tray 233, a document patter 284 is provided adjacent one end of tray 233. Patter 284 is oscillated by motor 285.

TIMING

To provide the requisite operational synchronization between host machine 10 and controller 18 as will appear, processor or machine clock 202 is provided. Referring particularly to FIG. 1, clock 202 comprises a toothed disc 203 drivingly supported on the output shaft of main drive motor 34. A photoelectric type signal generator 204 is disposed astride the path followed by the toothed rim of disc 203, generator 204 producing, whenever drive motor 34 is energized, a pulse like signal output at a frequency correlated with the speed of motor 34, and the machine components driven therefrom.

As described, a second machine clock, termed a pitch reset clock 138 herein, and comprising timing switch 146 is provided. Switch 146 cooperates with sheet register fingers 141 to generate an output pulse once each revolution of fingers 141. As will appear, the pulse like output of the pitch reset clock is used to reset or resynchronize controller 18 with host machine 10.

Figure 17:
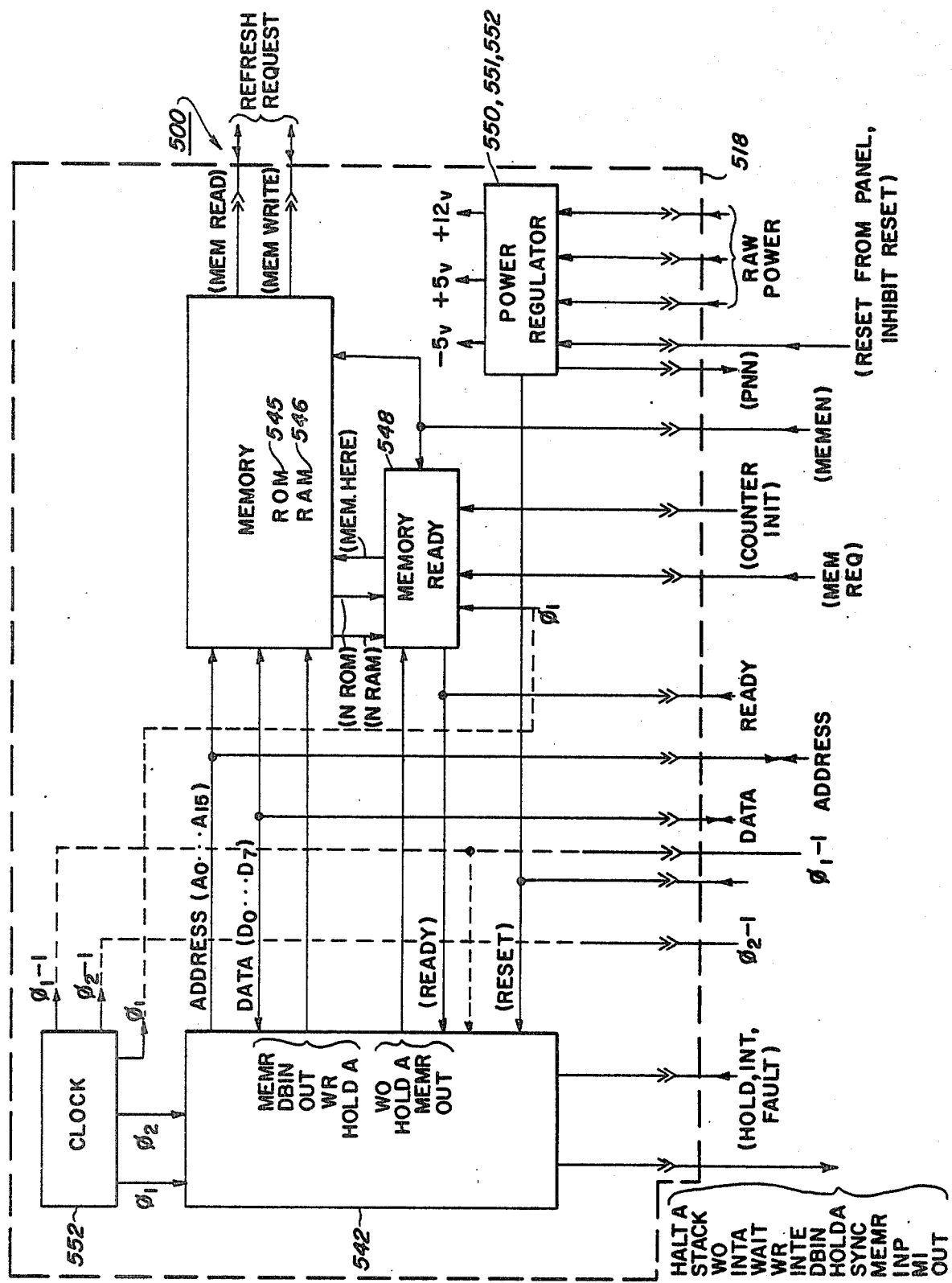
FIG. 17 is a block diagram of the controller CPU.

Referring to FIG. 15, a document handler clock 286 consisting of apertured disc 287 on the output shaft of document handler drive motor 236 and cooperating photoelectric type signal generator 288 is provided. As in the case of machine clock 202, document handler clock 286 produces an output pulse train from which components of the document handler may be synchronized. A real time clock such as clock 552 of FIG. 17, is utilized to control internal operations of the controller 18 as is known in the art, as well as the timing of some machine components.

CONTROLLER

Figure 16:
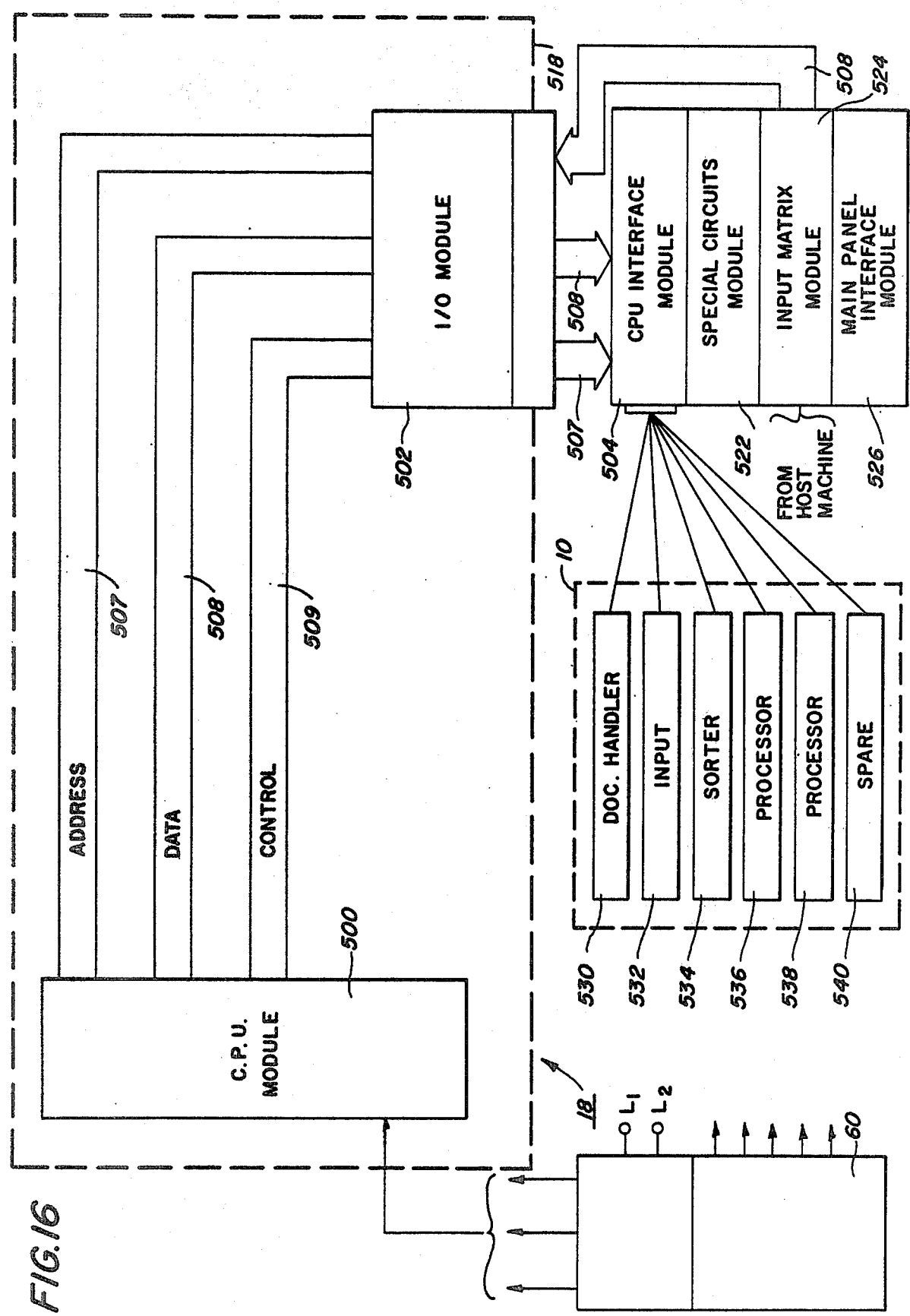
FIG. 16 is a block diagram of the controller for the apparatus shown in FIG. 1.

Referring to FIG. 16, controller 18 is a digital computer which includes a Central Processor Unit (CPU) Module 500, Input/Output (I/O) Module 502, and Interface 504. Address, Data and Control Buses 507, 508, 509 respectively operatively couple CPU Module 500 and I/O Module 502. CPU Module 500 and I/O Module 502 are disposed within a shield 518 to prevent noise interference.

Interface 504 couples I/O Module 502 with special circuits module 522, input matrix module 524, and main panel interface module 526. Module 504 also couples I/O Module 502 to operating sections of the machine, namely, document handler section 530, input section 532, sorter section 534 and processor sections 536, 538. A spare section 540, which may be used for monitoring operation of the host machine, or which may be later utilized to control other devices, is provided.

Figure 18A:
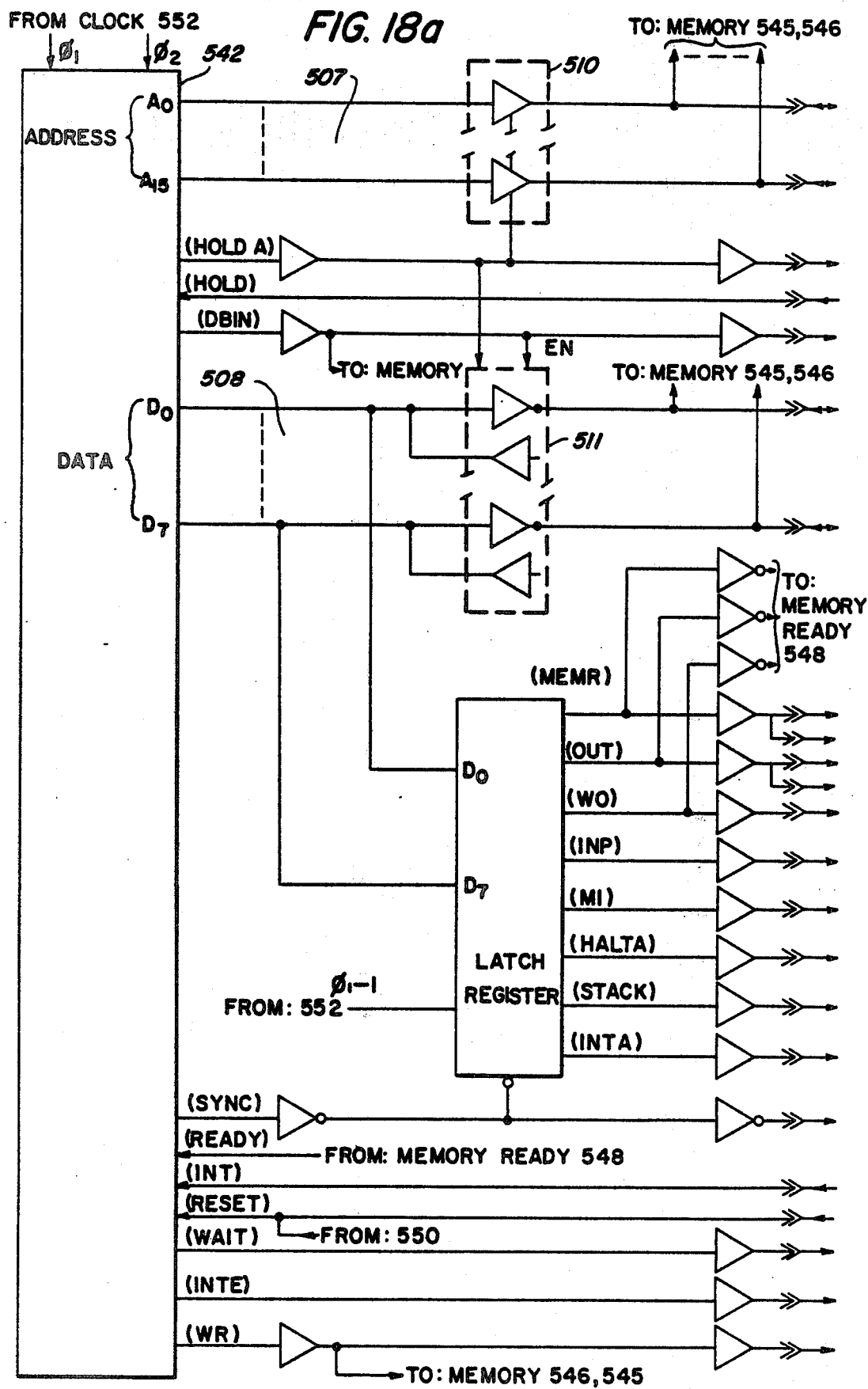
FIG. 18$a$ is a block diagram showing the CPU microprocessor input/output connections.
Figure 18B:
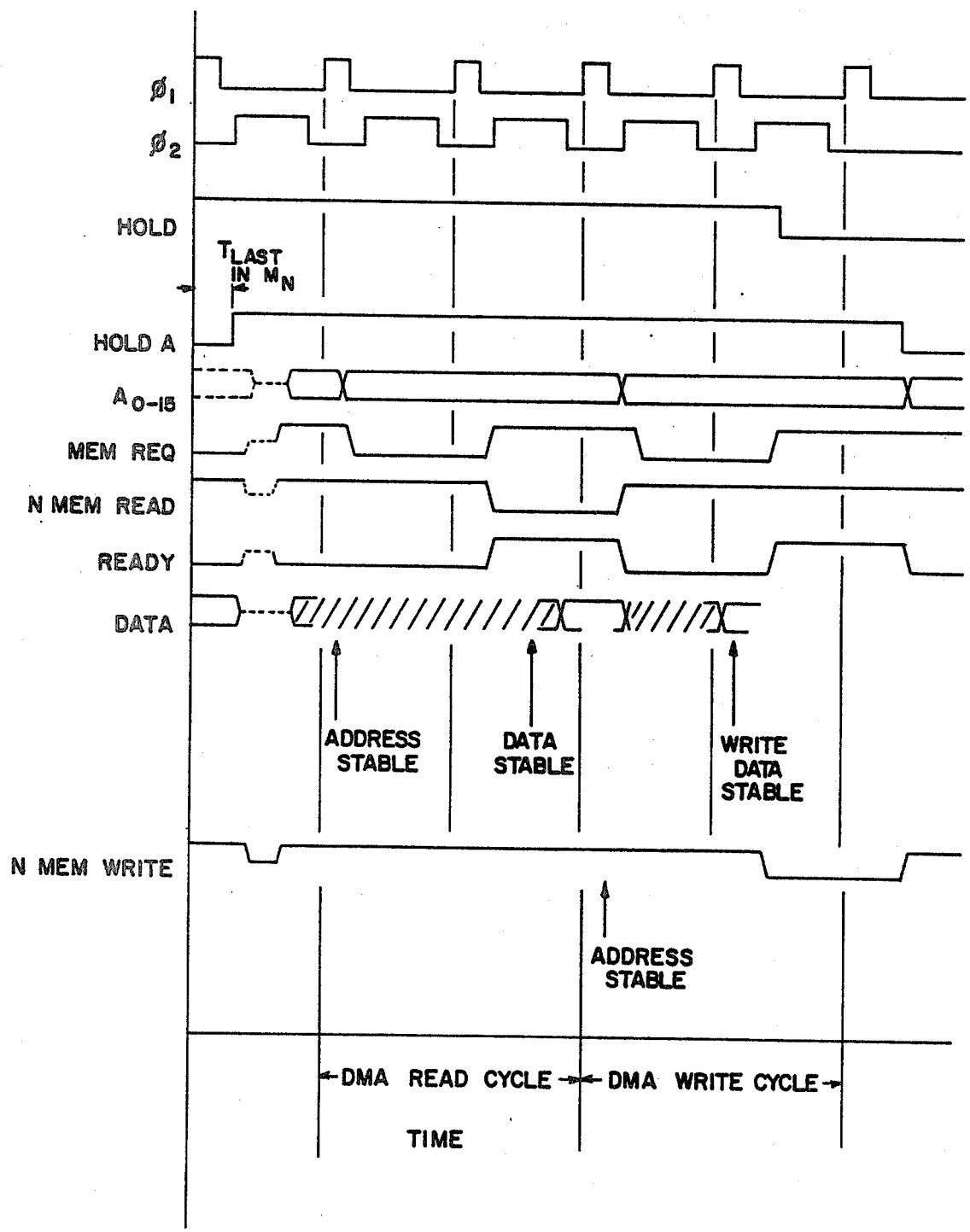

Referring to FIGS. 17, 18, CPU module 500 comprises a processor 542 such as an Intel 8080 microprocessor manufactured by Intel Corporation, Santa Clara, California, 16K Read Only Memory (herein ROM) and 2K Random Access Memory (herein RAM) sections 545, 546, Memory Ready section 548, power regulator section 550, and onboard clock 552. Bipolar tri-state buffers 510, 511 in Address and Data buses 507, 508 disable the bus on a Direct Memory access (DMA) signal (HOLDA) as will appear. While the capacity of memory sections 545, 546 are indicated throughout as being 16K and 2K respectively, other memory sizes may be readily contemplated.

Figure 19A:
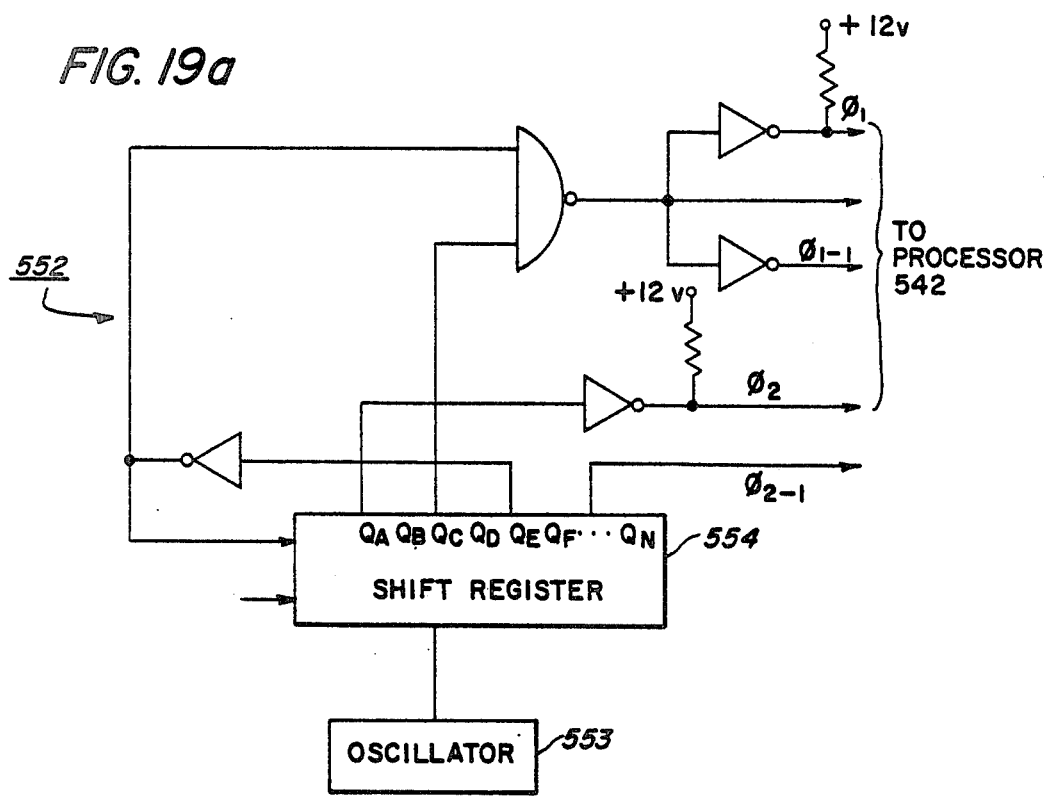
FIG. 19$a$ is a logic schematic of the CPU clock.
Figure 19B:
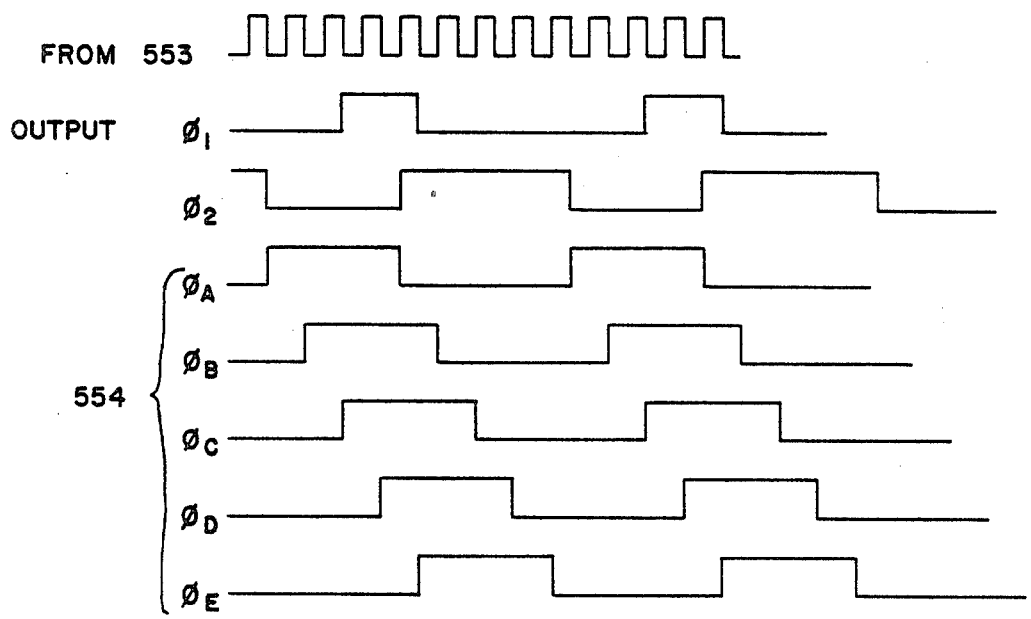

Referring particularly to FIG. 19, clock 552 comprises a suitable clock oscillator 553 feeding a multi-bite (Qa-Qn) shift register 554. Register 554 includes an internal feedback path from one bit to the serial input of register 554. Output signal waveforms $\phi_1, \phi_2, \phi_{1-1}$ and $\phi_{2-1}$ are produced for use by the system.

Figure 20:
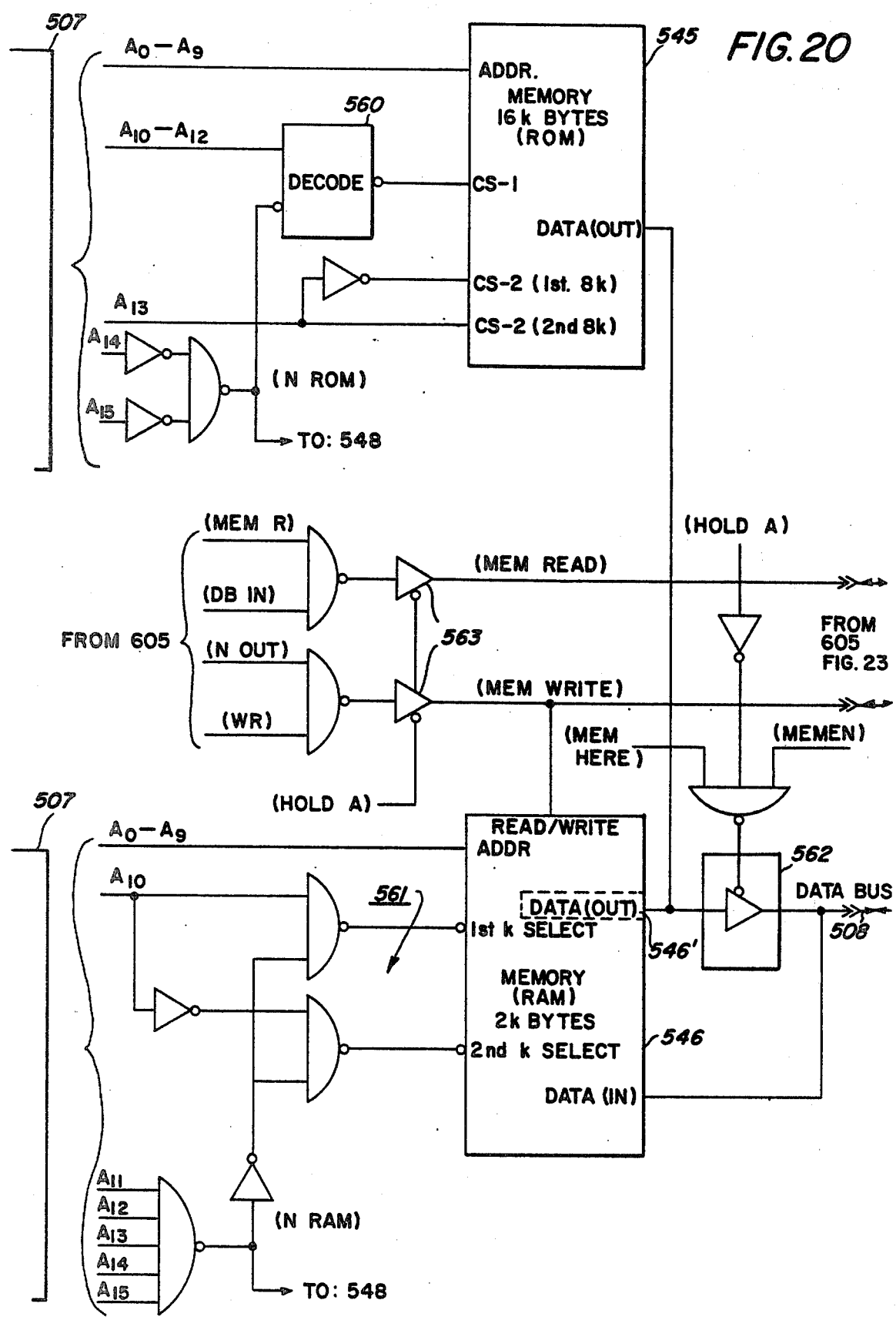
FIG. 20 is a logic schematic of the CPU memory.

Referring to FIG. 20, the memory bytes in ROM section 545 are implemented by address signals (Ao-A 15) from processor 542, selection being effected by 3 to 8 decode chip 560 controlling chip select 1 (CS-1) and a 1 bit selection (A 13) controlling chip select 2 (CS-2). The most significant address bits (A 14, A 15) select the first 16 K of the total 64 bytes of the addressing space. The memory bytes in RAM section 546 are implemented by Address signals (Ao-A 15) through selector circuit 561. Address bit A 10 serves to select the memory bank while the remaining five most significant bits (A 11-A 15) select the last 2 K bytes out of the 64 K bytes of addressing space. RAM memory section 546 includes a 40 bit output buffer the output of which is tied together with the output from ROM memory section 545 and goes to tri-state buffer 562 to drive Data bus 508. Buffer 562 is enabled when either memory section 545 or 546 is being addressed and either a (MEM READ) or DMA (HOLD A) memory request exists. An enabling signal (MEMEN) is provided from the machine control or service panel (not shown) which is used to permit disabling of buffer 562 during servicing of CPU Module 500. Write control means from either processor 542 (MEM WRITE) of from DMA (HOLD A) control. Tri-state buffers 563 permit Refresh Control 605 of I/O Module 502 to access MEM READ and MEM WRITE control channels directly on a DMA signal (HOLD A) from processor 542 as will appear.

Figure 21:
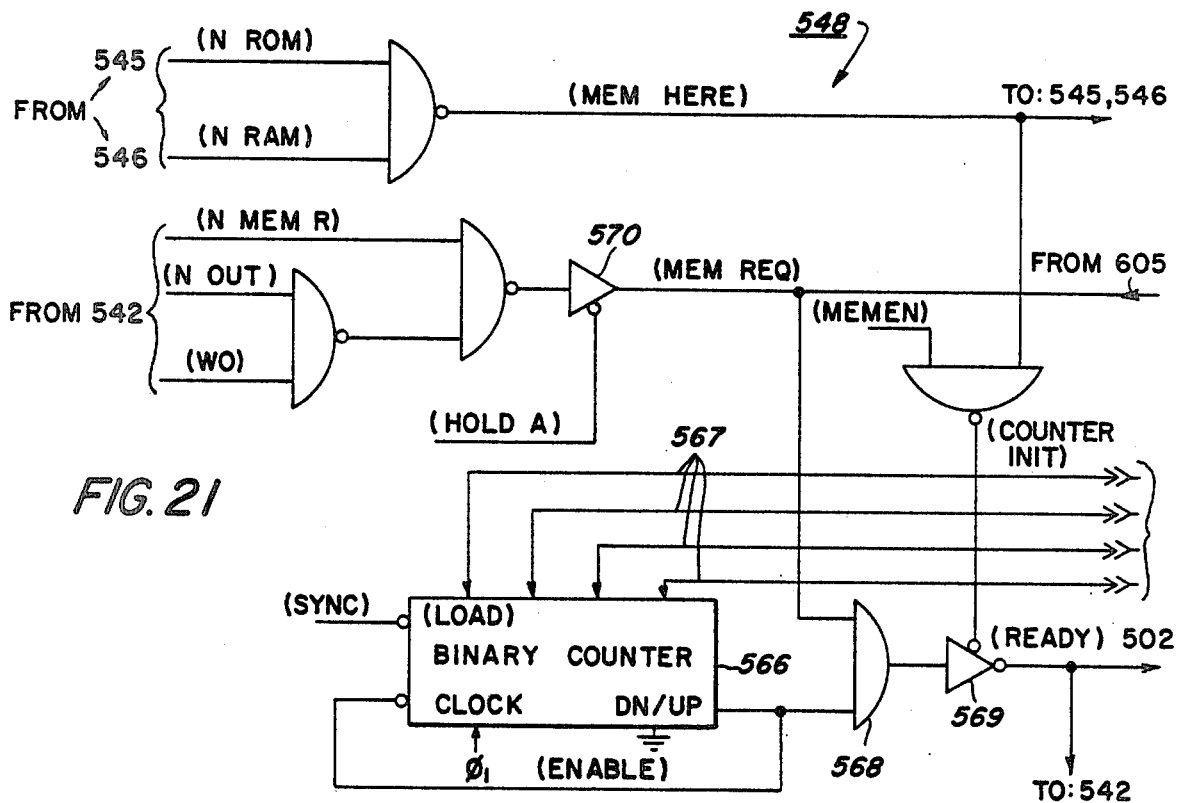
FIG. 21 is a logic schematic of the CPU memory ready.

Referring to FIG. 21, memory read section 548 provides a READY signal to processor 542. A binary counter 566, which is initialized by a SYNC signal ($\phi_i$) to a prewired count as determined by input circuitry 567, counts up at a predetermined rate. At the maximum count, the output at gate 568 comes true stopping the counter 566. If the cycle is a memory request (MEM REQ) and the memory location is on board as determined by the signal (MEM HERE) to tri-state buffer 569, a READY signal is sent to processor 542. Tri-state buffer 570 in MEM REQ line permits Refresh Control 605 of I/O Module 502 to access the MEM REQ channel directly on a DMA signal (HOLD A) from processor 542 as will appear.

Figure 22A:
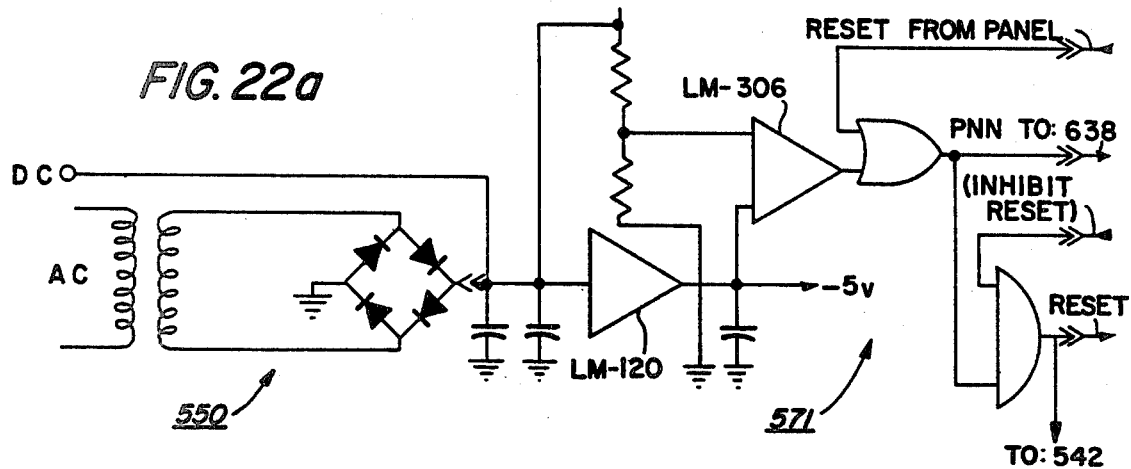
FIGS. 22$a$, 22$b$, 22$c$ are logic schematics of the CPU power supply stages.
Figure 22B:
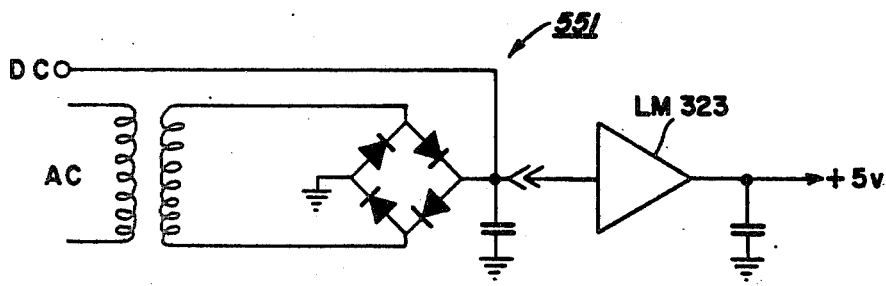
Figure 22C:
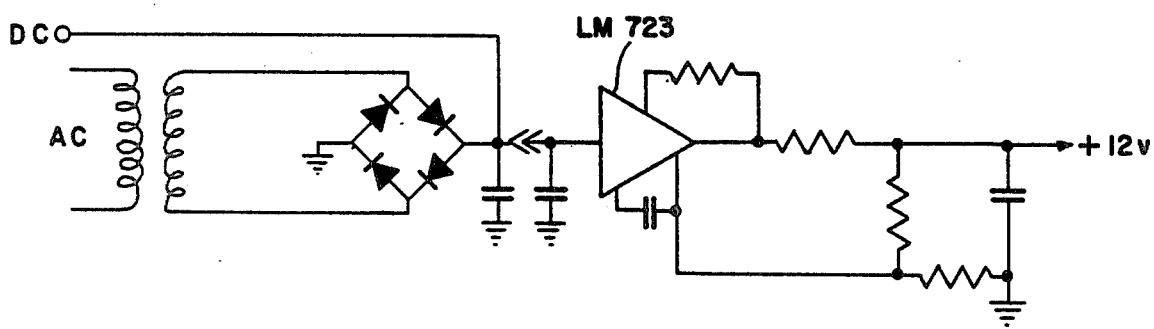

Referring to FIG. 22, power regulators 550, 551, 552 provide the various voltage levels, i.e. +5 v, +12 v, and −5 v D.C. required by the module 500. Each of the three on board regulators 550, 551, 552 employ filtered D.C. inputs. Power Not Normal (PNN) detection circuitry 571 is provided to reset processor 542 during the power up time. Panel reset is also provided via PNN. An enabling signal (INHIBIT RESET) allows completion of a write cycle in Non Volatile (N.V.) Memory 610 of I/O Module 502.

Figure 23B:
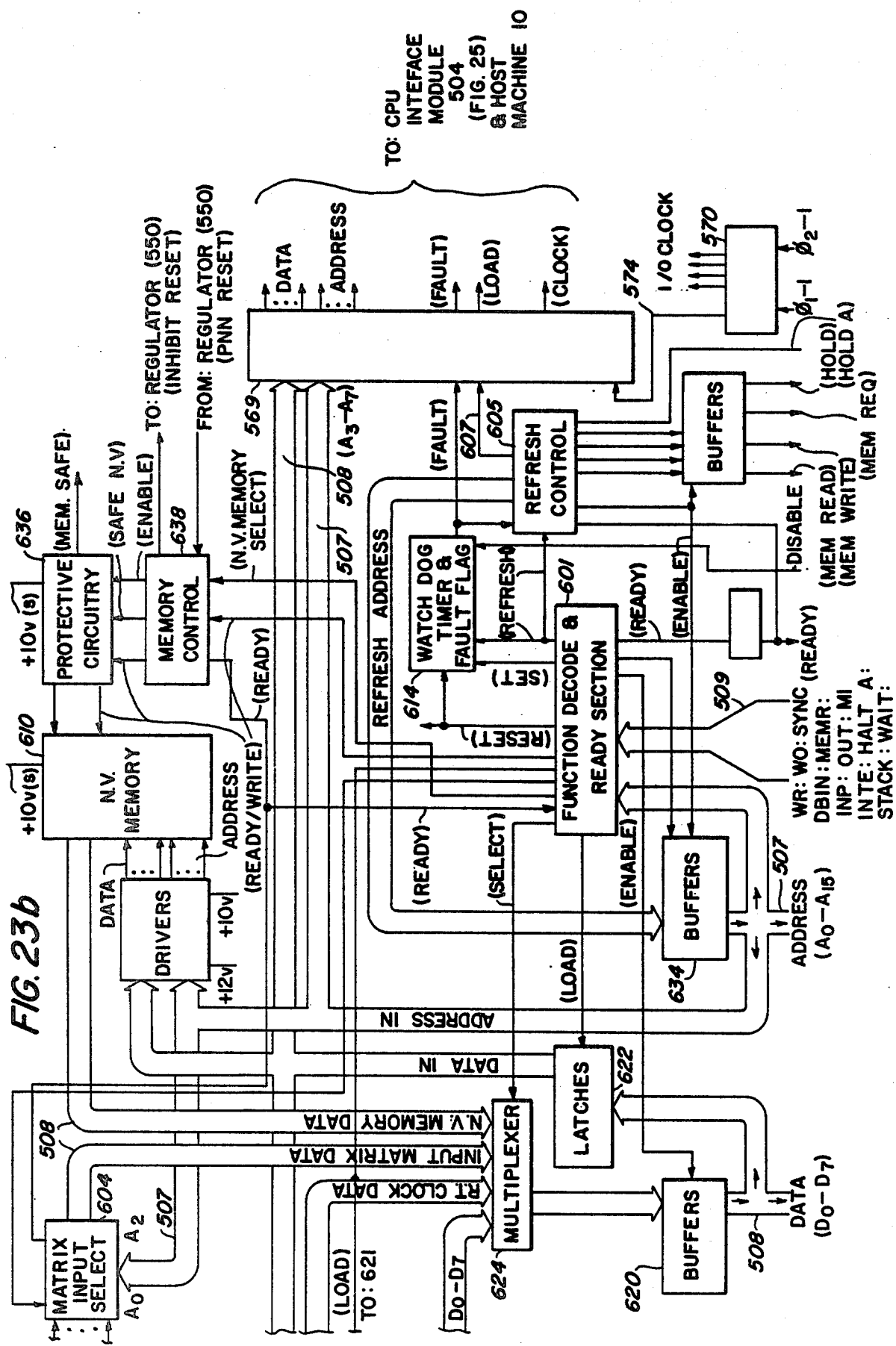
FIGS. 23$a$ and 23$b$ comprise a block diagram of the controller I/O module.

Referring to FIGS. 18, 20, 21, and the DMA timing chart (FIG. 18a) data transfer from RAM section 546 to host machine 10 is effected through Direct Memory Access (DMA), as will appear. To initiate DMA, a signal (HOLD) is generated by Refresh Control 605 (FIG. 23a). On acceptance, processor 542 generates a signal HOLD ACKNOWLEDGE (HOLD A) which works through tri-state buffers 510, 511 and through buffers 563 and 570 to release Address bus 507, Data bus 508 and MEM READ, MEM WRITE, and MEM REQ channels (FIGS. 20, 21) to Refresh Control 605 of I/O Module 502.

Referring to FIG. 23, I/O Module 502 interfaces with CPU module 500 through bi-directional Address, Data and Control buses 507, 508, 509. I/O Module 502 appears to CPU module 500 as a memory portion. Data transfers between CPU and I/O modules 500, 502, and commands a I/O module 502 except for output refresh are controlled by memory reference instructions executed by CPU module 500. Output refresh which is initiated by one of several uniquely decoded memory reference commands, enables Direct Memory access (DMA) by I/O module 502 to RAM section 546.

I/O module 502 includes Matrix Input select 604 (through which inputs from the host machine 10, are received), Refresh Control 605, Nonvolatile (NV) memory 610, Interrupt Control 612, Watch dog Timer and failure Flag 614 and clock 570.

A Function Decode Section 601 receives and interprets commands from CPU section 500 by decoding information on address bus 507 along with control signals from processor 542 on control bus 509. On command, decode section 601 generates control signals to perform the function indicated. These functions include (a) controlling tri-state buffers 620 to establish the direction of data flow in Data bus 508; (b) strobing data from Data bus 508 into buffer latches 622; (c) controlling multiplexer 624 to put data from Interrupt Control 612, Real Time clock register 621, Matrix Input Select 604 or N.V. memory 610 onto data bus 508; (d) actuating refresh control 605 to initiate a DMA operation; (e) actuating buffers 634 to enable address bits Ao-A 7 to be sent to the host machine 10 for input matrix read operations; (f) commanding operation of Matrix Input Select 604; (g) initiating read or write operation of N.V. memory 610 through Memory Control 638; (h) loading Real Time clock register 621 from data bus 508; and (i) resetting the Watch Dog timer or setting the Fault Failure flag 614. In addition, section 601 includes logic to control and synchronize the READY control line to CPU module 500, the READY line being used to devise module 500 when data placed on the Data bus by I/O module 502 is valid.

Watch dog timer and failure flag 614, which serves to detect certain hardwired and software malfunctions, comprises a free running counter which under normal circumstances is periodically reset by an output refresh command (REFRESH) from Function Decode Section 601. If an output refresh command is not received within a preset time interval, (i.e. 25 m sec) a fault flip flop is set and a signal (FAULT) sent to the host machine 10. The signal (FAULT) also raises the HOLD line to disable CPU Module 500. Clearing of the fault flip flop may be by cycling power or generating a signal (RESET). A selector (not shown) may be provided to disable (DISABLE) the watch dog timer when desired. The fault flip flop may also be set by a command from the CPU Module to indicate that the operating program detected a fault.

Matrix Input select 604 has capacity to read up to 32 groups of 8 discrete inputs from host machine 10. Lines $A_3$ through $A_7$ of Address bus 507 are routed to host machine 10 via CPU Interface Module 504 to select the desired group of 8 inputs. The selected inputs from machine 10 are received via Input Matrix Module 524 (FIG. 28) and are placed by matrix 604 onto data bus 508 and sent to CPU Module 500 via multiplexer 624. Bit selection is effected by lines $A_0$ through $A_2$ of Address bus 507.

Output refresh control 605, when initiated, transfers either 16 or 32 sequential words from RAM memory output buffer 546' to host machine 10 at the predetermined clock rate in line 574. Direct Memory access (DMA) is used to facilitate transfer of the data at a relatively high rate. On a Refresh signal from Function Decode Section 601, Refresh Control 605 generates a HOLD signal to processor 542. On acknowledgement (HOLD A) processor 542 enters a hold condition. In this mode, CPU Module 500 releases address and data buses 507, 508 to the high impedance state giving I/O module 502 control thereover. I/O module 502 then sequentially accesses the 32 memory words from output buffer 546' (REFRESH ADDRESS) and transfers the contents to the host machine 10. CPU Module 500 is dormant during this period.

A control signal (LOAD) in line 607 along with the predetermined clock rate determined by the clock signal (CLOCK) in line 574 is utilized to generate eight 32 bit serial words which are transmitted serially via CPU Interface Module 504 to the host machine remote locations where serial to parallel transformation is performed. Alternatively, the data may be stored in addressable latches and distributed in parallel directly to the required destinations.

Figure 24:
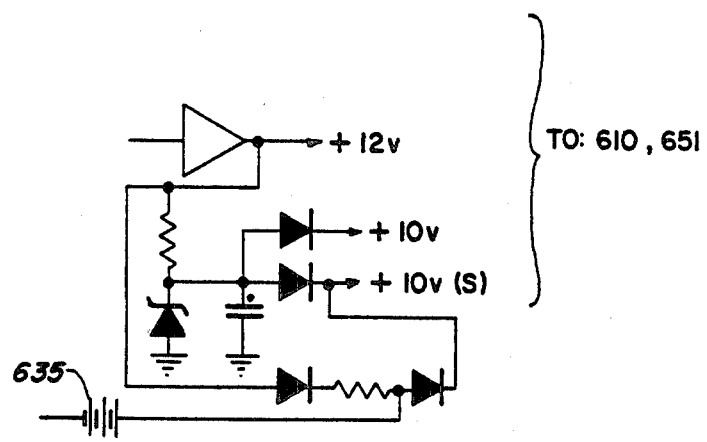
FIG. 24 is a logic schematic of the nonvolatile memory power supply.

N.V. memory 610 comprises a predetermined number of bits of nonvolatile memory stored in I/O module 502 under Memory Control 638, N.V. memory 610 appears to CPU module 500 as part of the CPU module memory complement and therefore may be accessed by the standard CPU memory reference instruction set. Referring particularly to FIG. 24, to sustain the contents of N.V. memory 610 should system power be interrupted, one or more rechargeable batteries 635 are provided exterior to I/O module 502. CMOS protective circuitry 636 couples batteries 635 to memory 610 to preserve memory 610 on a failure of the system power. A logic signal (INHIBIT RESET) prevents the CPU Module 500 from being reset during the N.V. memory write cycle interval so that any write operation in progress will be completed before the system is shut down.

For tasks that require servicing, high speed response to external events, or synchronization with the operation of host machine 10, a multiple interrupt system is provided. These comprise machine based interrupts, herein referred to as Pitch Reset interrupt and the Machine interrupt, as well as a third clock driven interrupt, the Real Time interrupt.

Referring particularly to FIGS. 23(a) and 34, the highest priority interrupt signal, Pitch reset signal 640, is generated by the signal output of pitch reset clock 138. The clock signal is fed via optical isolator 645 and digital filter 646 to edge trigger flip flop 647.

The second highest priority interrupt signal, machine clock signal 641, is sent directly from machine clock 202 through isolation transformer 648 to a phase locked loop 649. Loop 649, which serves as bandpath filter and signal conditioner, sends a square wave signal to edge trigger flip flop 651. The second signal output (LOCK) serves to indicate whether loop 649 is locked onto a valid signal input of not.

The lowest priority interrupt signal, Real Time Clock signal 643, is generated by register 621. Register 621 which is loaded and stored by memory reference instructions from CPU module 500 is decremented by a clock signal in line 643 which may be derived from I/O Module clock 570. On the register count reaching zero, register 621 sends an interrupt signal to edge trigger flip flop 656. A spare interrupt 642 is also provided.

Setting of one or more of the edge trigger flip flops 647, 651, 654, 656 by the interrupt signals 640, 641, 642, 643 generates a signal (INT) via priority chip 659 to processor 542 of CPU Module 500. On acknowledgement, processor 542, issued a signal (INTA) transferring the status of the edge trigger flip flops 647, 651, 654, 656 to a four bit latch 660 to generate an interrupt instruction code (RESTART) onto the data bus 508.

Each interrupt is assigned a unique RESTART instruction code. Should an interrupt of higher priority be triggered, a new interrupt signal (INT) and RESTART instruction code are generated resulting in a nesting of interrupt software routines whenever the interrupt recognition circuitry is enabled within the CPU 500.

Priority chip 659 serves to establish a handling priority in the event of simultaneous interrupt signals in accordance with the priority schedule described.

Once triggered, the edge trigger flip flop 647, 651, 654 or 656 must be reset in order to capture the next occurrence of the interrupt associated therewith. Each interrupt subroutine serves, in addition to performing the functions programmed, to reset the flip flops (through the writing of a coded byte in a uniquely selected address) and to re-enable the interrupt (through execution of a re-enabling instruction). Until re-enabled, initiation of a second interrupt is precluded while the first interrupt is in progress.

Lines 658 permit interrupt status to be interrogated by CPU module 500 on a memory reference instruction.

I/O Module 502 includes a suitable pulse generator or clock 570 for generating the various timing signals required by module 502. Clock 570 is driven by the pulse-like output $\phi_{1-1}, \phi_{2-1}$ of processor clock 552 (FIG. 19a). As described, clock 570 provides a reference clock pulse (in line 574) for synchronizing the output refresh data and is the source of clock pulses (in line 643) for driving Real Time register 621.

Figure 25:
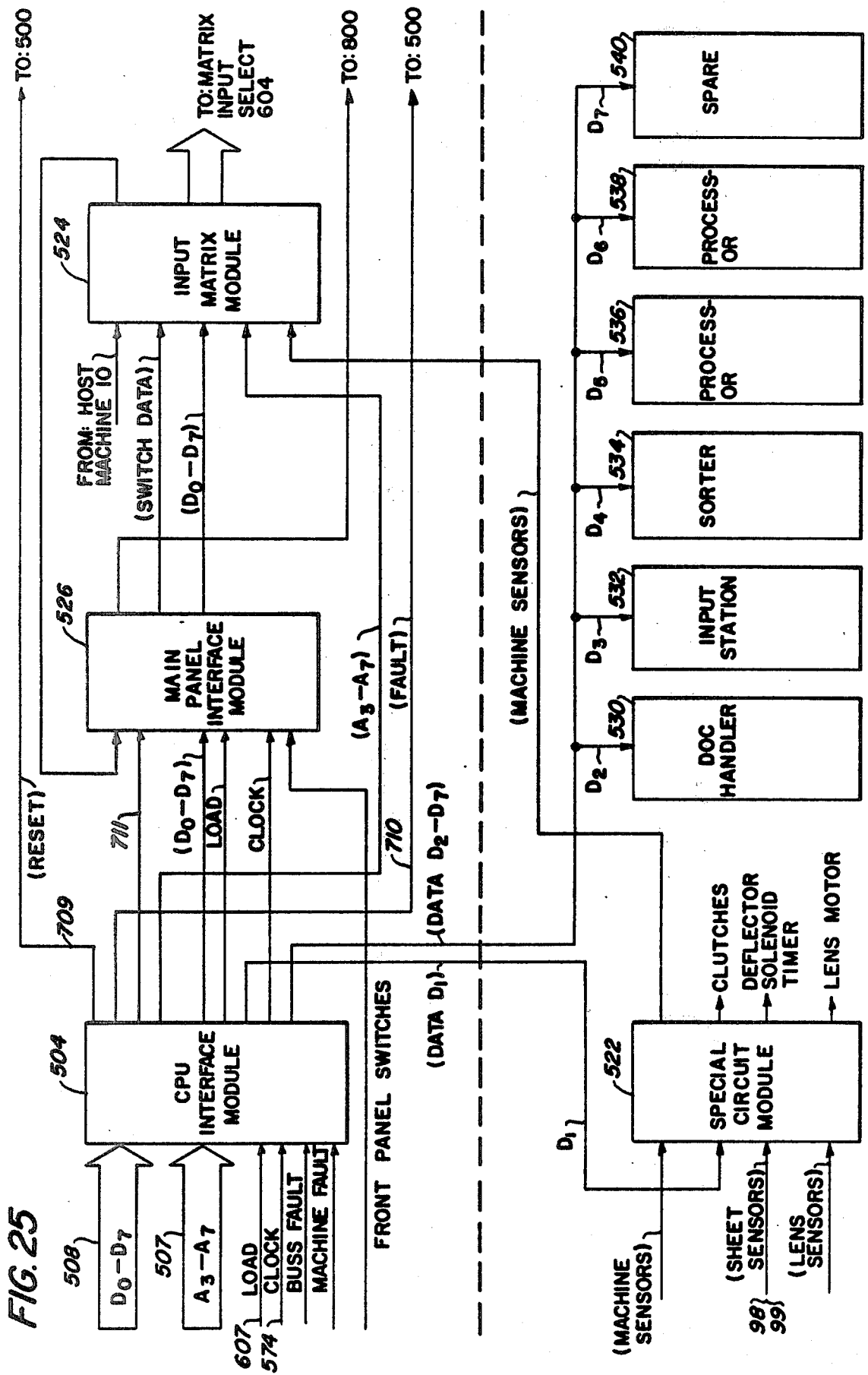
FIG. 25 is a block diagram of the apparatus interface and remote output connections.
Figure 26:
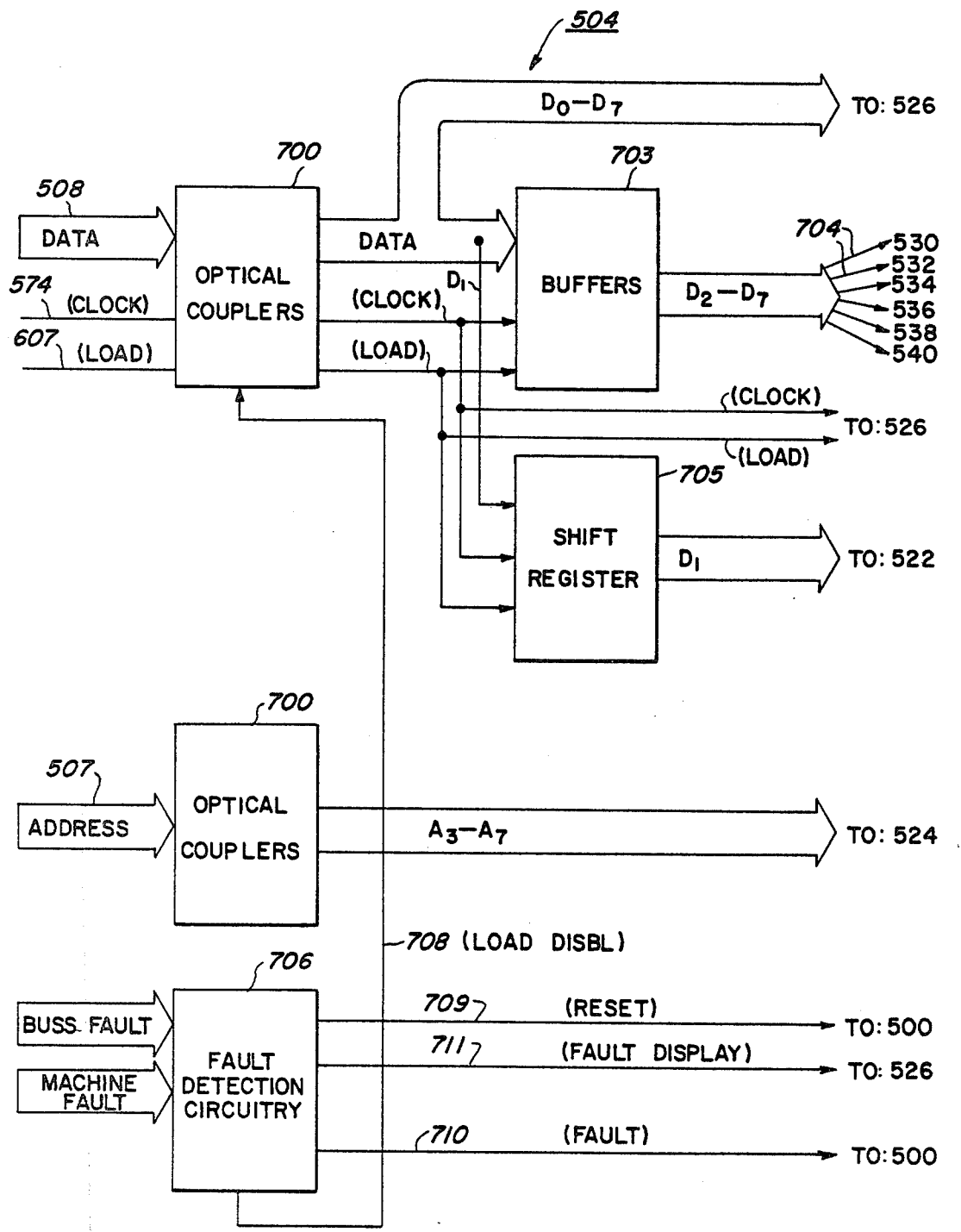
FIG. 26 is a block diagram of the CPU interface module.

CPU interface module 504 interfaces I/O module 502 with the host machine 10 and transmits operating data stored in RAM section 546 to the machine. Referring particularly to FIG. 25 and 26, data and address information are inputted to module 504 through suitable means such as optical type couplers 700 which convert the information to single ended logic levels. Data in bus 508 on a signal from Refresh Control 605 in line 607 (LOAD), is clocked into module 546 at the reference clock rate in line 574 parallel by bit, serial by byte for a preset byte length, with each data bit of each successive byte being clocked into a separate data channel D0–D7. As best seen in FIG. 25, each data channel D0–D7 has an assigned output function with data channel D0 being used for operating the front panel lamps 830 in the digital display, (see FIG. 32), data channel D1 for special circuits module 522, and remaining data channels D2–D7 allocated to the host machine operating sections 530, 532, 534, 536, 538 and 540. Portions of data channels D1–D7 have bits reserved for front panel lamps and digital display.

Since the bit capacity of the data channels D2–D7 is limited, a bit buffer 703 is preferably provided to catch any bit overflow in data channels D2–D7.

Inasmuch as the machine output sections 530, 532, 534, 536, 538 and 540 are electrically a long distance away, i.e. remote, from CPU interface module 504, and the environment is electrically "noisy", the data stream in channels D2–D7 is transmitted to remote sections 530, 532, 534, 536, 538 and 540 via a shielded twisted pair 704. By this arrangement, induced noise appears as a differential input to both lines and is rejected. The associated clock signal for the data is also transmitted over line 704 with the line shielded carrying the return signal currents for both data and clock signals.

Data in channel $D_1$ destined for special circuits module 522 is inputted to shift register type storage circuitry 705 for transmittal to module 522. Data is also inputted to main panel interface module 526. Address information in bus 507 is converted to single ended output by couplers 700 and transmitted to Input Matrix Module 524 to address host machine inputs.

CPU interface mdoule 504 includes fault detector circuitry 706 for monitoring both faults occurring in host machine 10 and faults or failures along the buses, the latter normally comprising a low voltage level or failure in one of the system power lines. Machine faults may comprise a fault in CPU module 500, a belt mistrack signal from sensor 27 (see FIG. 2), opening one of the machine doors or covers as responded to by conventional cover interlock sensors (not shown), a fuser over temperature as detected by sensor 175, etc. In the event of a bus fault, a reset signal (RESET) is generated automatically in line 709 to CPU module 500 (see FIGS. 17 and 18) until the fault is removed. In the event of a machine fault, a signal is generated by the CPU in line 710 to actuate a suitable relay (now shown) controlling power to all or a portion of host machine 10. A load disabling signal (LOAD DISBL) is inputted to optical couplers 700 via line 708 in the event of a fault in CPU module 500 to terminate input of data to host machine 1. Other fault conditions are monitored by the software background program. In the event of a fault, a signal is generated in line 711 to the digital display on control console 800 (via main panel interface module 526) signifying a fault.

Figure 27:
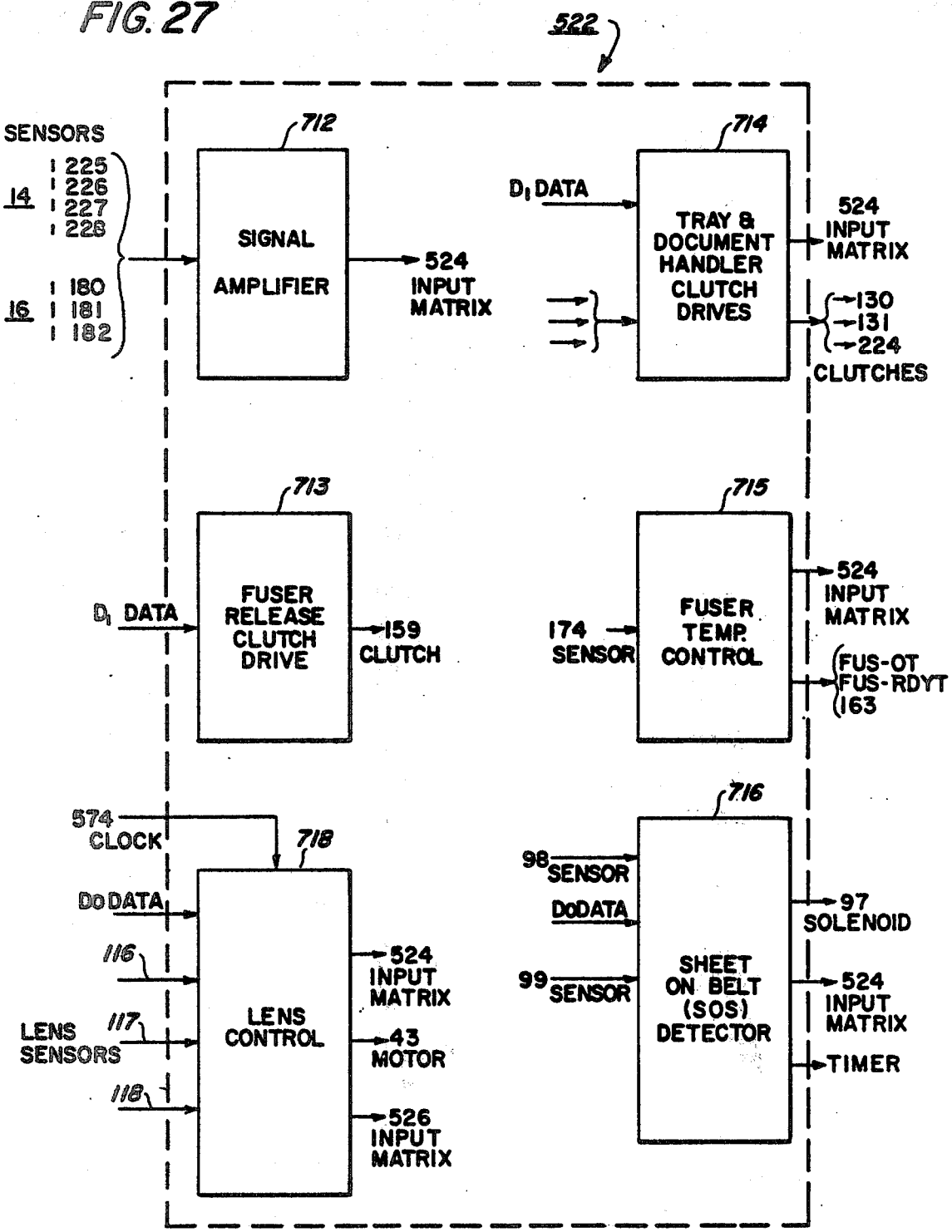
FIG. 27 is a block diagram of the apparatus special circuits module.

Referring particularly to FIGS. 25 and 27, special circuits module 522 comprises a collection of relatively independent circuits for either monitoring operation of and/or driving various elements of host machine 10. Module 522 incorporates suitable circuitry 712 for amplifying the output of sensors 223, 225, 226 227, 228 and 280, 281, 282 of sorter 14 and document handler 16 respectively; circuitry 713 for operating fuser release clutch 519; and circuitry 714 for operating main and auxiliary paper tray fed roll clutches 130, 131 and document handler feed clutch 244.

Additionally, fuser detection circuitry 715 monitors temperature conditions of fuser 150 as responded to by sensor 174. On overheating of fuser 150, a signal (FUS-OT) is generated to turn heater 163 off, actuate clutch 159 to separate fusing and pressure rolls 160, 161; trigger trap solenoid 158 to prevent entrance of the next copy sheet into fuser 150, and initiate a shutdown of host machine 10. Circuitry 715 also cycles fuser heater 163 to maintain fuser 150 at proper operating temperatures and signals (FUS-RDUT) host machine 10 when fuser 150 is ready for operation.

Circuitry 716 provides closed loop control over sensor 98 which responds to the presence of a copy sheet 3 on belt 20. On a signal from sensor 98, solenoid 97 is triggered to bring deflector 96 into intercepting position adjacent belt 20. At the same time, a backup timer (not shown) is actuated. If the sheet is lifted from the belt 20 by deflector 96 within the time alloted, a signal from sensor 99 disables the timer and a misstrip type jam condition of host machine 10 is declared and the machine is stopped. If the signal from sensor 99 is not received within the alloted time, a sheet on selenium (SOS) type jam is declared and an immedite machine stop is effected.

Circuitry 718 controls the position (and hence the image reduction effected) by the various optical elements that comprise main lens 41 in response to the reduction mode selected by the operator and the signal inputs from lens position responsive sensors 116, 117, 118. The signal output of circuitry 718 serves to operate lens drive motor 43 as required to place the optical elements of lens 41 in proper position to effect the image reduction programmed by the operator.

Figure 28:
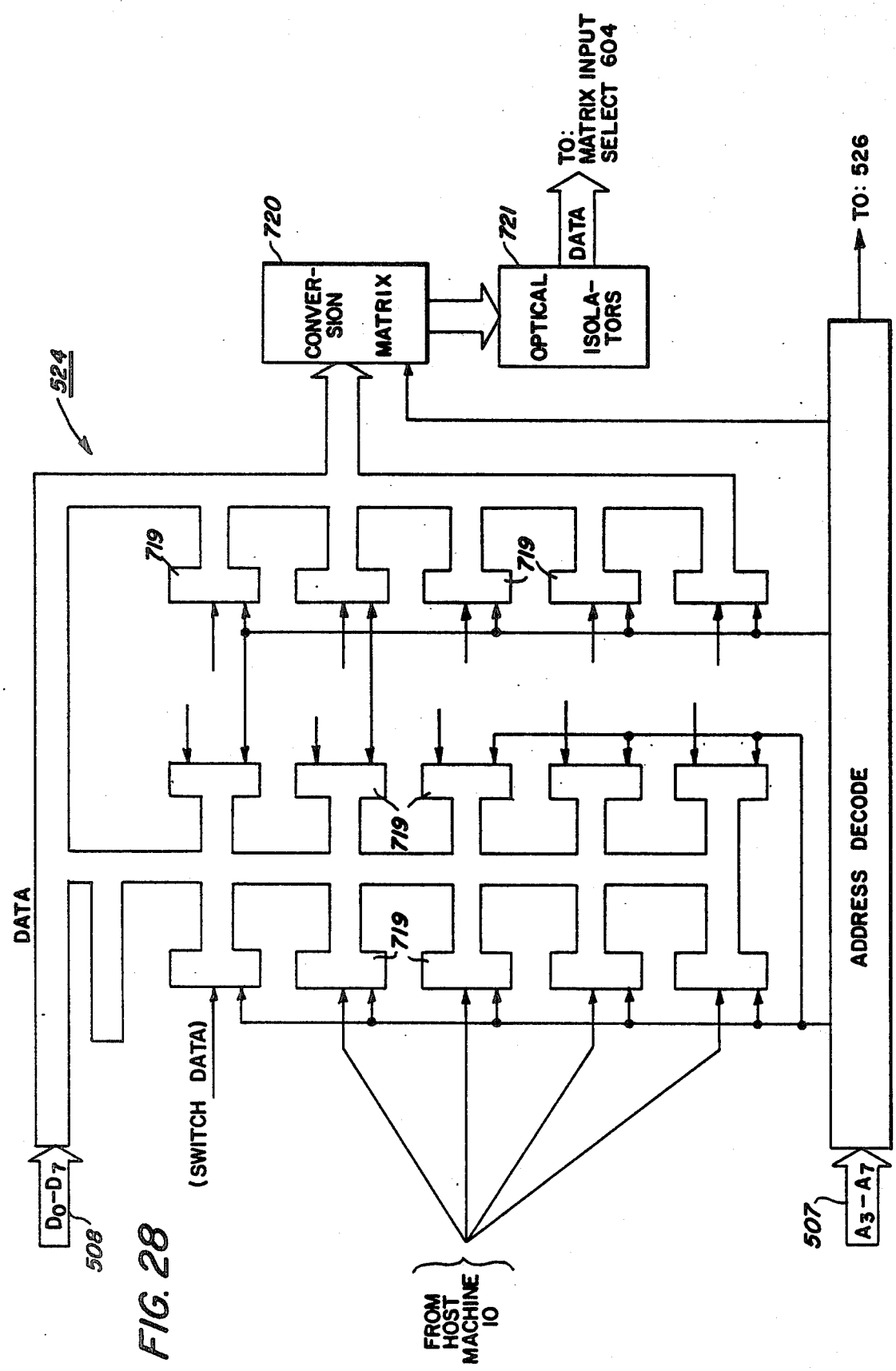
FIG. 28 is a block diagram of the main panel interface module.
Figure 36:
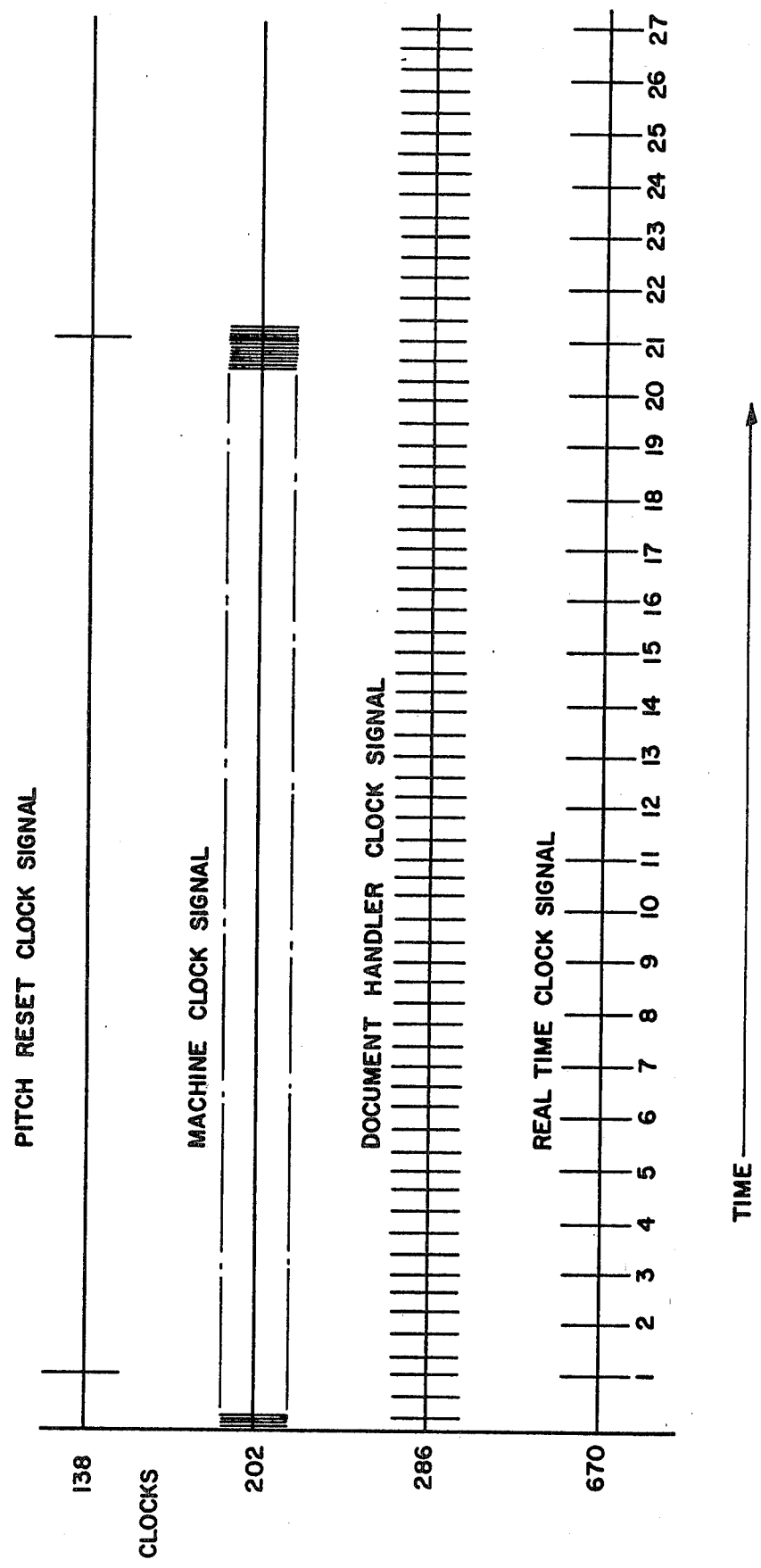
FIG. 36 is a chart illustrating the relative timing sequences of the clock interrupt pulses.
Figure 37:
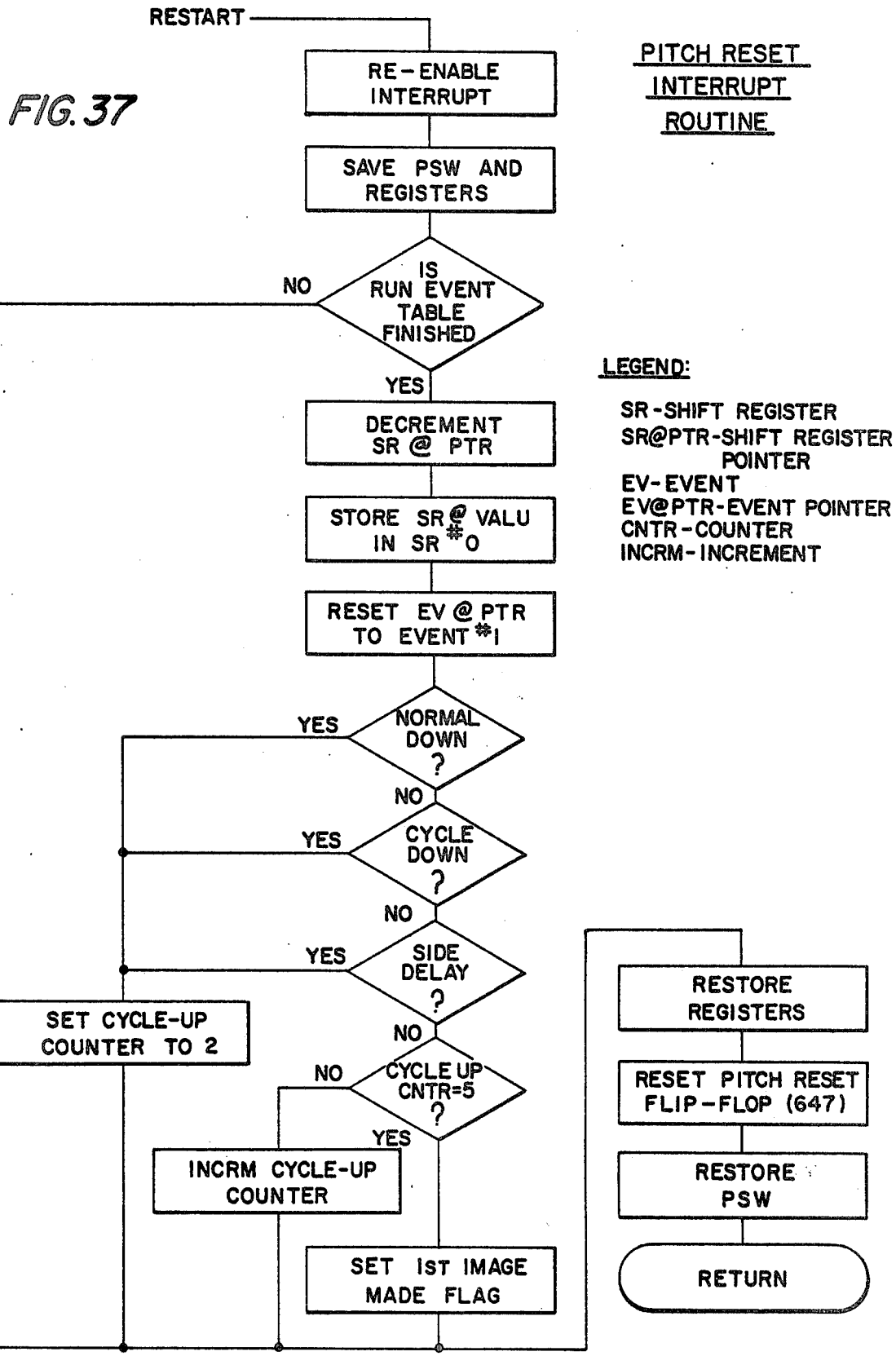
FIG. 37 is a flow charge of the pitch interrupt routine.

Referring to FIG. 28, input matrix module 524 provides analog gates 719 for receiving data from the various host machine sensors and inputs (i.e. sheet sensors 135, 136; pressure sensor 157; etc), module 524 serving to convert the signal input to a byte oriented output for transmittal to I/O module 502 under control of Input Matrix Select 604. The byte output to module 524 is selected by address information inputted on bus 507 and decoded on module 524. Conversion matrix 720, which may comprise a diode array, converts the input logic signals of "0" to logic "1" true. Data from input matrix module 524 is transmitted via optical isolators 721 and Input Matrix Select 604 of I/O module 502 to CPU Module 500.

Figure 29:
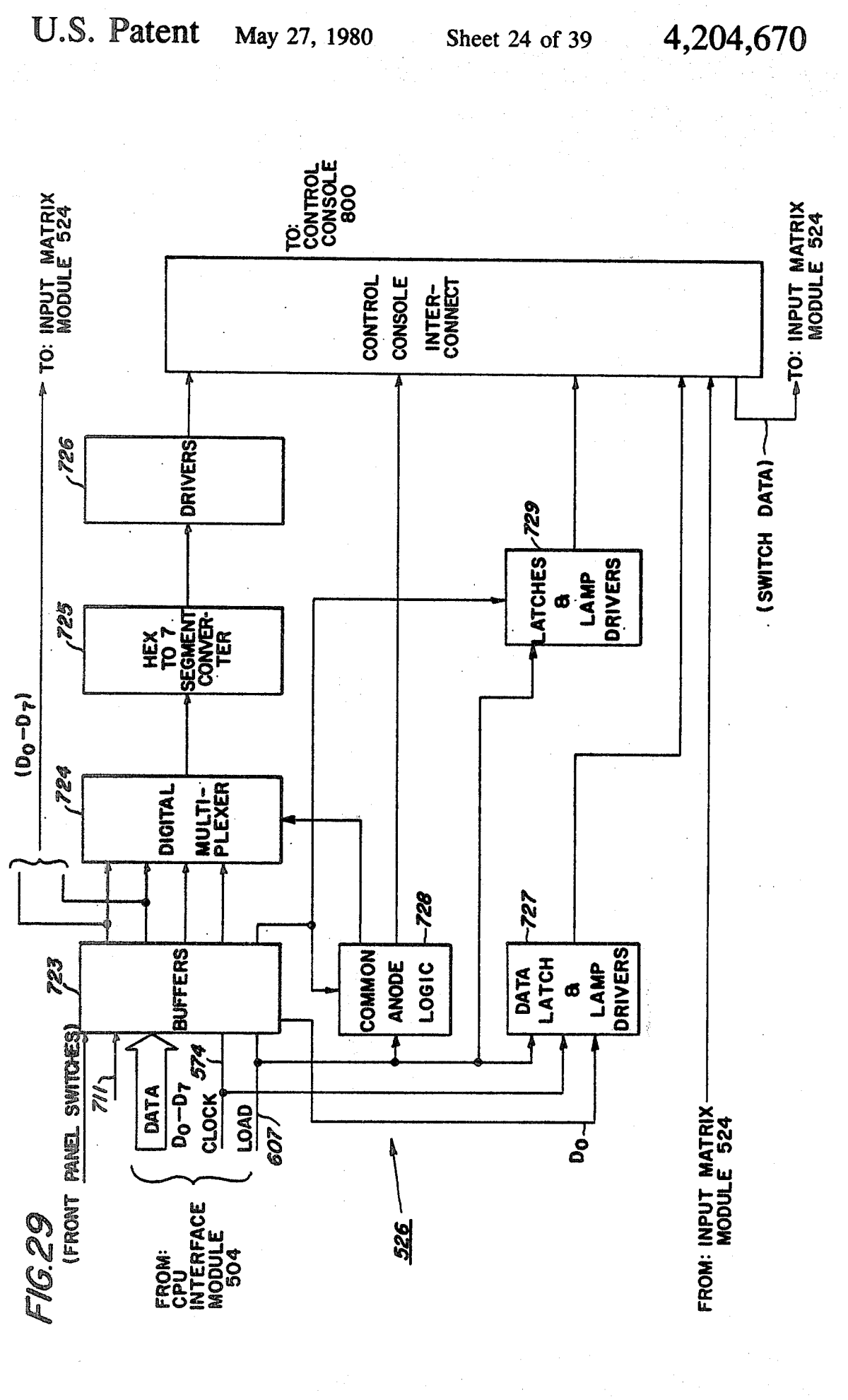

Referring particularly to FIG. 29, main panel interface module 526 serves as interface between CPU interface module 504 and operator control console 800 for display purposes and as interface between input matrix module 524 and the console switches. As described, data channels D0—D7 have data bits in each channel associated with the control console digital display or lamps. This data is clocked into buffer circuitry 723 and from there, for digital display, data in channels D1-D7 is inputted to multiplexer 724. Multiplexer 724 selectively multiplexes the data to HEX to 7 segment converter 725. Software controlled output drivers 726 are provided for each digit which enable the proper display digit in response to the data output of converter 725. This also provides blanking control for leading zero suppression or inter digit suppression.

Buffer circuitry 723 also enables through anode logic 728 the common digit anode drive. The signal (LOAD) to latch and lamp driver control circuit 729 regulates the length of the display cycle.

For console lamps 830, data in channel D0 is clocked to shift register 727 whose output is connected by drivers to the console lamps. Access by input matrix module 524 to the console switches and keyboard is through main panel interface module 526.

The machine output sections 530, 532, 534, 536, 538, 540 are interfaced with I/O module 502 by CPU interface module 504. At each interrupt/refresh cycle, data is outputted to sections 530, 532, 534, 536, 538, 540 at the clock signal rate in line 574 over data channels D2, D3, D4, D5, D6, D7 respectively.

Referring to FIG. 30, wherein a typical output section i.e. document handler section 530 is shown, data inputted to section 530 is stored in shift register/latch circuit combination 740, 741 pending output to the individual drivers 742 associated with each machine component. Preferably d.c. isolation between the output sections is maintained by the use of transformer coupled differential outputs and inputs for both data and clock signals and a shielded twisted conductor pair. Due to transformer coupling, the data must be restored to a d.c. waveform. For this purpose, control recovery circuitry 744, which may comprise an inverting/non-inverting digital comparator pair and output latch is provided.

The LOAD signal serves to lockout input of data to latches 741 while new data is being clocked into shaft register 740. Removal of the LOAD signal enables commutation of the fresh data to latches 741. The LOAD signal also serves to start timer 745 which imposes a maximum time limit within which a refresh period (initiated by Refresh Control 605) must occur. If refresh does not occur within the prescribed time limit, timer 745 generates a signal (RESET) which sets shift register 740 to zero.

With the exception of sorter section 534 discussed below, output sections 532, 536, 538 and 540 are substantially identical to document handler section 530.

Referring to FIG. 31 wherein like numbers refer to like parts, to provide capacity for driving the sorter bin deflector solenoids 217, a decode matrix arrangement consisting of a Prom encoder 750 controlling a pair of decoders 751, 752 is provided. The output of decoders 751, 752 drive the solenoids 217 for the bins 212 in upper and lower modules 210, 211 respectively in a timed sequence as will later be discussed. Data is inputted to encoder 750 by means of shift register 754. The control of module selection deflector solenoid 221 is accomplished without the use of decoders 751, 752 via shift register 740 and latch 741 as previously discussed.

Referring now to FIG. 32, control console 800 serves to enable the operator to program host machine 10 to perform the copy run or runs desired. At the same time, various indicators on console 800 reflect the operational condition of machine 10. Console 800 includes a bezel housing 802 suitably supported on host machine 10 at a convenient point with decorative front or face panel 803 on which the various machine programming buttons and indicators appear. Programming buttons include power on/off buttons 804, start print (PRINT) buttons 805, stop print (STOP) button 806 and keyboard copy quantity selector 808. A series of feature select buttons consisting of auxiliary paper tray button 810, two sided copy button 811, copy lighter button 814, and copy darker button 815, are provided.

Additionally, image size selector buttons 818, 819, 820; multiple or single document select buttons 822, 823 for operation of document handler 16; and sorter sets or stack buttons 825, 826 are provided as well as a module select button 821. An on/off service selector 828 is also provided for activation during machine servicing.

Indicators comprise program display lamps 830 and displays such as READY, WAIT, SIDE 1, SIDE 2, ADD PAPER, CHECK STATUS PANEL, PRESS FAULT CODE, QUANTITY COMPLETED, CHECK DOORS, UNLOAD AUX TRAY, CHECK DOCUMENT PATH, CHECK PAPER PATH, JOB INCOMPLETE and UNLOAD SORTER. Other display information may be envisioned.

MACHINE OPERATION

As will appear, host machine 10 is conveniently divided into a number of operational states. The machine master control program is divided into background routines and foreground routines with operational control normally residing in the background routine or routines appropriate to the particular machine state then in effect. The output buffer 546' of RAM memory section 546 is used to transfer/refresh control data to the various remote locations in host machine 10, control data from both background and foreground routines being inputted to buffer 546' for subsequent transmittal to host machine 10. Transmittal/refresh of control data presently in output buffer 546' is effected through Direct Memory access (DMA) under the aegis of a Machine Clock interrupt routine.

Foreground routine control data which includes a Run Event Table built in response to the particular copy run or runs programmed, is transferred to output buffer 546' by means of a multiple prioritized interrupt system wherein the background routine in process is temporarily interrupted while fresh foreground routine control data is inputted to buffer 546' following which the interrupted background routine is resumed.

The operating program for host machine 10 is divided into a collection of foreground tasks, some of which are driven by the several interrupt routines and others by background or non-interrupt routines. Foreground tasks are tasks that generally require frequent servicing, high speed response, or synchronization with the host machine 10. Background routines are related to the state of host machine 10, different background routines being performed with different machine states. A single background software control program (STCK) composed of specific sub-programs associated with the principal operating states of host machine 10 is provided. A byte called STATE contains a number indicative of the current operating state of host machine 10. The machine STATES are as follows:

| STATE NO. | MACHINE STATE | CONTROL SUBR. |
|---|---|---|
| 0 | Software Initialize | INIT |
| 1 | System Not Ready | NRDY |
| 2 | System Ready | RDY |
| 3 | Print | PRINT |
| 4 | System Running, Not Print | RUNNPRT |
| 5 | Service | TECHREP |

Referring to FIG. 33, each STATE is normally divided into PROLOGUE, LOOP and EPILOGUE sections. As will be evident the exemplary program STCK reproduced in TABLE I, entry into a given STATE (PROLOGUE) normally causes a group of operations to be performed, these consisting of operations that are performed once only at the entry into the STATE. For complex operations, a CALL is made to an applications subroutine therefor. Relatively simpler operations (i.e. turning devices on or off, clearing memory, presetting memory, etc.) are done directly.

Once the STATE PROLOGUE is completed, the main body (LOOP) is entered. The program (STCK) remains in the LOOP until a change of STATE request is received and honored. On a change of STATE request, the STATE EPILOGUE is entered wherein a group of operations are performed, following which the STATE moves into the PROLOGUE of the next STATE to be entered.

Referring to FIG. 34 and the exemplary program (STCK) in TABLE I. On actuation of the machine POWER-ON button 804, the software Initialize STATE (INIT) is entered. In this STATE, the controller is initialized and a software controlled self test subroutine is entered, If the self test of the controller is successfully passed, the System Not Ready STATE (NRDY) is entered. If not, a fault condition is signaled.

In the System Not Ready STATE (NRDY), background subroutines are entered. These include setting of Ready flags, control registers, timers, and the like; turning on power supplies, the fuser, etc., initializing the Fault Handler, checking for paper jams (left over from a previous run), door and cover interlocks, fuser temperatures, etc. During this period, the WAIT lamp on console 800 is lit and operation of host machine 10 precluded.

When all ready conditions have been checked and found acceptable, the controller moves to the system ready state (RDY). The READY lamp on console 800 is lit and final ready checks made. Host machine 10 is now ready for operation upon completion of the operator selecting the appropriate console buttons for the copy run desired, loading of one or more originals 2 into document handler 16 (if selected by the operator), and actuation of START PRINT button 8:5. As will appear hereinafter, the next state is PRINT wherein the particular copy run is carried out.

While the machine is completing a copy run, the controller 18 normally enters the Run Not Print state (RUNNPRT) where the controller calculates the number of copies delivered, resets various flags, stores certain machine event information in the memory, as well as generally conditioning the machine for another copy run, if desired. The controller then returns to the System Not Ready state (NRDY) to recheck for ready conditions prepatory for another copy run, with the same state sequence being repeated until the machine is turned off by actuation of POWER OFF button 804 or a malfunction inspired shutdown is triggerred. The last state (TECH REP) is a machine servicing state wherein certain service routines are made available to the machine/repair personnel, i.e. Tech Reps.

Referring particularly to FIG. 32 and Tables II, III, IV, V, VI and VII, the machine operator uses control console 800 to program the machine for the copy run desired. Programming may be done during either the System Not Ready (NRDY) or System Ready (RDY) states, although the machine will not operate during the System Not ready state should START PRINT button 805 be pushed. The copy run includes selecting (using keyboard 808) the number of copies to be made, and such other ancillary program features as may be desired, i.e. use of auxiliary paper tray 102, (push button 810), image size selection (push buttons 818, 819, 820), document handler/sorter selection (push buttons 821, 822, 823, 825, 826), copy density (push buttons 814, 815), duplex or two sided copy button 811, etc. On completion of the copy run program, START PRINT button 805 is actuated to start the copy run programmed (presuming the READY lamp is on and an original or originals 2 have been placed in tray 233 of document handler 16 if the document handler has been selected).

With programming of the copy run instructions, controller 18 enters a Switch Scan routine in which the program information is transferred to RAM section 546. The copy run program data passes via Main Panel Interface Module 526 to Input Matrix Module 524 and from there is addressed through Matrix Input Select 604, Multiplexer 624, and Buffers 620 of I/O Module 502 to RAM section 546 of CPU Module 500.

On entering PRINT STATE, a Run Event Table (FIG. 35) comprised of foreground tasks is built for operating in cooperation with the background tasks the various components of host machine 10 in an integrated manner to produce the copies programmed. The run Event Table is formed by controller 18 through merger of a Fixed Pitch Event Table (TABLE II) (stored in ROM 545 and Non Volatile Memory 610) and a Variable Pitch Event Table (TABLE III) in a fashion appropriate to the parameters of the job selected.

The Fixed Pitch Event Table (TABLE II) is comprised of machine events whose operational timing is fixed during each pitch cycle such as the timing of bias to transfer roll 75, (TRN 2 CURR), actuating toner concentration sensor 65 (ADC ACT), loading roll 161 of fuser 150 (FUS*LOAD), and so forth, irrespective of the particular copy run programmed. The Variable Pitch Table (TABLE III) is comprised of machine events whose operational timing varies with the individual copy run programmed, i.e. timing of pitch fade-out lamp 44 (FO*ONBSE) and timing of flash illumination lamps 37 (FLSH BSE). The variable Pitch Table is built by the Pitch Table Builder (TABLE IV) from the copy run information programmed in by controller 18 (using the machine control program store in ROM section 545 and Non-Volatile Memory 610), coupled with event address information from ROM section 545, sorted by absolute clock count (via the routine shown in TABLE V), and stored in RAM section 546 (via the routine shown in TABLE VI). The Fixed Pitch Event Table and Variable Pitch Table are merged with the relative clock count differences between Pitch events calculated to form a Run Event Table (TABLE VII).

Referring particularly to FIG. 35, the Run Event Table consists of successive groups of individual events 851. Each event 851 is comprised of four data blocks, data block 852 containing the number of clock pulses (from machine clock 202) to the next scheduled pitch event (REL DIFF), data block 853 contaning the shift register position associated with the event (REL SR), and data blocks 854, 855 (EVENT LO) (EVENT HI) containing the address of the event subroutine.

In machine states other than PRINT, data blocks 852, 853 (REL DIFF) (REL SR) are set to zero. Data blocks 854, 855 hold the address information for the Non-Print state event.

Control Data in the Run Event Table represents a portion of the foreground tasks and is transferred to the output buffer 546' of RAM memory section 546 by the Pitch Reset and Machine Clock interrupt routines. Other control data, representing foreground tasks not in the Run Event Table is transferred to RAM output buffer 546' by the Real Time Clock interrupt routine. Transfer of the remainder of the control data to output buffer 546' is by means of background (non-interrupt) routines.

Transfer of control data from output buffer 546' of RAM memory section 546 to the various locations in host machine 10 is through output Refresh via Direct Memory access (DMA) in response to machine clock interrupt signals as will appear. The interrupt routines are initiated by the respective interrupt signals.

Referring particularly to FIG. 23 and 35–37 and TABLES VII, VIII the interrupt having the highest priority, the Pitch Reset interrupt (signal 640), is operable only during the PRINT state, and occurs once each revolution of sheet register fingers 141 as responded to by sensor 146 of pitch reset clock 138. At each pitch reset interrupt signal, after a determination of priority by Priority Chip 659 in the event of multiple interrupt signals, an interrupt signal (INT) is generated. The acknowledgement signal (INTA) from processor 542 initiates the pitch reset interrupt routine.

On entering the pitch reset routine, the interrupt is re-enabled and the contents of the program working registers stored. A check is made to determine if building of the Run Event Table is finished. Also checks are made to insure that a new shift register schedules have been built and at least 910 clock counts since the last pitch reset have elapsed. If not, an immediate machine shutdown is initiated.

Presuming that the above checks are satisfactory, the shift register pointer (SR PTR), which is the byte variable containing the address of a pre-selected shift register position (SR O), is decremented by one and adjusted for overflow and the shift register contents are updated with a byte variable (SR+VALUV) containing the new shift register value to be shifted in following the pitch reset interrupt. The event pointer (EV*PTR), a two byte variable containing the full address of the next scheduled event, is reset to Event #1. The count in the C register equals the time to the first event.

Machine Cycle Down, Normal Down, and Side One Delay checks are made, and if negative, the count on a cycle up counter (CYC UP CT) is checked. If the count is less than a predetermined control count (i.e. 5), the counter (CYC UP CT) is incremented by one. When the count on the cycle up counter equals the control count, an Image Made Flag is set.

If a Normal Down, Cycle Down, or Side One Delay has been inititated, the cycle up counter (CYC UP CT) is reset to a preset starting count (i.e. 2). The pitch reset interrupt routine is exited with restoration of the working registers and resetting of pitch reset flip flop 647.

The Machine Clock Interrupt routine, which is second in priority, is operative in all operational states of host machine 10. Although nominally driven by machine clock 202, which is operative only during Print state when processor main drive motor 34 is energized, machine clock pulses are also provided by phase locked loop 649 when motor 34 is stopped.

Referring particularly to FIG. 38 and TABLE IX, entry to the Machine Clock interrupt routine there shown is by a signal (INTA) from processor 542 following a machine clock interrupt signal 642 as described earlier. On entry, the event control register (C REG) is obtained and the working register contents stored. The C REG is decremented by one, the register having been previously set to a count corresponding to the next event in the Event Run Table.

The control register (C REG) is checked for zero. If the count is not zero and is an odd number, an output refresh cycle is initiated to effect transfer/refresh of data in RAM output buffer 546' to host machine 10. If the number is even, or following an output refresh, the interrupt system is re-enabled, the machine clock interrupt flip flop 651 is reset and the working registers are restored. Return is then made to the interrupted routine.

If the control register (C REG) count is zero, the Event Pointer (EV*PTR), which identifies the clock count (in data block 852) for the next scheduled event (REL DIFF), is loaded and the control register (C REG) reset to a new count equal to the time to the next event. The Event Pointer (EV*PTR) is incremented to the relative shift register address for the event (REL SR, data block 853), and the shift register address information is set in appropriate shift registers (B, D, E, A registers).

The event Pointer (EV*PTR) is incremented successively to the event subroutine address information (EVENT LO) (EVENT HI) in the Event Run Table, and the address information therefrom loaded into a register pair (D & E registers). The Event Pointer (EV PTR) is incremented to the first data block (REL DIFF) of the next succeeding event in the Run Event Table, saved, and the register pair (H & L registers) that comprise the Event Pointer are loaded with the event subroutine address from the register pair (D & E registers) holding the information. The register pair (D & E registers) are set to the return address for the Event Subroutine. Using the address information, the Event Subroutine is called and the subroutine data transferred to RAM output buffer 546' for transfer to the host machine on the next Output Refresh.

Following this, the Machine Clock interrupt routine is exited as described earlier.

The Output Refresh cycle alluded to earlier functions, when entered, to transfer/refresh data from the output buffer of 546' RAM section 546 to host machine 10. Direct Memory Access (DMA) is used to insure a high data transfer rate.

On a refresh, Refresh Control 605 (see FIG. 23) raises the HOLD line to processor 542, which on completion of the operation then in progress, acknowledges by a HOLD A signal. With processor 542 in a hold mode and Address and Data buses 507, 508 released to I/O Module 502 (through operation of tri-state buffers 510, 511, 563, 570), the I/O module then sequentially accesses the output buffer 546' of RAM section 546 and transfers the contents thereof to host machine 10. Data previously transferred is refreshed.

The Real Time Interrupt, which carries the lowest priority, is active in all machine states. Primarily, the interrupt acts as an interval timer by decrementing a series of timers which in turn serve to control initiation of specialized subroutines used for control and error checking purposes.

Figure 39B:
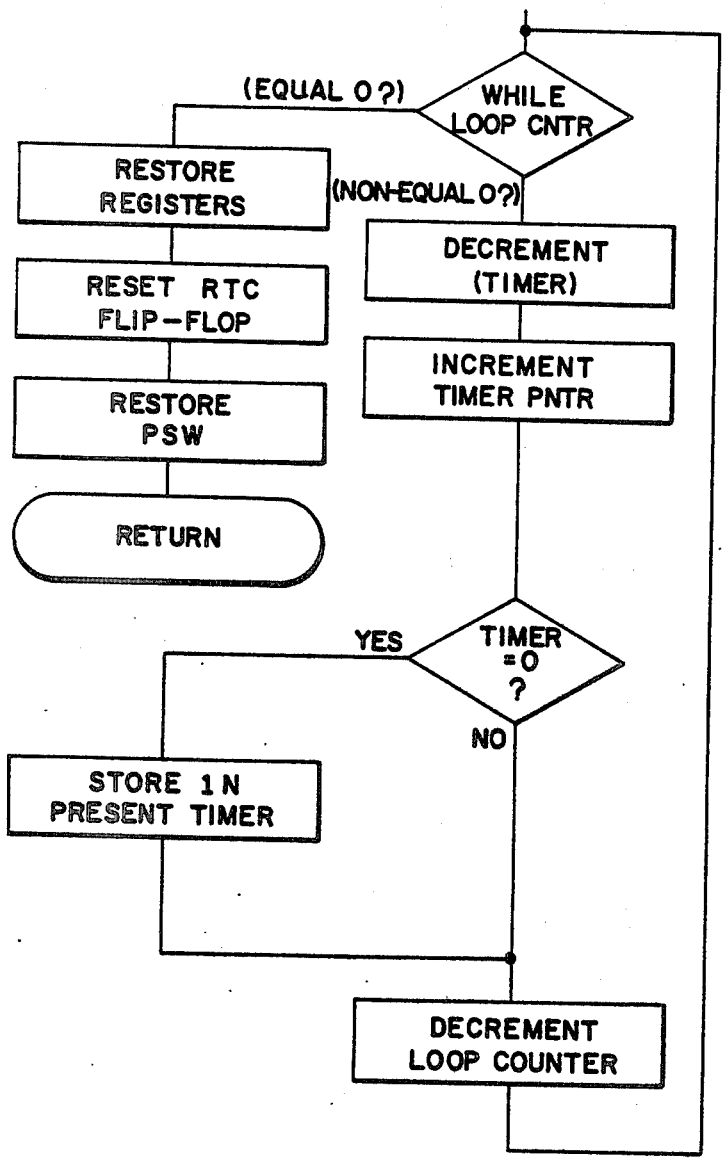
FIGS. 39$a$ and 39$b$ comprise a flow chart of the real time interrupt routines.

Referring particularly to FIG. 39 and TABLE X, the Real Time interrupt routine is entered in the same manner as the interrupt routines previously described, entry being in response to a specific RESTART instruction code assigned to the Real Time interrupt. On entry, the interrupt is re-enabled and the register contents stored. The timer pointer (PNTR) for the first class of timers (i.e. 10 msec TIMERS) is loaded, and a loop counter identifying the number of timers of this class (i.e. 10 msec TIMERS) preset. A control register (E REG) is loaded and a timer decrementing loop is entered for the first timer. The loop decrements the particular timer, increments the timer pointer (PNTR) to the location of the next timer in this class, checks the timer count, and decrements the loop counter. The decrementing loop routine is repeated for each timer in the class (i.e. 10 msec TIMERS) following which a control counter (CNTR) for the second group of timers (i.e. 100 msec TIMERS) is decremented by one and the count checked.

The control counter (CNTR) is initially set to a count equal to the number of times the first timer interval is divisible into the second timer interval. For example, if the first class of timers are 10 msec timers and the second timer class are 100 msec timers, the control counter (CNTR) is set at 10 initially and decremented on each Real Time interrupt by one down to zero.

If the count on the control counter (CNTR) is not zero, the registers are restored, Real Time interrupt flip flop 856 reset, and the routine exited. If the count on the control counter is zero, the counter is reloaded to the original maximum count (i.e. 10) and a loop is entered decrementing individually the second group of timers (i.e. 100 msec TIMERS). On completion, the routine is exited as described previously.

In the following TABLES:

"@"-is used to indicate flags, counters and subroutine names.

"#"-is used to indicate input signals.

"$"-is used to indicate output signals.

":"-is used to indicate macro instructions, system subroutines, system flags, and data, ect.

For further explanation of the mnemonics and particular instructions utilized by the following routines, the reader is directed to Intel Corporation's Programming Manual for the 8080 Microcomputer System.

TABLE I

```
99                         *NAR
100                         *
101                         *     I N I T I A L I Z E   S T A T E
102                         *
103                         *  INIT: SUBROUTINE
104                         *
105                         *  INITIALIZE STATE- EXECUTED AFTER EACH START OR RESTART.  SETS
106                         *  ALL POINTERS, FLAGS, AND DATA TO INITIAL VALUES REQUIRED TO
107                         *  START EXECUTION OF ANY CONTROL ALGORITHMS.  ALWAYS EXITS TO
108                         *  'NOT READY' STATE.
110                         *  EPILOG
112  05 00000  3E0A   A  INIT:  MVI   A,10
113  05 00002  3252FD  N         STA   DIVD:10              INITIALIZE TO 10
114  05 00005  32E5FC  N         STA   SLOWTOGL             INITIALIZE TO 10
115  05 00008  211907  N         LXI   H,EV&STBY:           H&L= ADDR OF STBY EVENT TABLE
116  05 0000B  2264FD  N         SHLD  EV@PTR:              SAVE FOR MACH CLK ROUTINE
117  05 0000E  21FFFF  A         LXI   H,X'FFFF'            INIT INSTRUMENTATION REMOTE
118  05 00011  2272FB  N         SHLD  INS@PTR              ADDR PNTR TO END OF RAM
119  05 00014  21FFFF  A         LXI   H,ADH@ROMT-1         SET PNTR TO RAM CNTRL TABLE
120  05 00017  2278FB  N         SHLD  TAB@STRT             SAVE PNTR
121  05 0001A  3E7F   A         MVI   A,X'7F'              INIT TO UN-BYPASS
122  05 0001C  32BDFC  N         STA   JAM@BYPS                  ALL JAM SWS
123                         *
124                         *  TIMER INITIALIZATION
125                         *  MUST BE DONE BEFORE ANY TIMERS CAN BE USED
126                         *
127  05 0001F  211FF9  A         LXI   H,AVAIL:=0*8+X'1F'   SET H&L TO END OF AVAIL: TABLE
128  05 00022  36FF   A         MVI   M,X'FF'              STORE X'FF' IN LAST TABLE ADDR
129  05 00024  3E1F   A         MVI   A,31                 SET A-REG TO VALUE TO BE STORED
130                         RFPEAT
131  05 00026  2D     A         DCR   L                    STEP TO NEXT TABLE LOCATION
132  05 00027  77     A         MOV   M,A                  STORE INITIALIZATION VALUE
133  05 00028  3D     A         DCR   A                    STEP TO NEXT VALUE
134  05 00029  C22600  N         UNTIL: CC,Z,S              IS INITIALIZATION COMPLETE
135  05 0002C  2120FE  A         LXI   H,ADR(DATA,TIME:OUT) TO INITIALIZE TIME:OUT TABLE
136  05 0002F  225FFD  N         SHLD  INPTR:               SET IN/OUT POINTERS TO
137  05 00032  2261FD  N         SHLD  OUTPTR:              BEGINNING OF TIME:OUT TABLE
138                         *
139                         *  INITIALIZE SPOOL
140                         *  POINTERS
141                         *
142  05 00035  2140FE  A         LXI   H,ADR(DATA,SPL:TBL)  SET PNTRS
143  05 00038  226AFD  N         SHLD  SPL:IN                        TO START
144  05 0003B  226CFD  N         SHLD  SPL:OUT                                 OF TABLE
145
```

```
146
147                              * CHECK IF PAPER WAS PRESENT WHEN POWER WENT DOWN
148  05 0003E  3AC9E2  A   RNVNIB    NVØJAMØN                    A = JAM INFØ FRØM POWER DOWN
149  05 00041  OF      A   RRC                                   SET CARRY TØ FOR JAM INFØ
150  05 00042  D25A00  N   IFI       CC,C,S                      WAS THERE PAPER IN FDR AREA
151  05 00045  47      A       MOV       B,A                     YES, SAVE JAM INFØ
152  05 00046  213CFD  A       SFBIT,P   FDRØAJAM,FDRØMJAM       SET FEEDER JAMS
     05 00049  3E0C    A
     05 0004B  B6      A
     05 0004C  77      A
153  05 0004D  2121F9  A       SFBIT,P   ØNØXØ2,ØNØXØ3           SIGNAL TRANSPT CLIRANCE REQID
     05 00050  3E03    A
     05 00052  B6      A
     05 00053  77      A
154  05 00054  3E80    A       SFLG      CLPØREQD                TELL FLT HNDLR CLEARANCE REQD
     05 00056  3267F4  A
155  05 00059  78      A       MOV       A,B                     RESTORE THE A-REG
156                          ENDIF
157  05 0005A  OF      A   RRC                                   SET CARRY TØ IMEDØDNI
158  05 0005B  D27100  N   IFI       CC,C,S                      WAS THERE AN IMEDØDNI
159                          *
160                              MVI       L,MSK(FBIT,LØPRØFLT,JAM2ØFLT,JAM3ØFLT,JAM4ØFLT,,
161  05 0005E  2EFF    A                   JAM5ØFLT,JAM6ØFLT,RET1ØFLT,RET2ØFLT)
162                          *                                   SETS ALL JAM FBITS IN REG-L
163  05 00060  2603    A       MVI       H,MSK(FBIT,SØSØJAM,MISSTRIP)
164                          *                                   SETS ADDITIONAL FBITS IN H
165  05 00062  223BFD  A       SHLD      ADR(FBYT,PAP(1)         MOVE FBITS INTØ FBYTES
166  05 00065  3E80    A       SFLG      CLRØREQD                TELL FLT HNDLR CLEARANCE REQD
     05 00067  3267F4  A
167  05 0006A  2120F9  A       SFBIT,P   TSØFUS,TSØXØ2           TURN ON UNDEDICATED MAP LAMPS
     05 0006D  3E21    A
     05 0006F  B6      A
     05 00070  77      A
168                          ENDIF
169                          IFI       XBYT,A,AND,,              IS EITHER SRT JAM FLAG SET
170  05 00071  E60C    A                MSK(NVBIT,NVØLØWØJ,NVØUPØJ),NZ 'IN NVNIB
     05 00073  CA8A00  N
171                              IFI       XBYT,A,EQ,,           YES, ARE BØTH SET
172  05 00076  FE0C    A                    MSK(NVBIT,NVØLØWØJ,NVØUPØJ)
     05 00078  C28300  N
173  05 0007B  3E80    A           SFLG      TWØØACT             TELL SRT THAT THERE WAS A JAM
     05 0007D  3261F4  A
174  05 00080  C3A700  N       ELSE:
175  05 00083  OF      A           RRC                           GET NVØLØWØJ TØ SIGN BIT &
176                                  ID:READ    NVØLØWØJ
177  05 00084  3237F4  A           MØDFLG     LØWØMØD            TELL SRT IF UP ØR LOW JAM
178                          ENDIF
179  05 00087  CD0000  N       CALL      JAMØSET                 LET SRT SET JAM FLAGS & LAMPS
180                          ENDIF
181  05 0008A  3E80    A   SFLG      SRTØRDY                     SIGNAL SRT NOT IN USE (READY)
     05 0008C  328CF7  A
182  05 0008F  3287F7  A   MØDFLG    PRØGØRDY                    SET PRØG RØUTINE READY
183  05 00092  326BF4  A   MØDFLG    2SDØENAB                    ALLØW SELECTIØN OF DUPLEX MODE
184  05 00095  3EF2    A   MVI       A,X'F2'                     RE-ENAPLE
185  05 00097  3200E6  A   STA       RSINTFFI                    INTERRUPT
186  05 0009A  FB      A   EI                                    SYSTEM
187  05 0009B  CD0000  N   SØBIT,S   NPFØ$ØN,24V$SPL             PFØ ØFF (INVT'D) & 24V ØN
     05 0009E  02      A
     05 0009F  E480    A
     05 000A1  EE80    A
188  05 000A3  CD0000  N   STIHR     FLTØDLY,25000,FLTØCHK       START LENS FAULT TIMER
     05 000A6  12      A
     05 000A7  FA      A
     05 000A8  00C0    N
189  05 000AA  CD0000  N   CALL      DØCØCLP                     INITIALIZE DØCØNUM TØ 1    (1)
190  05 000AD  327AFC  N   STA       ØFØDIGIT                    ENABLE '0' IN QTY FLASHED  (2)
191  05 000B0  3E08    A   MVI       A,MSK(FBIT,PØPØRS)          TELL FLT ASSUME
192  05 000B2  3286FC  N   STA       XPØPREV                     BRUSH HØUSE ØPN
193  05 000B5  3E02    A   MVI       A,!NRDY                     INIT STCK
194  05 000B7  3254FD  N   STA       1STATE1                     SYNCRØNIZED BACKGROUND
195  05 000BA  3253FD  N   STA       STATE1                      CONTRØL LØØP
196  05 000BD  CD3702  N   CALL      NRDY:PRL                    INIT CØNTRØL TØ NØT-READY STATE

198                          **************************************************************
199                          *                                                            *
200                          *  SYCRØNIZED   BACKGRØUND   CØNTRØL   LØØPS                 *
201                          *                                                            *
202                          **************************************************************

204                          *   PRIØRTIES:
205                          *       FIRST      10MS TIME ØUT REQUESTS
206                          *       SECØND     10MS CALLS
207                          *       THIRD      SPØØLED CALLS
208                          *       FØURTH     20MS CALLS
209                          *       FIFTH      100MS CALLS
210                          *       SIXTH      100MS TIME ØUT REQUESTS 212  05 000C0  2151FD  A   LXI       H,ADR(DATA,SB:RCST)         SET MEM PNTR TØ SB BYTE
213                          REPEAT                              LØØP-3 FRØM HLT ØN ALL INTER'S
214                              REPEAT                          LØØP-2 BACK AFTER EACH 100MS
215                                  REPEAT                      LØØP-1 BACK AFTER EACH 20MS
216  05 000C3  7E      A               MOV       A,M             A= SYNC BKGND REQUESTS FRØM RTC
217                                      ID:READ   SB:RQST
218  05 000C4  07      A               RLC                       TEST FOR 10MS
219  05 000C5  D2F700  N               IFI       CC,C,S          SB REQUEST
220                                  *
221                                  *                           TIMER SERVICE REQUESTS
222                                  *                           CALLS TIMED ØUT TIMER SUBRS
223                                  *                           USING WRAP ARRØUND TABLE AND
224                                  *                           IN/ØUT PNTRS - RTCI SETS
225                                  *                           INPTR: & ENTERS CALL ADDR
226
227  05 000C8  3A5FFD  N                   WHILE:   XBYT,INPTR:,NE,ØUTPTR: ARE PNTRS AT SAME TABL
     05 000CB  2161FD  N
     05 000CE  BE      A
     05 000CF  CAE500  N
```

```
228   05 000D2   6E       A              MOV     L,M           SET L-REG TO ADDR(L) IN TABLE
229   05 000D3   26FE     A              MVI     H,HADR(DATA,TIME:OUT) MEM PNTR NOW SET TO
230   05 000D5   5E       A              MOV     E,M             MOVE CALL ADDR(L) TO E
231   05 000D6   23       A              INX     H             STEP TO NEXT TABLE BYTE
232   05 000D7   56       A              MOV     D,M           MOVE CALL ADDR(H) TO D
233   05 000D8   23       A              INX     H             STEP TO NEXT TABLE BYTE
234   05 000D9   7D       A              MOV     A,L           PREPARE TO UPDATE PNTR
235                                      ID:READ TIME:OUT      DYNAMIC TABLE CONTAINING ADDRS
236                                      MODBYT  A,AND,J       ADJUST FOR END OF TABLE
                                                 TIME:MSK
237   05 000DA   E62F     A              STA     ADR(DATA,OUTPTR:) PNTR TO ADDR OF LAST SE
238   05 000DC   3261FD   A              CALL    DE:IND        DO TIMEOUT CALL
239   05 000DF   CD0000   N              ENDWHILE              YES, ALL TIME PUTS SERVICED
240   05 000E2   C3C800   N                                    END TIMER SECTION
241
242   05 000E5   2A55FD   N              LHLD    10:CALLS      GET PROPER 10MS CALL TABLE
243   05 000E8   CDC000   N              CALL    HL:IND        DO 10MS CALLS
244   05 000EB   2151FD   N              LXI     H,ADR(DATA,SB:RQST) SET MEM PNTR TO SB BYTE
245   05 000EE   F3       A              DI
246   05 000EF   7E       A              MODBYT  M,AND, 10:RQST REMOVE 10MS REQUEST
      05 000F0   E67F     A
      05 000F2   77       A
247                                      ID:ALTR  SB:RQST
248   05 000F3   FB       A              EI                    (WATCH OUT FOR UNPRINTABLE NOT)
249   05 000F4   C31501   N              ELSE:                 DO ANY SPOOLED ROUTINES
250   05 000F7   3A6AFD   N              IF:     XBYT,SPL:IN,NE,SPL:OUT
      05 000FA   216CFD   N
      05 000FD   BE       A
      05 000FE   CA1101   N
251   05 00101   6E       A              MOV     L,M
252   05 00102   26FE     A              MVI     H,HADR(DATA,SPL:TBL)
253   05 00104   5E       A              MOV     E,M
254   05 00105   23       A              INX     H
255   05 00106   56       A              MOV     D,M
256   05 00107   23       A              INX     H
257   05 00108   7D       A              MOV     A,L
258   05 00109   E64F     A              MODBYT  A,AND,SPL:MSK
259   05 0010B   326CFD   A              STA     ADR(DATA,SPL:OUT)
260   05 0010E   CD0000   N              CALL    DE:IND
261                                      ENDIF
262   05 00111   2151FD   A              LXI     H,ADR(DATA,SB:RQST)
263   05 00114   7E       A              MOV     A,M
264                                      ENDIF
265                                      ID:READ  SB:RQST
266   05 00115   07       A              RLC
267   05 00116   07       A              RLC                   TEST FOR 20MS
268   05 00117   D24201   N              IF:     CC,C,S        SB REQUEST
269   05 0011A   2A59FD   N              LHLD    20PNTR        SET MEM PTR TO CALL IN 20MS TAB
270   05 0011D   5E       A              MOV     E,M           MOVE CALL ADDR(L) TO E
271   05 0011E   23       A              INX     H             STEP MEM PTR TO ADDR(H)
272   05 0011F   7E       A              IF:     XBYT,M,EQ,X'FF' IS POINTER AT END OF TABLE
      05 00120   FEFF     A
      05 00122   C23701   N
273   05 00125   2A57FD   N              LHLD    20:PNTR       YES, SET MOVING POINTER
274   05 00128   2259FD   N              SHLD    20PNTR        BACK TO BEGINNING OF TABLE
275   05 0012B   2151FD   N              LXI     H,ADR(DATA,SB:RQST)  SET MEM PNTR TO
276   05 0012E   F3       A              DI
277   05 0012F   7E       A              MODBYT  M,AND, 20:RQST REMOVE 20MS REQUEST
      05 00130   E6BF     A
      05 00132   77       A
278                                      ID:ALTR  SB:RQST
279   05 00133   FB       A              EI
280   05 00134   C34201   N              ELSE:
281   05 00137   56       A              MOV     D,M           NO, MOVE CALL ADDR(H) TO D
282   05 00138   23       A              INX     H             STEP TO NEXT CALL IN TABLE
283   05 00139   2259FD   N              SHLD    20PNTR        SAVE FOR NEXT LOOP-1
284   05 0013C   CD0000   N              CALL    DE:IND
285   05 0013F   2151FD   A              LXI     H,ADR(DATA,SB:RQST) SET MEM PNTR TO SB BY
286                                      ENDIF
287                                      ENDIF
288   05 00142   7E       A              UNTIL:   XBYT,M,AND,20:RQST,Z  MORE 20MS CALLS TO DO  (LOOP-1)
      05 00143   E640     A
      05 00145   C2C300   N
289                                      ID:READ  SB:RQST
290   05 00148   7E       A              IF:     XBYT,M,AND,100:RQST,NZ TEST FOR 100MS SB REQUEST
      05 00149   E620     A
      05 0014B   CA9E01   N
291                                      ID:READ  SB:RQST
292   05 0014E   2A5DFD   N              LHLD    100PNTR       SET MEM PNTR TO CALL IN 100 TAB
293   05 00151   5E       A              MOV     E,M           MOVE CALL ADDR(L) TO E
294   05 00152   23       A              INX     H             STEP MEM PNTR TO ADDR(H)
295   05 00153   7E       A              IF:     XBYT,M,EQ,X'FF' IS PNTR AT END OF TABLE
      05 00154   FEFF     A
      05 00156   C29301   N
296   05 00159   2A5BFD   N              LHLD    100:PNTR      YES, SET MOVING PNTR BACK
297   05 0015C   225DFD   N              SHLD    100PNTR       TO BEGINNING OF TABLE
298
299                                                            100MS TIMER SERVICE
300                                                            DECREMENTS TIMERS AND CALLS
301                                                            SUBROUTINE REQUESTED WHEN
302                                                            TIMER TIMES OUT
303                                                            USES 3 TABLES ON 3 CONSECUTIVE
304                                                            RAM PAGES -100:CNT W/TIMER
305                                                                      -100:LS W/ADDR(L)
306                                                                      -100:LS W/ADDR(H)
307                                                            ADDR IS FOR REQSTED SUBR
308
309   05 0015F   2130FA   N              LXI     H,100:CNT     STARTING ADDR OF 100MS TIMERS
310   05 00162   1614     A              MVI     D,100:TMAX    D-REG SET TO QTY OF 100MS THRS
312                                                            CONDITIONAL HOLD OF 100MS TMRS
314   05 00164   3A45FD   A              IF:     FBIT,STDBOPNO,T IS STAND-BY RELAY OPEN
      05 00167   E640     A
      05 00169   CA6E01   N
315                                      MVI     D,100:TMAX;   YES, HOLD SPECIFIED NUMBER
```

```
316   05 0016C   1611      A                                          -HOLDTMRS              OF TIMERS
317                                                        ENDIF
318                                          *
319                                                        REPEAT                 LOOP TO DECR & SERVICE TIMEOUTS
320   05 0016E   7E        A                                   IF:     VBYT,M,NZ IS TIMER ACTIVE
      05 0016F   A7        A
      05 00170   CA8201    N
321   05 00173   35        A                                       DCR       M         DECR TIMER
322   05 00174   C28201    N                                       IF:     CC,Z,S HAS TIMER TIMED OUT
323   05 00177   D5        A                                              PUSH    D       SAVE # TIMERS TO SERVICE
324   05 00178   E5        A                                              .PUSH   H       SAVE ADDR OF CURRENT TIMER
325   05 00179   24        A                                              INR     H       STEP TO NEXT RAM PAGE
326   05 0017A   5E        A                                              MOV     E,M     MOVE CALL ADDR(L) TO E
327   05 0017B   24        A                                              INR     H       STEP TO NEXT RAM PAGE
328   05 0017C   56        A                                              MOV     D,M     MOVE CALL ADDR(H) TO D
329   05 0017D   CD0000    N                                              CALL    DE:IND
330   05 00180   E1        A                                              POP     H       RECALL ADDR OF CURRENT THR
331   05 00181   D1        A                                              POP     D       RECALL NUMBER OF TIMERS
332                                          *                                                    YET TO BE SERVICED
333                                                                ENDIF
334                                                        ENDIF
335   05 00182   23        A                                   INX     H       STEP TO NEXT TIMER ADDR
336   05 00183   15        A                                   DCR     D       DECR NUMBER OF 100MS TIMERS
337   05 00184   C26E01    N                               UNTIL:  CC,Z,S    HAVE ALL TIMERS BEEN SERVICED
338                                          *                                              END 100MS TIMER SECTION
339   05 00187   2151FD    A                                   LXI     H,ADR(DATA,SB:RQST) SET MEM PNTR TO SB BYTE
340   05 0018A   F3        A                                   DI
341   05 0018B   7E        A                                   MODBYT  M,AND, 100:RQST REMOVE 100MS REQUEST
      05 0018C   E60F      A
      05 0018E   77        A
342                                                                ID:ALTR  SB:RQST
343   05 0018F   FB        A                                   EI
344   05 00190   C39E01    N                               ELSE:
345   05 00193   56        A                                   MOV     D,M     NO, MOVE CALL ADDR(H) TO D
346   05 00194   23        A                                   INX     H       STEP PNTR TO NEXT CALL
347   05 00195   2250FD    N                                   SHLD    100PNTR  SAVE FOR NEXT LOOP-2
348   05 00198   CD0000    N                                   CALL    DE:IND
349   05 0019B   2151FD    A                                   LXI     H,ADR(DATA,SB:RQST) SET MEM PNTR TO SB BYTE
350                                                        ENDIF
351                                          *          ENDIF
352   05 0019E   7E        A                               UNTIL:    VBYT,M,Z                MORE SB CALLS TO DO (LOOP-2)
      05 0019F   A7        A
      05 001A0   C2C300    N
353                                                 ID:READ  SB:RQST
354   05 001A3   76        A                        HLT                                    COOL IT UNTIL INTERRUPT RESTART
355   05 001A4   CAC300    N                        UNTIL:    CC,Z,C                       WAS INTERRUPT RTC (LOOP-3)
356   05 001A7   F3        A                        DI                                     ONLY KIDDING BEFORE, BUT THIS
357   05 001A8   76        A                        HLT                                    TIME REALLY STOP (ABORT)
359                                          *
360                                          *         SUBR TO SET CALL TABLE POINTERS
361                                          *         CALLED BY EACH STATE PROLOG
362                                          *
363                                          *         POSITION SB:TABLE POINTER
364                                          *
365   05 001A9   3A53FD    N      SB:PNTRS  LDA       STATE:                WHAT STATE IS WANTED
366   05 001AC   110600    A                LXI       D,X'06'               LOAD D&E WITH SKIP NUMBER
367   05 001AF   210501    N                LXI       H,SB:TABLE-X'06'      H&L=6'<' TABLE ADDR
368                                         REPEAT
369   05 001B2   19        A                  DAD     D                    SKIP THREE WORDS
370   05 001B3   3D        A                  DCR     A                    DECR STATE LOOP COUNTER
371   05 001B4   F28201    N                UNTIL:    CC,S,S                IS POINTER AT CORRECT STATE
372                                         *
373                                         *         TRANSFER ADDRS TO VARIABLE SB POINTERS
374                                         *
375   05 001B7   1155FD    N                LXI       D,10:CALLS            SET D&E TO FIRST OF SB PNTRS
376   05 001BA   0602      A                MVI       B,2                   LOAD 10:CALLS
377   05 001BC   CDCE01    N                CALL      MVIWORDS                      & 20:PNTR
378   05 001BF   2B        A                DCX       H                     ADJUST 'FROM' PNTR
379   05 001C0   2B        A                DCX       H                                   BACK 1 WORD
380   05 001C1   0602      A                MVI       B,2                   LOAD 20PNTR
381   05 001C3   CDCE01    N                CALL      MVIWORDS                     & 100:PNTR
382   05 001C6   2B        A                DCX       H                     ADJUST 'FROM' PNTR
383   05 001C7   2B        A                DCX       H                                   BACK 1 WORD
384   05 001C8   CDCC01    N                CALL      MVIWORD               LOAD 100PNTR
385                                                   ID:ALTR   10:CALLS,20:PNTR,20PNTR,:  DATA WORDS MODIFIED
386                                                             100:PNTR,100PNTR                BY THIS SUBR
387   05 001CB   C9        A                RET
388                                    *NAR
389                                         *
390                                         *         MVIWORD/MVIWORDS SUBROUTINES
391                                         *
392                                         *         SUBR TO TRANSFER WORDS (2BYTES) FROM MEMORY POINTED TO BY <H&L>
393                                         *         TO MEMORY POINTED TO BY <D&E>. CALL MVIWORD FOR 1 TRANSFER,
394                                         *         AND CALL MVIWORDS (WITH B-REG # WORDS TO TRANSFER) FOR
395                                         *         MULTIPLE TRANSFERS. USES ALL BUT C-REG.
396                                         *
397   05 001CC   0601      A      MVIWORD   MVI       B,1                   B= # WORDS TO BE MOVED
398                                         MVIWORDS  REPEAT
399   05 001CE   7E        A                  MOV     A,M                   A= 1ST 'FROM' BYTE
400   05 001CF   12        A                  STAX    D                     STORE IN 1ST 'TO' LOCATION
401   05 001D0   23        A                  INX     H                     ADVANCE 'FROM'
402   05 001D1   13        A                  INX     D                               AND 'TO' PNTRS
403   05 001D2   7E        A                  MOV     A,M                   A= 2ND 'FROM' BYTE
404   05 001D3   12        A                  STAX    D                     STORE IN 2ND 'TO' LOCATION
405   05 001D4   23        A                  INX     H                     ADVANCE 'FROM'
406   05 001D5   13        A                  INX     D                               AND 'TO' PNTRS
407   05 001D6   05        A                  DCR     B                     DECRM # OF WORDS CNTR
408   05 001D7   C2CE01    N                UNTIL:    CC,Z,S                LOOP UNTIL ALL WORDS TRANSFERRD
409   05 001DA   C9        A                RET
410                                         *
411                                         *         TABLE OF SB CALL POINTERS
412                                         *         FOR EACH STATE
413                                         *
414   05 001DB   0906      N      SB:TABLE  DW        COMP10
415   05 001DD   0A06      N                DW        COMP20
416   05 001DF   1206      N                DW        COMP100
```

```
417   05 001E1   B105    N           DW      TREP10
418   05 001E3   8505    N           DW      TREP20
419   05 001E5   C305    N           DW      TREP100
420   05 001E7   4202    N           DW      NRDY10
421   05 001E9   4602    N           DW      NRDY20
422   05 001EB   5202    N           DW      NRDY100
423   05 001ED   AF02    N           DW      RDY10
424   05 001EF   B302    N           DW      RDY20
425   05 001F1   BF02    N           DW      RDY100
426   05 001F3   AB03    N           DW      PRNT10
427   05 001F5   B203    N           DW      PRNT20
428   05 001F7   C803    N           DW      PRNT100
429   05 001F9   1905    N           DW      RUNN10
430   05 001FB   1D05    N           DW      RUNN20
431   05 001FD   2F05    N           DW      RUNN100

433
434                                  *       SUBR TO DO EPILOGS & PROLOGS LAST CALL IN EVERY 100MS TABLE
435                                  *
436   05 001FF   2153FD  A   STATCHG LXI     H,ADR(DATA,STATE!)         A= PRESENT STATE # IF UNCHANGED
437   05 00202   7E      A           MOV     A,M                        OR NEXT STATE IF CHANGED
438   05 00203   23      A           INX     H                          H&L= ADDR !FORMER STATE! GLOBAL
439   05 00204   BE      A           IF!     XBYT,A,NE,M                HAS THERE BEEN A STATE CHANGE
      05 00205   CA3602  N
440                                          ID!READ STATE!,!STATE!
441   05 00208   46      A           MOV     B,M                        YES, B= FORMER STATE
442   05 00209   77      A           MOV     M,A                        UPDATE !FORMER! TO !PRESENT!
443                                          ID!ALTR !STATE!
444   05 0020A   78      A           CASE!   VBYT,B                     DO EPILOG FOR FORMER STATE
      05 0020B   111F02  N
      05 0020E   FE06    A
      05 00210   CD0000  N
445   05 00213   1806    N                   C,0     COMP!EPL           COMPONENT CONTROL STATE
446   05 00215   0B05    N                   C,1     TREP!EPL           TECH REP STATE
447   05 00217   7A02    N                   C,2     NRDY!EPL           NOT-READY STATE
448   05 00219   E302    N                   C,3     RDY!EPL            READY STATE
449   05 0021B   E603    N                   C,4     PRNT!EPL           PRINT STATE
450   05 0021D   4105    N                   C,5     RUNN!EPL           SYSTEM RUNNING, NOT PRINT STATE
451                                          ENDCASE
452   05 0021F   3A53FD  N                   CASE!   VBYT,STATE!        DO PROLOG FOR PRESENT STATE
      05 00222   113602  N
      05 00225   FE06    A
      05 00227   CD0000  N
453   05 0022A   FF05    N                   C,0     COMP!PRL           COMPONENT CONTROL STATE
454   05 0022C   A505    N                   C,1     TREP!PRL           TECH REP STATE
455   05 0022E   3702    N                   C,2     NRDY!PRL           NOT-READY STATE
456   05 00230   A602    N                   C,3     RDY!PRL            READY STATE
457   05 00232   1603    N                   C,4     PRNT!PRL           PRINT STATE
458   05 00234   0B05    N                   C,5     RUNN!PRL           SYSTEM RUNNING, NOT PRINT STATE
459                                          ENDCASE
460                                  ENDIF
461   05 00236   C9      A           RET                                RETURN TO 100 MSEC SYNC BKGND

463                                  *NAR
464                                  *
465                                  *       N O T   R E A D Y   S T A T E
466                                  *
467                                  *       NOT READY STATE- EXECUTES AFTER INITIALIZE UNTIL ALL READY CONDITIONS
468                                  *       ARE MET. THIS STATE CAN ALSO BE ENTERED FROM !RUN NOT PRINT!,!READY!
469                                  *       AND !TECH REP!. CONTROL EXITS TO EITHER !READY! OR !TECH REP! STATES.

471                                  *       PROLOG 473   05 00237   CDA901  N   NRDY!PRL CALL   SB!PNTRS                   SYNC BKG PNTRS TO NEW STATE
474   05 0023A   CD0000  N            STIMR  INST@TMR,1000,NEXT@FLT     UPDATES INST FLT CODE IN STBY
      05 0023D   49      A
      05 0023E   64      A
      05 0023F   0000    N
475   05 00241   C9      A            RET

477                                  *       CALLS FOR NOT READY 10 MS SYN BACKGROUND 479   05 00242   CD0000  N   NRDY10   CALL   AD@CTRL
480   05 00245   C9      A            RET

482                                  *       CALLS FOR NOT READY 20 MS SYN BACKGROUND 484   05 00246   0000    N   NRDY20   DW     NRDY@SWS
485   05 00248   0000    N            DW     HN@ELV@S
486   05 0024A   0000    N            DW     DSPL@CTL
487   05 0024C   0000    N            DW     LMP@CTRL
488   05 0024E   0000    N            DW     INSTRU
489   05 00250   FFFF    A            DW     X'FFFF'                    END OF TABLE

491                                  *       CALLS FOR NOT READY 100 MS SYN BACKGROUND 493   05 00252   0000    N   NRDY100  DW     NRILK@CK
494   05 00254   0000    N            DW     RED@BGND
495   05 00256   0000    N            DW     DVL@DUMP
496   05 00258   0000    N            DW     RECAPER
497   05 0025A   0000    N            DW     BIN@CHK                    1
498   05 0025C   0000    N            DW     MINIPHS1                   2
499   05 0025E   0000    N            DW     BIL@JMP@
500   05 00260   0000    N            DW     FUS@ROUT
501   05 00262   0000    N            DW     FLT@100                    1
502   05 00264   0000    N            DW     FLT@CTRL                   2
503   05 00266   0000    N            DW     FLT@CLRN                   3
504   05 00268   0000    N            DW     PROG2SJM
505   05 0026A   0000    N            DW     PSD@STRY
506   05 0026C   0000    N            DW     XMM@STRY
507   05 0026E   0000    N            DW     JAM@RST
508   05 00270   0000    N            DW     KEY@CNTR
509   05 00272   0000    N            DW     TST@LP@
510   05 00274   8402    N            DW     NRDY!CHG                   TEST IF OK TO
511   05 00276   FF01    N            DW     STAT!CHG                                LEAVE NOT READY
512   05 00278   FFFF    A            DW     X'FFFF'                    END OF TABLE

514                                  *       EPILOG
```

```
516   05 0027A   CDC000   N   NRDY:EPL  COBIT,S    WAIT*                INSURE WAIT OFF AT NRDY EXIT
      05 0027D   E9FE     A
517   05 0027F   AF       A             CFLG       STRT:POT             DIS-ABLE TRANSFER TO 'PRINT'
      05 00280   325BF4   A
518   05 002A3   C9       A             RET 520
521                              *     SUBR FOR 'NOT-READY' 100MS SYNC BKGND
522                              *     TESTS FOR CHANGE TO 'READY' OR 'TREP REP'
523                              *
524   05 00284   CDDF05   N   NRDY:CHG  CALL       TREP:CHG             TEST FOR STATE CHANGE TO :TREP
525   05 00287   7E       A             IF:        XBYT,M,NE,:TREP      DID IT CHANGE TO :TREP STATE
      05 00288   FE01     A
      05 0028A   CA9302   N
526                                     ID:READ    STATE:
527   05 0028D   CD9402   N             CALL       RDYTEST:             TEST ALL 'READY' FLAGS
528   05 00290   CDOB03   N             CALL       NRDY:RDY             MOVE TO EITHER :NRDY OR :RDY
529                                     ENDIF
530   05 00293   C9       A             RET 532
533                              *     SUBR TO TEST ALL 'READY' FLAGS IN A LOOP
534                              *
535   05 00294   2184F7   A   RDYTEST:  LXI        H,RDYFLGS:           H&L= START ADDR OF READY FLAGS
536   05 00297   0609     A             MVI        B,RDYFNUM:           B= # OF READY FLAGS TO CHK
537                                     REPEAT
538   05 00299   7E       A             MOV        A,M                  A= <PRESENT READY FLAG>
539   05 0029A   07       A             RLC                             SET C IF FLAG SET (READY)
540   05 0029B   DAA002   N             IF:        CC,C,C               IS PRESENT FLAG INDICATING RDY
541   05 0029E   0601     A             MVI        B,1                  NO, DON'T TEST ANY FURTHER
542                                     ENDIF
543   05 002A0   23       A             INX        H                    MOVE TO NEXT FLAG LOCATION
544   05 002A1   05       A             DCR        B                    DECRM LOOP CNTR (# READY FLAGS)
545   05 002A2   C29902   N             UNTIL:     CC,Z,S               LOOP UNTIL ALL FLAGS CHKED
546                                     ID:READ    LENSORDY,ELVORDY,FUSORDY,:  FLAGS READ
547                                                PROGORDY,ILCKORDY,XHMORDY,:
548                                                FLTORDY,ADHONMOV,SRTORDY
549   05 002A5   C9       A             RET                             RETURN
551                              *NAR
552                              *
553                              *     R E A D Y    S T A T E
554                              *
555                              *     READY STATE- EXECUTES WHEN MACHINE IS READY TO GO INTO PRINT STATE.
556                              *     CONTROL CAN GO BACK TO 'NOT READY' OR GO TO 'TECH REP' IF REQUIRED.

558                              *     PROLOG 560   05 002A6   CD0000   N   RDY:PRL   SOBIT,S    READY$
      05 002A9   E701     A
561   05 002AB   CDA901   N             CALL       SB:PNTRS             SYNC BKG PNTRS TO NEW STATE
562   05 002AE   C9       A             RET

564                              *     CALLS FOR READY 10MS SYN BACKGROUND 566   05 002AF   CD0000   N   RDY10     CALL       ADHOCTRL
567   05 002B2   C9       A             RET

569                              *     CALLS FOR READY 20MS SYN BACKGROUND 571   05 002B3   0000     N   RDY20     DW         RDY@SWS
572   05 002B5   0000     N             DW         MNOELV@S
573   05 002B7   0000     N             DW         DSPLOCTL
574   05 002B9   0000     N             DW         LMPOCTRL
575   05 002BB   0000     N             DW         INSTRU
576   05 002BD   FFFF     A             DW         X'FFFF'              END OF TABLE

578                              *     CALLS FOR READY 100MS SYN BACKGROUND 580   05 002BF   0000     N   RDY100    DW         BIN@CHK              1
581   05 002C1   0000     N             DW         MINIPHS1             2
582   05 002C3   0000     N             DW         BILOJMPO
583   05 002C5   0000     N             DW         DVLODUMP
584   05 002C7   0000     N             DW         RECAPEP
585   05 002C9   0000     N             DW         FUSRROUT
586   05 002CB   0000     N             DW         FLT@100              1
587   05 002CD   0000     N             DW         FLTOCTRL             2
588   05 002CF   0000     N             DW         NRILK@CK
589   05 002D1   0000     N             DW         RED@BG@D
590   05 002D3   0000     N             DW         2SD@STPY
591   05 002D5   0000     N             DW         XHM@STPY
592   05 002D7   0000     N             DW         JAM@RST
593   05 002D9   0000     N             DW         KEY@CNTR
594   05 002DB   0000     N             DW         TSTOLP4
595   05 002DD   E9C2     N             DW         RDY:CHG              TEST IF OK TO
596   05 002DF   FFC1     N             DW         STAT:CHG                          LEAVE READY
597   05 002E1   FFFF     A             DW         X'FFFF'              END OF TABLE

599                              *     FPILOG 601   05 002E3   CD0000   N   RDY:EPL   COBIT,S    READY$
      05 002E6   E7FE     A
602   05 002E8   C9       A             RET

604                              *     CHANGE OF STATE ROUTINES 606
607                              *     SUBR FOR 'READY' 100MS SYNC BKGND
608                              *     TESTS FOR CHANGE TO 'NOT-READY' OR 'TECH REP'
609                              *
610   05 002E9   CDDF05   N   RDY:CHG   CALL       TREP:CHG             TEST FOR STATE CHANGE TO :TREP
611   05 002EC   7E       A             IF:        XBYT,M,NE,:TREP      DID IT CHANGE TO :TREP STATE
      05 002ED   FE01     A
      05 002EF   CA0A03   N
612                                     ID:READ    STATE:
613   05 002F2   CD9402   N             CALL       RDYTEST:             TEST ALL 'READY' FLAGS
614   05 002F5   CD0B03   N             CALL       NRDY:RDY             MOVE TO EITHER :NRDY OR :RDY
```

```
615  05 002F8  3A5BF4  A           IF:       FLG,STRT:PRT,T           IS START PRINT REQUESTED
     05 002FB  07      A
     05 002FC  D20A03  N
616  05 002FF  2153FD  A                LXI       H,ADR(DATA,STATE:)       SET MEM PNTR
617  05 00302  7E      A                IF:       XBYT,M,EQ,:RDY           OK TO GO TO PRINT
     05 00303  FE03    A
     05 00305  C20A03  N
618                                               ID:READ    STATE:
619  05 00308  3604    A                MVI       M,:PRNT                  CHG TO PRT STATE
620                                               ID:ALTR    STATE:
621                                     ENDIF
622                                     ENDIF
623                            ENDIF
624  05 0030A  C9      A        RET

626                    *
627                    *        SUBR TO USE INFO FROM 'RDYTEST' AND EXECUTE THE PROPER CHANGE OF STATE
628                    *
629  05 0030B  2153FD  A   NRDY:RDY LXI  H,ADR(DATA,STATE:)       SET MEM PNTR
630  05 0030E  3603    A        MVI      M,:RDY                   ASSUME GOING TO 'READY' STATE
631                                      ID:ALTR    STATE:
632  05 00310  DA1503  N        IF:      CC,C,C                   ARE ALL 'READY' FLAGS SET
633  05 00313  3602    A        MVI      M,:NRDY                  NO, MOVE TO 'NOT-READY' STATE
634                                      ID:ALTR    STATE:
635                            ENDIF
636  05 00315  C9      A        RET
637                    *NAR
638                    *
639                    *
640                    *        P R I N T    S T A T E
641                    *
642                    *        PRINT STATE- EXECUTES WHILE MACHINE IS PRODUCING COPIES.
643                    *        ENTERED FROM 'READY' AND EXITS TO 'RUN NOT PRINT'.

645                    *        PROLOG 647  05 00316  2160FE  N   PRNT:PRL CLR:MEM  16,SHIFTREG              CLEAR SHIFT REGISTER
     05 00319  0610    A
     05 0031B  CD0000  N
648  05 0031E  3E60    A        MVI       A,LADR(DATA,SHIFTREG)     FORCE SHIFT REG TO START AT
649  05 00320  3263FD  A        STA       ADR(DATA,SRPTR:)          BEGINNING OF SHIFTREG TABLE
650                             CLR:MEM   SD1@DLY-TIME@DN:+1,,      CLEAR THE FOLLOWING FLAGS
651  05 00323  21A7F4  A                  ADR(FLG,TIME@DN:)
     05 00326  0609    A
     05 00328  CD0000  N
652                             ID:CLR    TIME@DN:,IMED@DN:,,
653                                       CYCL@DN:,NORM@DN:,QWIK:OUT:,,
654                                       IMGMADE:,SD1@TIM@,SD1@DLY
655  05 0032B  3E80    A        SFLG      910@D@NE                  ALLOW FIRST PITCH RESET
     05 0032D  326FF4  A
656  05 00330  AF      A        XRA       A
657  05 00331  3266FD  A        STA       CYCUPCT:                  INIT CYCLE-UP CNTR TO 0
658  05 00334  3269FD  N        STA       SR@VALU:                  INIT 'NEW SR VALUE' TO 0
659  05 00337  325D FA N        STA       PLL@INFO                  INIT PLL SHUTDOWN CONTROL TO 0
660  05 0033A  3268FD  N        STA       SMPL@CT:                  INIT SAMPLE COPY CNTR TO 0
661  05 0033D  3E03    A        MVI       A,3                       INIT 'NO IMAGE CNTR' TO 3
662  05 0033F  3267FD  N        STA       NOIMGCT:
663  05 00342  CD0000  N        CALL      SRSK                      SHIFT REG SCHEDULER (INIT SR#0)
664  05 00345  CD0000  N        CALL      TIM@MOD                   CALC SHIFTED IMAGE VALUES   (1)
665  05 00348  CD0000  N        STIMR     9351TMR,810,RETURN:       SET 'OVER-RUN EVENT' TIMER  (2)
     05 00348  22      A
     05 0034C  51      A
     05 0034D  0000    N
666  05 0034F  CD0000  N        CALL      TBLD@PRT                  BUILD NEW PITCH TABLE       (3)
667  05 00352  CD0000  N        S@BIT:S   PRNT:RLY,PR:C@OL          PRINT RELAY & COOLING FAN ON
     05 00355  02      A
     05 00356  EA08    A
     05 00358  F608    A
668  05 0035A  AF      A        CTIMR     PR@COOL                   CLEAR COOLING FAN TIMER
     05 0035B  3232FA  N
669  05 0035E  CD0000  N        C@BIT:S   NPF@$@N                   TURN OFF PFO (INVERTED DRIVER)
     05 00361  E47F    A
670  05 00363  3AE0F4  A        IF:       FLG,ADH@SELC,T
     05 00366  07      A
     05 00367  D27003  N
671  05 0036A  CD0000  N                  CALL      ADH@M@TN
672  05 0036D  C37503  N        ELSE:
673  05 00370  3E80    A                  SFLG      ADH@WTEN
     05 00372  32CCF4  A
674  05 00375  CD0000  N        ENDIF
675  05 00375  CD0000  N        CALL      TRM@B@D                   CHK PAPER WIDTH FOR FUSER   (1)
676  05 00378  CD0000  N        CALL      PAP@SIZE                  CHK WHICH EDGE FADE OUT     (2)
677  05 0037B  CD0000  N        CALL      EDGE@F@
678  05 0037E  CD0000  N        CALL      PAP@PPL3
679  05 00381  CD0000  N        CALL      PROG@UP                   PROG INITIALIZATION SUBR
680  05 00384  CD0000  N        CALL      PROG@UP1
681  05 00387  CDC000  N        CALL      FDR@PRT                   CHECK FEEDER SELECTION
682  05 0038A  CD0000  N        CALL      RLG@BKPT                  READ BILLING BREAK-POINTS
683  05 0038D  CD0000  N        CALL      DO@ELV                    CAUSE ELV TO EXECUTE
684  05 00390  3A54F4  A        IF:       FLG,SRT:SEL,T             IS SORTER BEING USED
     05 00393  07      A
     05 00394  D29F03  N
685  05 00397  CD0000  N                  CALL      SRT@INIT        INITIALIZE SORTER JAM DETECT
686                                       MVI       A,MSK(NV@BIT,NV@FJAM,,  SETS ALL 4 JAM CONDITIONS
687  05 0039A  3E0F    A                            NV@IMED,NV@L@W@J,NV@UP@J)
688  05 0039C  C3A403  N        ELSE:
689  05 0039F  3AC9E2  A                  RNVNIB    NV@JAM@N        READ SAVED PREVIOUS SRT JAMS
690                                       MODBYT    A,@R,MSK(NV@BIT,,      & SET IMED DN K FOR JAM
691  05 003A2  F603    A                            NV@FJAM,NV@IMED)
692                             ENDIF
693  05 003A4  32C9E2  A        WNVNIB    NV@JAM@N                  STORE IN CASE OF PWR ON
694                             ID:ALTR   NV@FJAM,NV@IMED,NV@L@W@J,,  SEE ABOVE IF:/ELSE:
695                                       NV@UP@J
696  05 003A7  CDA901  N        CALL      SB:PNTPS                  SYNC BKG PNTRS TO NEW STATE
697  05 003AA  C9      A        RET

699                    *        CALLS FOR PRINT 10 MS SYN BACKGROUND
```

```
701  05 003AB  CD0000  N   PRNT10   CALL     ADH@CTPL
702  05 003AE  CDC004  N            CALL     PRT!IMD
703  05 003B1  C9      A            RET

705                              *  CALLS FOR PRINT 20 MS SYN BACKGROUND 707  05 003B2  0000    N   PRNT20   DW       PRT@SWS
708  05 003B4  0000    N            DW       TON@DIS
709  05 003B6  0000    N            DW       PAP@TGL3
710  05 003B8  0000    N            DW       LMP@CTPL
711  05 003BA  0000    N            DW       FDR@BKFD
712  05 003BC  0000    N            DW       SRTER@
713  05 003BE  0000    N            DW       FLV@PRNT
714  05 003C0  0000    N            DW       SOS@JMDT
715  05 003C2  0000    N            DW       DSPL@CTL
716  05 003C4  0000    N            DW       INSTRU
717  05 003C6  FFFF    A            DW       X'FFFF'                    END OF TABLE

719                              *  CALLS FOR PRINT 100 MS SYN BACKGROUND 721  05 003C8  0000    N   PRNT100  DW       PILK@CK
722  05 003CA  0000    N            DW       25D@RUN
723  05 003CC  0000    N            DW       LITE@OFF
724  05 003CE  0000    N            DW       XMM@PRNT
725  05 003D0  0000    N            DW       FUS@RDUT
726  05 003D2  0000    N            DW       READY@CK
727  05 003D4  0000    N            DW       JAM@RST
728  05 003D6  0000    N            DW       MINIPH@B
729  05 003D8  4F06    N            DW       SMPL@CPY
730  05 003DA  0000    N            DW       RXCYCLDN                   STUB IN US IMG
731  05 003DC  0000    N            DW       KEY@CNTR
732  05 003DE  0000    N            DW       TST@LP4
733  05 003E0  2C04    N            DW       PRT!CHG                    TEST IF OK TO
734  05 003E2  FF01    N            DW       STAT!CHG                              LEAVE PRINT
735  05 003E4  FFFF    A            DW       X'FFFF'                    END OF TABLE
737                              *  EPILOG 739  05 003E6  CD0000  N   PRNT!EPL CALL     AX@EPTY                    (1)
740  05 003E9  CD0000  N            CALL     FDM@EPL3                   (2)
741  05 003EC  CD0000  N            CALL     FDA@EPL3                   (3)
742  05 003EF  CD0000  N            CALL     TRN@EPL3
743  05 003F2  CD0000  N            CALL     DVL@NRDY
744                                 C@BIT,S  FUS@CAPL,FUS$LOAD,ILLM$SPL,!
745  05 003F5  CD0000  N                     FF@$11,EF@$12$5,SMPL$CPY,READY$
     05 003F8  07      A
     05 003F9  E6F7    A
     05 003FB  EDFD    A
     05 003FD  F2F7    A
     05 003FF  ECF7    A
     05 00401  EBF7    A
     05 00403  E2FE    A
     05 00405  E7FE    A
746  05 00407  CD0000  N            S@BIT,S  NPF@$ON                    TURN OFF PF0 (INVERTED DRIVER)
     05 0040A  E480    A
747  05 0040C  AF      A            CFLG     ELV@AUTO                   DISABLE AUTO-TRAY SWITCHING
     05 0040D  3222F4  A
748  05 00410  CD0000  N            CALL     PAP@EPL3
749  05 00413  CD1704  N            CALL     ABORT
750  05 00416  C9      A            RET

752                              *
753                              *  SUBROUTINE
754                              *

756  05 00417  F3      A   ABORT    DI                                  TURN OFF INTERRUPT SYSTEM
757  05 00418  AF      A            CFLG     TBLD@FIN                   SIGNAL NEW PITCH TABLE REQ'D
     05 00419  3250F4  A
758  05 0041C  211907  N            LXI      H,EV@STBY!                 ADDR OF STBY EVENT TABLE
759  05 0041F  2264FD  N            SHLD     EV@PTR!                    SAVE FOR MACH CLK ROUTINE
760  05 00422  CD0000  N            C@BIT,S  PTR$LOAD,PRNT$RLY          UN-LOAD BTR & DROP PRINT RELAY
     05 00425  02      A
     05 00426  E17F    A
     05 00428  EAF7    A
761  05 0042A  FB      A            EI
762  05 0042B  C9      A            RET 764  05 0042C  3A66FD  N   PRT!CHG  IF!      XBYT,CYCUPCT!,EQ,2         CHECK FOR PROLOG 2 OR CYCLE OUT
     05 0042F  FEC2    A
     05 00431  C23C04  N
765  05 00434  3E8C    A            SFLG     PRT$PRO2                   YES, SET 'PRINT PROLOG 2' FLAG
     05 00436  3271F4  A
766  05 00439  C37004  N            ORIF!    XBYT,A,EQ,3                NO, IS CYCLE UP CNTR=3
     05 0043C  FEC3    A
     05 0043E  C27004  N
767  05 00441  3A71F4  A            ANDIF!   FLG,PRT$PRO2,T             YES, AND IS PROLOG 2 FLAG SET
     05 00444  07      A
     05 00445  D27004  N
768  05 00448  AF      A            CFLG     PRT$PRO2                   YES, DO PROLOG 2 AND CLR FLAG
     05 00449  3271F4  A
769                              *
770                              *  PRINT STATE BACKGROUND- PROLOG 2
771                              *
772  05 0044C  CD0000  N                     CALL     PAP@PRL2          RETN XPORT OFF IF NOT SIDE 1
773  05 0044F  CD0000  N                     CALL     PROG@UP2
774  05 00452  3AADF4  A                     IF!      FLG,IMGMADE!,T    HAS 1ST IMAGE BEEN MADE
     05 00455  07      A
     05 00456  D25C04  N
775  05 00459  CD0000  N                     CALL     PROG@UP           YES, CALL PROG INITIALIZATION
776                                          ENDIF
777  05 0045C  3A57FA  N                     IF!      VBYT,MINIBYTE,NZ  IS MINI-PHYSICAL ACTIVE
     05 0045F  A7      A
     05 00460  CA7004  N
778  05 00463  AF      A                     CFLG     DSPL@1ST          YES, ENABLE DISPLAY UPDATE
     05 00464  329AF4  A
779  05 00467  3C      A                     INR      A                 DISPLAY QUANTITY
780  05 00468  3250FA  N                     STA      DSPL@ST1          COMPLETE
781  05 0046B  3EC6    A                     MVI      A,6               SET DOCUMENT TOTAL TO
```

```
782   05 0046D   326FFA   N                STA      DOCOTOTL              6 FOR ADH DOCUMENT CHECK
783                                   ENDIF
784                              ENDIF

786                          *   END PROLOG2

788                          *
789                          *   BUILD FLAG BYTE
790                          *
791   05 00470   0608    A        MVI      B,8                   NUMBER OF FLAGS REQ'D
792   05 00472   AF      A        XRA      A                     CLEAR A-REG
793   05 00473   57      A        MOV      D,A                   CLEAR D-REG
794   05 00474   21A9F4  A        LXI      H,ADR(FLG,IMEDODNI)   STARTING ADDR OF PRTICHG FLAGS
795                              REPEAT
796   05 00477   7E      A            MOV      A,M               LOAD A W/CONTENTS OF FLAG ADDR
797   05 00478   07      A            RLC                        ROTATE FLAG(D7) INTO CARRY
798   05 00479   7A      A            MOV      A,D               LOAD A W/FLAGS BILT INTO BYTE
799   05 0047A   17      A            RAL                        PUT FLAG IN D0 & SHIFT LEFT
800   05 0047B   57      A            MOV      D,A               SAVE RESULT IN D-REG
801   05 0047C   23      A            INX      H                 STEP TO NEXT FLAG
802   05 0047D   05      A            DCR      B                 DECR NUMBER OF FLAGS REQ'D
803   05 0047E   C27704  N        UNTIL:   CC,Z,S                LOOP UNTIL ALL FLAGS IN BYTE
804                              ID:READ  IMEDODNI,CYCLODNI,NORMODNI,;  FLAGS READ
805                                       QWIK:OUT,IMGMADE:,SD1OTIMO,;
806                                       SD1ODLY,ADHOSELC
807                          *
808                          *   TEST FOR STATE CHANGE TO IRUNN
809                          *
810   05 00481   3A67FD  N        LDA      NOIMGCT:              MOV CURENT NO IMAGE COUNTER
811   05 00484   5F      A        MOV      E,A                   TO THE E-REG
812   05 00485   060E    A        MVI      B,14                  LOOP CNTR FOR STATE CHG TESTS
813   05 00487   21E104  N        LXI      H,CYC:OUT             TABLE ADDR OF PRTICHG TESTS
814                              REPEAT
815   05 0048A   7A      A            MOV      A,D               MOV FLAG BYTE TO THE A-REG
816   05 0048B   A6      A            MODBYT   A,AND,H           MASK FOR DESIRED FLAGS
817   05 0048C   23      A            INX      H                 STEP TO STATUS TEST
818   05 0048D   AE      A            MODBYT   A,XOR,H           TEST FLAG STATUS
819   05 0048E   C29F04  N            IF:      CC,Z,S            DID TEST PASS
820   05 00491   23      A                INX      H             YES, STEP TO NOIMGCT: TEST
821   05 00492   7B      A                IF:      XBYT,E,GE,M   IS NOIMGCT: AT CORRECT VALUE
      05 00493   BE      A
      05 00494   DA9E04  N
822   05 00497   3E05    A                    MVI      A,IRUNN   YES, CHANGE STATE
823   05 00499   3253FD  N                    STA      STATE:    TO RUN NOT PRINT
824   05 0049C   0601    A                    MVI      B,1       FORCE END OF TESTS (EARLY OUT)
825                                       ENDIF
826   05 0049E   2B      A                DCX      H             ADJ PNTR BACK TO NO IMG TEST
827                                   ENDIF
828   05 0049F   23      A            INX      H                 STEP OVER NO IMG TEST
829   05 004A0   23      A            INX      H                 STEP TO MASK FOR NEXT TEST
830   05 004A1   05      A            DCR      B                 DECR LOOP COUNTER
831   05 004A2   C28A04  N        UNTIL:   CC,Z,S                ALL TESTS COMPLETE OR STATE CHG
832                          *    *
833   05 004A5   7A      A        MOV      A,D                   MOV FLAG BYTE TO A-REG
834   05 004A6   E662    A        MODBYT   A,AND,061D5101        MASK AND TEST FOR FLAGS TRUE
835                              ID:READ  NORMODNI,CYCLODNI,SD1ODLY  FROM ABOVE BYTE BUILD
836   05 004A8   CABF04  N        IF:      CC,Z,C                ARE ANY FLAGS TRUE
837   05 004AB   2166FD  A            LXI      H,ADR(DATA,CYCUPCT:)  PREPARE TO TEST OR MODIFY
838   05 004AE   7E      A            IF:      XBYT,M,GF,3       HAS PROG PUSHED IT TO 0
      05 004AF   FE03    A
      05 004B1   DAB604  N
839                                  ID:READ  CYCUPCT:
840   05 004B4   3602    A            MVI      M,2               NO, FORCE CYCLE-UP MODE AGAIN
841                                  ID:ALTR  CYCUPCT:
842                                  ENDIF
843   05 004B6   CD0000  N        COBIT,S  ILLM*SPL              ILLM SPL OFF DURING DEAD CYCLE
      05 004B9   F2F7    A
844   05 004BB   AF      A        CFLG     SMPLOFLG              CANCEL SAMPLE COPY SEQUENCE
      05 004BC   324CF4  A
845                              ENDIF
846   05 004BF   C9      A        RET

848                      PRTIIMD  IF:      FLGS,IMEDODNI,AND,;   IS IMEDIATE DOWN REQUESTED
849   05 004C0   3AA9F4  A                 TBLDSFIN,T            AND HAS PROB BEEN DETECTED
      05 004C3   2150F4  A
      05 004C6   A6      A
      05 004C7   F2D004  N
850   05 004CA   CD1704  N            CALL     ABORT
851   05 004CD   C3E004  N        ORIF:    FLG,TIMFODNI,T        IF TIMED DWN REQ'D DROP OUT
      05 004D0   3AA7F4  A
      05 004D3   07      A
      05 004D4   D2E004  N
852   05 004D7   21E1FF  A            COBIT    BTP*LOAD          BIAS TRANS ROLL (ASAP)
      05 004DA   3E7F    A
      05 004DC   F3      A
      05 004DD   A6      A
      05 004DE   77      A
      05 004DF   FB      A
853                              ENDIF
854   05 004E0   C9      A        RET
856                          *
857                          *                                    D7 6 5 4 3 2 1 0  (X=DON'T CARE)
858                          *
859                          *        TABLE OF FLAG STATUS TESTS  I C N Q I S S A   N C
860                          *        AND NO IMAGE COUNTER VALUES H Y G H M D D D   O O
861                          *        USED TO DETERMINE IF STATE  E C R I G I I H       T N
862                          *        SHOULD CHANGE FROM PRINT TO O L M K H A A O   I N E U
863                          *        RUN NOT PRINT               O O O I A T D S   M T S M
864                          *                                    D O O O D I L E   A E T B
865                          *                                    N N N U E M Y L   G R   E
866                          *                                    : : : Y : O   C   E     R
867                          *
868   05 004E1   48      A    CYC:OUT DB   D61D3                 X 1 X X O X X X   00   1
869   05 004E2   40      A            DB   D6
```

```
870  05 004E3  00    A           DB    0
871  05 004E4  5C    A           DB    D6ID4ID3ID2         X 1 X 0 1 1 X X   16    2
872  05 004E5  4C    A           DB    D6ID3ID2
873  05 004E6  10    A           DB    16
874  05 004E7  5C    A           DB    D6ID4ID3ID2         X 1 X 0 1 0 X X   11    3
875  05 004E8  48    A           DB    D6ID3
876  05 004E9  08    A           DB    11
877  05 004EA  68    A           DB    D6ID5ID3            X 0 1 X 0 X X X   00    4
878  05 004EB  20    A           DB    D5
879  05 004EC  00    A           DB    0
880  05 004ED  75    A           DB    D6ID5ID4ID2ID0      1 X 0 0 0 X 1 X 0 36    5
881  05 004EE  04    A           DB    D2
882  05 004EF  24    A           DB    36
883  05 004F0  75    A           DB    D6ID5ID4ID2ID0      X 0 0 0 X 1 X 1   20    6
884  05 004F1  05    A           DB    D2ID0
885  05 004F2  14    A           DB    20
886  05 004F3  7D    A           DB    D6ID5ID4ID3ID2ID0   X 0 1 0 1 1 X 0   36    7
887  05 004F4  2C    A           DB    D5ID3ID2
888  05 004F5  24    A           DB    36
889  05 004F6  7D    A           DB    D6ID5ID4ID3ID2ID0   X 0 1 0 1 1 X 1   20    8
890  05 004F7  20    A           DB    D5ID3ID2ID0
891  05 004F8  14    A           DB    20
892  05 004F9  75    A           DB    D6ID5ID4ID2ID0      X 0 0 0 X 0 X 0   21    9
893  05 004FA  00    A           DB    0
894  05 004FB  15    A           DB    21
895  05 004FC  7D    A           DB    D6ID5ID4ID3ID2ID0   X 0 1 0 1 0 X 0   21   10
896  05 004FD  28    A           DB    D5ID3
897  05 004FE  15    A           DB    21
898  05 004FF  75    A           DB    D6ID5ID4ID2ID0      X 0 0 0 X 0 X 1   13   11
899  05 00500  01    A           DB    D0
900  05 00501  0D    A           DB    13
901  05 00502  7D    A           DB    D6ID5ID4ID3ID2ID0   X 0 1 0 1 0 X 1   13   12
902  05 00503  29    A           DB    D5ID3ID0
903  05 00504  0D    A           DB    13
904  05 00505  10    A           DB    D4                  X X X 1 X X X X   11   13
905  05 00506  10    A           DB    D4
906  05 00507  0B    A           DB    11
907  05 00508  80    A           DB    D7                  1 X X X X X X X   00   14
908  05 00509  80    A           DB    D7
909  05 0050A  00    A           DB    0
912                               *NAR
913                               *
914                               *    R U N   N O T   P R I N T   S T A T E
915                               *
916                               *    RUN NOT PRINT- EXECUTES WHILE MACHINE IS COMPLETING A COPY RUN.
917                               *    ENTERED FROM 'PRINT' AND EXITS TO 'NOT READY'.
919                               *    PROLOG
921  05 0050B  CD0000  N   RUNN:PRL. CALL   DO&ELV         CAUSE ELV TO EXECUTE
922  05 0050E  CD0000  N             STIMR  RUNN:TMR,2500,RUNN&CHG  STAY IN RUNN 2.5 SEC
     05 00511  2F      A
     05 00512  FA      A
     05 00513  7505    N
923  05 00515  CDA901  N             CALL   SB:PNTRS       SYNC BKG PNTRS TO NEW STATE
924  05 00518  C9      A             RET
926                               *    CALLS FOR RUN NOT PRINT 10 MS SYN BACKGROUND
928  05 00519  CD0000  N   RUNN10   CALL    ADH&CTRL
929  05 0051C  C9      A            RET
931                               *    CALLS FOR RUN NOT PRINT 20 MS SYN BACKGROUND
933  05 0051D  0000    N   RUNN20   DW      RUNN&SWS
934  05 0051F  0000    N            DW      SORTERS
935  05 00521  0000    N            DW      S0S&JMOT
936  05 00523  0000    N            DW      FLV&PRNT
937  05 00525  0000    N            DW      LHP&CTRL
938  05 00527  0000    N            DW      PAP&TGL&
939  05 00529  0000    N            DW      DSPL&CTL
940  05 0052B  0000    N            DW      INSTRU
941  05 0052D  FFFF    A            DW      X'FFFF'                            END OF TABLE
943                               *    CALLS FOR RUN NOT PRINT 100 MS SYN BACKGROUND
945  05 0052F  0000    N   RUNN100  DW      JAM&RST
946  05 00531  0000    N            DW      RILK&CK
947  05 00533  0000    N            DW      FUS&RDUT
948  05 00535  0000    N            DW      ?SD&RUN
949  05 00537  0000    N            DW      XMM&PRNT
950  05 00539  0000    N            DW      LITE&OFF
951  05 0053B  0000    N            DW      TST&LP&
952  05 0053D  FF01    N            DW      STAT:CHG                           TEST IF OK TO LEAVE RUN NOT PRT
953  05 0053F  FFFF    A            DW      X'FFFF'                            END OF TABLE
955  05 00541  CD0000  N   RUNN:EPL CALL    DEL&CK         CALC COPIES DELIVERED
956  05 00544  CD0000  N            CALL    PAP&EPL&       'RUNNPRT' PAPER PATH MOP UP SUB
957  05 00547  CD0000  N            CALL    MOT&OFF        TURN OFF SORTER MOTORS
958  05 0054A  CD0000  N            CALL    DO&ELV         CAUSE ELV TO EXECUTE
959  05 0054D  AF      A            CFLG    AXFD&FLT       RESET FOR USE DURING NEXT RUN
     05 0054E  323FF4  A
960  05 00551  2123FC  A            CFBIT,P TF&XMM&        STOP BLINKING OF XMM 'OTHER'
     05 00554  3EFE    A
     05 00556  A6      A
     05 00557  77      A
961  05 00558  CD0000  N            COBIT,S S0S&SMPL
     05 0055B  ECFD    A
962  05 0055D  CD7B05  N            CALL    NV&JAM
963  05 00560  CD0000  N            CALL    RCP&STRE       STORE RECAP DATA IN RAM
964  05 00563  CD0000  N            CALL    ADH&MOTF
965  05 00566  3E08    A            MVI     A,8            SET COUNTER FOR 7 TIMEOUTS
966  05 00568  3285FA  N            STA     COOLCNT
967  05 0056B  CD0000  N            CALL    PR&FAN
968  05 0056E  CD0000  N            CALL    FLT&EPL5       (1)
```

```
 969  05 00571  CDC000  N           CALL    HISTBFLE              (2) LOG HISTORY DATA FOR RUN
 970  05 00574  C9      A           RET                           (3)

972  05 00575  2153FD  N  RUNN&CHG LXI     H,STATE1              SET H&L TO ADDR OF STATE1
 973  05 00578  3602    A           MVI     M,1NRDY               CHANGE STATE1 TO NOT READY
 974                                IDIALTR  STATE1
 975  05 0057A  C9      A           RET
 977  05 0057B  3A66F4  A  NV&JAM   RFLG    UP&JAM                LOAD A WITH SRT UPPER JAM FLAG
      05 0057E  07      A           .                             & SAVE IT IN THE CARRY BIT
 978                                                              LOAD A WITH SRT LOWER JAM FLAG
 979  05 0057F  3A36F4  A           LDAFLG  LOW&JAM               & MOVE CARRY &
 980  05 00582  17      A           RAL                           LOW&JAM INTO THEIR POSITIONS
 981  05 00583  17      A           RAL
 982  05 00584  07      A           RLC
 983  05 00585  07      A           RLC
 984                                MODBYT  A,AND,MSK(NVBIT,;     MASK FOR DESIRED BITS
                                            NV&LOW&J,NV&UP&J)
 985  05 00586  E60C    A                                         & SAVE IT IN THE B-REG
 986  05 00588  47      A           MOV     B,A                   WAS THERE AN IMED ON CONDITION
 987  05 00589  3AA9F4  A           IF      FLG,IMED&DN1,T
      05 0058C  07      A
      05 0058D  D29605  N                   MOV     A,P           YES,RESTORE A-REG
 988  05 00590  78      A                   MODBYT  A,OR,MSK(NVBIT,NV&FJAM,;  & SET NV JAM BITS
 989                                                NV&IMED)
 990  05 00591  F603    A           ELSE!
 991  05 00593  C3A105  N                   IF!     FBITS,FDR&AJAM,OR,FDR&MJAM,T  IS EITHER JAM CONDITION TRUE
 992  05 00596  3A3CFD  A
      05 00599  E60C    A
      05 0059B  CA9F05  N                   STC                   YES,SET CARRY
 993  05 0059E  37      A           ENDIF
 994                                RAL                           ROTATE INTO DO
 995  05 0059F  17      A           MODBYT  A,OR,B                'OR' IN SRT JAM BITS
 996  05 005A0  B0      A           ENDIF
 997                                WNVNIB  NV&JAM&N
 998  05 005A1  32C9E2  A           IDIALTR NV&FJAM,NV&IMED,NV&LOW&J,NV&UP&J
 999                                RET                           RETURN TO STATE CHECKER
1000  05 005A4  C9      A
1002                        *NAR
1003                        *
1004                        *       T E C H   R E P   S T A T E
1005                        *
1006                        *       THE TECH REP STATE IS ENTERED WHEN THE SERVICE KEY IS ON IN
1007                        *       'NOT READY' & 'READY' STATES. THIS ALLOWS THE TECH REP TO PERFORM SUCH
1008                        *       TASKS AS ACCESS NON-VOLATILE MEMORY & COMPONENT CONTROL.

1010                        *
1011                        *       PROLOG
1012                        *
1013  05 005A5  CD0000  N  TREP:PRL COBIT,S WAIT$                 INSURE WAIT OFF AT TREP ENTRANC
      05 005A8  E9FE    A
1014  05 005AA  CD0000  N           CALL    DGN&PRL               DIAGNOSTIC PROLOG
1015  05 005AD  CDA901  N           CALL    SB:PNTRS              SYNC BKG PNTRS TO NEW STATE
1016  05 005B0  C9      A           RET

1019                        *       CALLS FOR TECH REP 10MS SYN BACKGROUND 1021  05 005B1  CD0000  N  TREP10   CALL    ADH&CTRL
1022  05 005B4  C9      A           RET

1024                        *       CALLS FOR TECH REP 20MS SYN BACKGROUND 1026  05 005B5  0000    N  TREP20   DW      TREP&SWS
1027  05 005B7  0000    N           DW      MN&ELVRS
1028  05 005B9  0000    N           DW      LMP&CTRL
1029  05 005BB  0000    N           DW      DSPL&CTL
1030  05 005BD  0000    N           DW      DGN&BKG
1031  05 005BF  0000    N           DW      INSTRU
1032  05 005C1  FFFF    A           DW      X'FFFF'               END OF TABLE

1034                        *       CALLS FOR TECH REP 100MS SYN BACKGROUND 1036  05 005C3  0000    N  TREP100  DW      NRILK&CK
1037  05 005C5  0000    N           DW      PSD&STPY
1038  05 005C7  0000    N           DW      XMM&STPY
1039  05 005C9  0000    N           DW      RED&BGND
1040  05 005CB  0000    N           DW      BIN&CHK
1041  05 005CD  0000    N           DW      JAM&RST
1042  05 005CF  0000    N           DW      DVL&DUMP
1043  05 005D1  0000    N           DW      FUS&ROUT
1044  05 005D3  0000    N           DW      TST&LP4
1045  05 005D5  DF05    N           DW      TREP:CHG              TEST IF OK TO
1046  05 005D7  FF01    N           DW      STAT:CHG                            LEAVE TREP REP
1047  05 005D9  FFFF    A           DW      X'FFFF'               END OF TABLE

1049                        *
1050                        *       EPILOG  (TECH REP STATE)
1051                        *
1052  05 005DB  CD0000  N  TREP:EPL CALL    DGN&EPL               DIAGNOSTIC EPILOG
1053  05 005DE  C9      A           RET

1055                        *       CHANGE OF STATE CHECK 1057  05 005DF  2153FD  A  TREP:CHG LXI     H,ADR(DATA,STATE1)    PREPARE FOR POSSIBLE STATE CHG
1058  05 005E2  7E      A           IF!     XBYT,M,NE,:COMP       DO NOT CHG STATE IF IN COMP
      05 005E3  FE00    A
      05 005E5  CAFE05  N
1059  05 005E8  3A49F4  A                   IF      FLG,SER&ACT,T IF SERVICE KEY IS ON AND IF
      05 005EB  07      A
      05 005EC  D2FC05  N                   ANDIF!  FBIT,DGN&PRT&,F  IN DIAG PRINT PROGRAM
1060  05 005EF  3A20FC  A
      05 005F2  E6C2    A
      05 005F4  C2FC05  N                           MVI     M,:TREP    CHG TO TREP STATE
1061  05 005F7  3601    A                   ELSE!                      IF KEY IS TURNED OFF
1062  05 005F9  C3FE05  N                           MVI     M,:NRDY    CHG TO NOT READY STATE
1063  05 005FC  3602    A                   ENDIF
1064                                        IDIALTR STATE1
1065                                ENDIF
1066                                RET
1067  05 005FE  C9      A
```

TABLE II

```
96                                              * FIXED PITCH EVENT TABLE
97                                              *
98                                              * EVENTS MUST BE IN SEQUENTIAL ORDER STARTING
99                                              * WITH THE EVENT CLOSES TO PITCH RESET FIRST
100                                             *
101                                             * THERE CAN BE NO MORE THAN 256 COUNTS BETWEEN EVENTS
102                                             *
103                                             * FORMAT OF EVENTS FOR EVENT TABLE
104                                             *
105                                             * EVENT     X,Y,Z
106                                             * WHERE!
107                                             * X = ABSOLUTE COUNTS FROM RESET
108                                             * Y = SHIFT REGISTER NEEDED IN EVENT
109                                             * Z = EVENT NAME
110                                             *
111                                             *
112                                             * PITCH EVENTS
113                                             *
114                                               TABLE
115    05 0001E    0200   A                      EVENT     2,3,TRN2CURR
       05 00020    03     A
       05 00021    0000   N
116    05 00023    0300   A                      EVENT     3,2,ADC@ACT
       05 00025    02     A
       05 00026    0000   N
117    05 00028    0400   A                      EVENT     4,3,FDR5AFLT
       05 0002A    03     A
       05 0002B    0000   N
118    05 0002D    0700   A                      EVENT     7,0,SPLYS@ON
       05 0002F    00     A
       05 00030    0000   N
119    05 00032    0800   A                      EVENT     8,2,FDR1AXFD
       05 00034    02     A
       05 00035    0000   N
120    05 00037    0A00   A                      EVENT     10,3,FUS@LOAD
       05 00039    03     A
       05 0003A    0000   N
121    05 0003C    3000   A                      EVENT     48,8,DECG@INV      DECISION GATE FOR INVTD COPIES
       05 0003E    08     A
       05 0003F    0000   N
122    05 00041    3600   A                      EVENT     54,5,FUS@NTLD      FUSER LOADED TEST
       05 00043    05     A
       05 00044    0000   N
123    05 00046    5500   A                      EVENT     85,3,FDR6MFLT
       05 00048    03     A
       05 00049    0000   N
124    05 0004B    5900   A                      EVENT     89,2,FDR2MNFD
       05 0004D    02     A
       05 0004E    0000   N
125    05 00050    5D00   A                      EVENT     93,8,JAM6@NON      PAPER PATH JAM SW PITCH EVENT
       05 00052    08     A
       05 00053    0000   N
126    05 00055    7600   A                      EVENT     118,9,JAM5@INV     PAPER PATH JAM SW PITCH EVENT
       05 00057    09     A
       05 00058    0000   N
127    05 0005A    7800   A                      EVENT     120,0,FSH@OFF
       05 0005C    00     A
       05 0005D    0000   N
128    05 0005F    8700   A                      EVENT     135,0,PROG@HST     PROG HISTORY FILE UPDATE
       05 00061    00     A
       05 00062    0000   N
129    05 00064    8F00   A                      EVENT     143,6,JAM4@CHK     PAPER PATH JAM SW PITCH EVENT
       05 00066    06     A
       05 00067    0000   N
130    05 00069    AA00   A                      EVENT     170,10,RET2@CHK    PAPER PATH JAM SW PITCH EVENT
       05 0006B    0A     A
       05 0006C    0000   N
131    05 0006E    CF00   A                      EVENT     207,3,S0S@CLN
       05 00070    03     A
       05 00071    0000   N
132    05 00073    D100   A                      EVENT     209,2,TRN5CURR
       05 00075    02     A
       05 00076    0000   N
133    05 00078    E300   A                      EVENT     227,5,JAM3@CHK     PAPER PATH JAM SW PITCH EVENT
       05 0007A    05     A
       05 0007B    0000   N
134    05 0007D    0901   A                      EVENT     265,2,FDR3/EDG     ENABLE AUX FOR WT SENSOR
       05 0007F    02     A
       05 00080    0000   N
135    05 00082    0B01   A                      EVENT     267,4,JAM2@CHK     PAPER PATH JAM SW PITCH EVENT
       05 00084    04     A
       05 00085    0000   N
136    05 00087    0E01   A                      EVENT     270,8,RET1@CHK     PAPER PATH JAM SW PITCH EVENT
       05 00089    08     A
       05 0008A    0000   N
137    05 0008C    6901   A                      EVENT     361,3,TRN3DTCK
       05 0008E    03     A
       05 0008F    0000   N
138    05 00091    6C01   A                      EVENT     364,2,FDR4MEDG     ENABLE MAIN WT SENSOR
       05 00093    02     A
       05 00094    0000   N
139    05 00096    B901   A                      EVENT     441,9,JAM6@INV     PAPER PATH JAM SW PITCH EVENT
       05 00098    09     A
       05 00099    0000   N
140    05 0009B    C201   A                      EVENT     450,4,FUS@UNLD
       05 0009D    04     A
       05 0009E    0000   N
141    05 000A0    C301   A                      EVENT     451,2,TRN1ROLL
       05 000A2    02     A
       05 000A3    0000   N
```

```
142  05 000A5   F401   A         EVENT   500,0,DPH@SMPL
     05 000A7   00     A
     05 000A8   0000   N
143  05 000AA   0E02   A         EVENT   526,3,TRN@DTCK
     05 000AC   03     A
     05 000AD   0000   N
144  05 000AF   1B02   A         EVENT   539,0,DVLV@OFF         TURN OFF VAR DENS DEVELOPERS
     05 000B1   00     A
     05 000B2   0000   N
145  05 000B4   5802   A         EVENT   600,0,PIL@PLOP         TEST FOR PLATEN OPEN      (BLG)
     05 000B6   00     A
     05 000B7   0000   N
146  05 000B9   7602   A         EVENT   630,5,INVTRCTL         INVTR GATE & RETURN CONTROL
     05 000BB   05     A
     05 000BC   0000   N
147  05 000BE   8A02   A         EVENT   650,6,DECG@NON         DECISION GATE FOR NON-INVTD
     05 000C0   06     A
     05 000C1   0000   N
148  05 000C3   9A02   A         EVENT   666,0,JAM@DLY
     05 000C5   00     A
     05 000C6   0000   N
149  05 000C8   BC02   A         EVENT   700,7,JAMS@NON         PAPER PATH JAM SW PITCH EVENT
     05 000CA   07     A
     05 000CB   0000   N
150  05 000CD   2003   A         EVENT   800,0,PROGMODE
     05 000CF   00     A
     05 000D0   0000   N
151  05 000D2   2203   A         EVENT   802,0,FSH@ENB
     05 000D4   00     A
     05 000D5   0000   N
152  05 000D7   5003   A         EVENT   848,0,DVB@VAR          TURN ON VARIABLE-BIAS DEVELOPER
     05 000D9   00     A
     05 000DA   0000   N
153  05 000DC   5203   A         EVENT   850,4,SRSK@EV          INIT SRSK & SRT MOTOR
     05 000DE   04     A
     05 000DF   0000   N
154  05 000E1   5403   A         EVENT   852,0,PECOFFEV         TURN OFF POST EXP. COROTRON
     05 000E3   00     A
     05 000E4   0000   N
155  05 000E6   8C03   A         EVENT   908,0,PEC@NEV          TURN ON POST EXP COROTRON
     05 000E8   00     A
     05 000E9   0000   N
156  05 000EB   8EC3   A         EVENT   910,0,910@EV
     05 000ED   00     A
     05 000EE   0000   N
157  05 000F0   9003   A         EVENT   912,0,DGN@HCNT
     05 000F2   00     A
     05 000F3   0000   N
158  05 000F5   A703   A         EVENT   935,0,0VER@RUN
     05 000F7   00     A
159  05 000F8   0000   N         ENDTABLE
```

TABLE III

```
71
72                                *     VARIABLE PITCH EVENT TABLE
73                                *
74      00000001           FLSH@BSE  EQU    1
75      00000019           F@@NBSE   EQU    25
76      00000064           F@@OFFBS  EQU    100
77   05 00000   0100   A   ROM@FSH   DW     FLSH@BSE
78   05 00002   00     A             DB     0
79   05 00003   0000   N             DW     FSH@ON
80   05 00005   6400   A   ROM@OFF   DW     F@@OFFBS
81   05 00007   00     A             DB     0
82   05 00008   0000   N             DW     F@@OFF
83   05 0000A   1900   A   ROM@ON    DW     F@@NBSE
84   05 0000C   00     A             DB     0
85   05 0000D   0000   N             DW     F@@ON
86   05 0000F   0100   A   ROM@FSHS  DW     FLSH@BSE
87   05 00011   00     A             DB     0
88   05 00012   0000   N             DW     FSH@ON@S
89   05 00014   6400   A   ROM@OFFS  DW     F@@OFF@S
90   05 00016   00     A             DB     0
91   05 00017   0000   N             DW     F@@OFF@S
92   05 00019   1900   A   ROM@@NS   DW     F@@NBSE
93   05 0001B   00     A             DB     0
94   05 0001C   0000   N             DW     F@@ON@S
95                                *
```

TABLE IV

```
161     00000396           BASE@CNT  SET    918              #CLK CNTS/PITCH
162     0000038E           SAFE@CNT  SET    910              MIN # CLK CNTS/PITCH
163                                *
164                                *     PITCH TABLE BUILDER
165                                *
166                                *     BUILD VARIABLE PITCH EVENT TABLE INTO RAM
167                                *     FROM ROM DATA + REDUCTION ADJUST & F@ TRIM
168                                *
169  05 000FA   2A0000  N   TBLD@PRT LHLD   ROM@FSH           H&L= BASE CNT OF FLASH
170  05 000FD   EB      A            XCHG                     D&E= BASE CNT OF FLASH
171  05 000FE   2A9AFC  N            LHLD   1FLSH@ON          H&L= RED ADJ
```

```
172  05 00101    19        A        DAD       D                              H&L= BASE + ADJ
173  05 00102    2244FC    N        SHLD      RAM@FSH                        RAM@FSH = BASE + ADJ
174                                 *
175  05 00105    2A0500    N        LHLD      ROM@OFF                        H&L= BASE CNT OF F8 OFF
176  05 00108    EB        A        XCHG                                     D&E= BASE CNT OF F8 OFF
177  05 00109    2A9CFC    N        LHLD      1F@OFF                         H&L= RED ADJ + TRIM ADJ
178  05 0010C    19        A        DAD       D                              H&L= BASE + ADJ
179  05 0010D    2249FC    N        SHLD      RAM@OFF                        RAM@OFF = BASE + ADJ
180                                 *
181  05 00110    2A0A00    N        LHLD      ROM@ON                         H&L= BASE CNT OF F8 ON
182  05 00113    EB        A        XCHG                                     D&E= BASE CNT OF F8 ON
183  05 00114    2A9EFC    N        LHLD      1F@ON                          H&L= RED ADJ + TRIM ADJ
184  05 00117    19        A        DAD       D                              H&L= BASE + ADJ
185  05 00118    CDEA02    N        CALL      @N@MOD                         CALL MOD ROUTINE TO MOD IF<0
186  05 0011B    224EFC    N        SHLD      RAM@ON                         RAM@ON = RESULTS OF ABOVE
187                                 *
188  05 0011E    3A31F4    A        IFI       FLG,IMG@SFT,T                  IS THERE IMAGE SHIFT
     05 00121    07        A
     05 00122    D25601    N
189  05 00125    3E06      A                  MVI       A,6                  YES,# OF VAR EVENTS TO USE = 6
190  05 00127    47        A                  MOV       B,A                  SET UP B-REG FOR LOOP CONTROL
191  05 00128    3262FA    N                  STA       TBL@NUM              STORE # OF VAR EVENTS
192  05 0012B    3D        A                  DCR       A                    SET UP # OF TIMES TO GO
193  05 0012C    3263FA    N                  STA       TBL@TMP              THRU SORT
194                                 *
195  05 0012F    2A0F00    N                  LHLD      ROM@FSHS             UPDATE ROM@FSHS TO
196  05 00132    EB        A                  XCHG                           INCLUDE RED MODE ADJ + SHIFT
197  05 00133    2AA0FC    N                  LHLD      2FLSH@ON             ADJ AND SAVE FOR THE
198  05 00136    19        A                  DAD       D                    IMAGE SHIFT
199  05 00137    2253FC    N                  SHLD      RAM@FSHS             FLASH EVENT
200                                 *
201  05 0013A    2A1400    N                  LHLD      ROM@OFFS             UPDATE ROM@OFFS TO INCLUDE
202  05 0013D    EB        A                  XCHG                           RED MODE ADJ + TRIM ADJ +
203  05 0013E    2AA2FC    N                  LHLD      2F@OFF               SHIFT ADJ AND SAVE
204  05 00141    19        A                  DAD       D                    FOR THE IMAGE SHIFT
205  05 00142    2258FC    N                  SHLD      RAM@OFFS             FADE OUT EVENT
206                                 *
207  05 00145    2A1900    N                  LHLD      ROM@ONS              UPDATE ROM@ONS TO INCLUDE
208  05 00148    EB        A                  XCHG                           RED MODE ADJ + TRIM ADJ +
209  05 00149    2AA4FC    N                  LHLD      2F@ON                SHIFT ADJ
210  05 0014C    19        A                  DAD       D
211  05 0014D    CDEA02    N                  CALL      @N@MOD               CALL MOD ROUTINE TO MOD IF <0
212  05 00150    2250FC    N                  SHLD      RAM@ONS              SAVE THE RESULTS
213                                 *
214  05 00153    C36001    N        ELSE:                                    IF IMAGE SHIFT NOT SET
215  05 00156    3E03      A                  MVI       A,3                  #OF VAR EVENTS TO USE = 3
216  05 00158    47        A                  MOV       B,A                  SET UP B-REG FOR LOOP CONTROL
217  05 00159    3262FA    N                  STA       TBL@NUM              STORE # OF VAR EVENTS & SETUP
218  05 0015C    3D        A                  DCR       A                    #OF TIMES TO GO THRU SORT
219  05 0015D    3263FA    N                  STA       TBL@TMP
220                                 ENDIF
221                                 *
440                                 *       SUBROUTINE TO DETERMINE IF MODIFIED F8 ON EVENT
441                                 *       CLK COUNT IF CLK COUNT RESULTS ARE NEGATIVE OR 0
442                                 *
443                                 *
444  05 002EA    7C        A        @N@MOD    MOV       A,H                  A= MS PART OF ABS CLK COUNT
445  05 002EB    07        A                  RLC                            CARRY= SIGN OF ABS CLK COUNT
446  05 002EC    D20203    N        IF:       CC,C,S                         IS THE ABS CLK CNT NEG
447  05 002EF    119603    A                  LXI       D,BASE@CNT           YES,ADD # CLK COUNTS PER PITCH
448  05 002F2    19        A                  DAD       D                    TO NEG #
449  05 002F3    118E03    A                  IFI       XWRD,H,GE,SAFE@CNT   IS RESULTS GE SAFE # CLK/PITCH
     05 002F6    C00000    N
     05 002F9    DAFF02    N
450  05 002FC    210100    A                  LXI       H,1                  YES,MOVE TO TURN ON LATER
451                                           ENDIF
452  05 002FF    C30E03    N        ORIFI     XWRD,H,EQ,0                    IF RESULTS = 0, MOVE LATER IN
     05 00302    110000    A
     05 00305    C00000    N
     05 00308    C20E03    N
453  05 0030B    210100    A                  LXI       H,1                  PITCH BECUASE FVENT MUST BE > 0
454                                           ENDIF
455  05 0030E    C9        A                  RET
456                                 END

CONTROL SECTION SUMMARY: 01 00000   PT 0       02 00000   PT 0    03 00000   PT 0    04 OFFD8   PT 2
                         05 0030F   PT 1
* NO UNDEFINED SYMBOLS
*   ERROR SEVERITY LEVEL: 0
* NO ERROR LINES
```

TABLE V

```
252                                 *
253                                 *       SORTS VARIABLE RAM EVENT TABLE BY
254                                 *       ABS CLK COUNT & LOWEST ENDS IN EV@RAM
255                                 *
256                                 *       SORTS ONLY 1ST 3 IF NO IMAGE SHIFT, OTHERWISE SORTS ALL 6
257                                 *
258  05 0017E    2144FC    N        LXI       H,EV@RAM                       H&L= ADDR OF TOP OF VAR RAM TBL
259  05 00181    3A63FA    N        WHILE:    XBYT,TBL@TMP,NE,0              TIMES TO GO THRU OUTER LOOP
     05 00184    FE00      A
     05 00186    CAFD01    N
260  05 00189    3253FA    N                  STA       IN@LP@CT             INTER LOOP CNT=OUTER LOOP CNT
261  05 0018C    3E80      A                  SFLG      TBL@1ST              SET 1ST FLAG FOR THIS POSITION
     05 0018E    325EF4    A
262  05 00191    2252FB    N                  SHLD      FIX@ADDR             ADDR OF POSITION TO FULL
263  05 00194    B7        A                  ORA       A                    CLEAR Z CONDITION BIT
264  05 00195    CAEF01    N        WHILE:    CC,Z,C
265  05 00198    5E        A                  MOV       E,M                  E= LS PART OF ABS CLK COUNT
266  05 00199    23        A                  INX       H
267  05 0019A    56        A                  MOV       D,M                  D= MS PART OF ABS CLK COUNT
268  05 0019B    D5        A                  PUSH      D                    STORE ABS CLK CNT OF FILL POS
269  05 0019C    3A5EF4    A                  IFI       FLG,TBL@1ST,T        IS IT 1ST TIME FOR THIS POS
     05 0019F    07        A
     05 001A0    D2AE01    N
```

| | | | | | | | |
|---|---|---|---|---|---|---|---|
|270|05 001A3|AF|A| |CFLG|TBLD@1ST|YES, CLEAR ITS FLAG|
| |05 001A4|325EF4|A| | | | |
|271|05 001A7|23|A| |INX|H|AND INCREMENT|
|272|05 001A8|23|A| |INX|H|POINTER TO LS PART OF|
|273|05 001A9|23|A| |INX|H|ABS CLK COUNT OF NEXT|
|274|05 001AA|23|A| |INX|H|EVENT|
|275|05 001AB|C3B601|N| |ELSE:| | |
|276|05 001AE|2A5CFB|N| |LHLD|VAR@ADDR|H&L= ADDR|
|277|05 001B1|23|A| |INX|H|OF LS PART OF|
|278|05 001B2|23|A| |INX|H|ABS CLK COUNT TO|
|279|05 001B3|23|A| |INX|H|COMPARE TO FILL|
|280|05 001B4|23|A| |INX|H|POSITION|
|281|05 001B5|23|A| |INX|H| |
|282| | | | |ENDIF| | |
|283|05 001B6|225CFB|N| |SHLD|VAR@ADDR|STORE POINTER TO COMPARE EVENT|
|284|05 001B9|5E|A| |MOV|E,M|E= LS PART OF COMPARE ABS CLK|
|285|05 001BA|23|A| |INX|H| |
|286|05 001BB|56|A| |MOV|D,M|D= MS PART OF COMPARE ABS CLK|
|287|05 001BC|E1|A| |POP|H|H&L= ABS CLK COUNT OF FILL POS|
|288|05 001BD|EB|A| |IF:|XWRD,D,LT,H|IS CLK OF COMPARE < FILL|
| |05 001BE|CD0000|N| | | | |
| |05 001C1|D2E501|N| | | | |
|289|05 001C4|2A5CFB|N| |LHLD|VAR@ADDR|YES, SWITCH THE 2 EVENTS|
|290|05 001C7|EB|A| |XCHG| |D&E= ADDR LOWER CLK VALUE|
|291|05 001C8|2A52FB|N| |LHLD|FIX@ADDR|H&L= ADDR LARGER CLK VALUE|
|292|05 001CB|3EFB|A| |MVI|A,-5|INITIALIZE LOOP COUNTER TO 5|
|293|05 001CD|3265FA|N| |STA|TSW@NUM|WHICH = # OF ITEMS TO MOVE|
|294|05 001D0|B7|A| |ORA|A|CLEAR Z CONDITION BIT|
|295|05 001D1|CAE501|N| |WHILE:|CC,Z,C| |
|296|05 001D4|1A|A| |LDAX|D|A= CONTAINS OF COMPARE EVENT|
|297|05 001D5|46|A| |MOV|B,M|B= CONTAINS OF FILL EVENT|
|298|05 001D6|77|A| |MOV|M,A|UPDATE FILL POS|
|299|05 001D7|78|A| |MOV|A,B|UPDATE COMPARE POS|
|300|05 001D8|12|A| |STAX|D|WITH NEW VALUE|
|301|05 001D9|13|A| |INX|D|MOVE POINTERS TO|
|302|05 001DA|23|A| |INX|H|NEXT ITEM|
|303|05 001DB|3A65FA|N| |LDA|TSW@NUM|INC MOVE|
|304|05 001DE|3C|A| |INR|A|LOOP CONTROL|
|305|05 001DF|3265FA|N| |STA|TSW@NUM|COUNTER|
|306|05 001E2|C30101|N| |ENDWHILE| | |
|307| | | | |ENDIF| | |
|308|05 001E5|2153FA|N| |DECBYT|IN@LP@CT|DECRM INNER LOOP CNTR|
| |05 001E8|35|A| | | | |
|309|05 001E9|2A52FB|N| |LHLD|FIX@ADDR|H&L= ADDR OF FILL POSITION|
|310|05 001EC|C39501|N| |ENDWHILE| | |
|311|05 001EF|110500|A| |LXI|D,5|MOVE H&L TO LOOK AT NEXT EVENT|
|312|05 001F2|19|A| |DAD|D|POSITION TO FILL|
|313|05 001F3|3A63FA|N| |LDA|TBLD@TMP|DECREMENT # OF EVENTS|
|314|05 001F6|3D|A| |DCR|A|TO SORT|
|315|05 001F7|3263FA|N| |STA|TBLD@TMP| |
|316|05 001FA|C38101|N| |ENDWHILE| | |

TABLE VI

| | | | | | | | |
|---|---|---|---|---|---|---|---|
|223| | | |*| | | |
|224| | | |*| |MOVE THE SR# & EVENT ADDR FROM ROM TABLE| | |
|225| | | |*| |TO RAM TABLE. MOVES ONLY THE FIRST 3 IF| | |
|226| | | |*| |NO IMAGE SHIFT, OTHERWISE MOVES ALL 6| | |
|227| | | |*| | | | |
|228|05 00160|1144FC|N| |LXI|D,RAM@FSH|D&E = ADDR OF RAM TABLE|
|229|05 00163|210000|N| |LXI|H,ROM@FSH|H&L = ADDR OF ROM TABLE|
|230|05 00166|B0|A| |ORA|B|CLEAR Z CONDITION BIT|
|231|05 00167|CA7E01|N| |WHILE:|CC,Z,C| |
|232|05 0016A|23|A| |INX|H|INCREMENT H&L AND D&E|
|233|05 0016B|23|A| |INX|H|POINTERS OVER THE|
|234|05 0016C|13|A| |INX|D|ABS CLK COUNT|
|235|05 0016D|13|A| |INX|D| |
|236|05 0016E|7E|A| |MOV|A,M|LOAD A WITH SR#|
|237|05 0016F|12|A| |STAX|D|STORE SR# IN RAM TABLE|
|238|05 00170|23|A| |INX|H|MOVE POINTERS TO LS|
|239|05 00171|13|A| |INX|D|ADDR OF EVENT|
|240|05 00172|7E|A| |MOV|A,M|LOAD A WITH LS ADDR OF EVENT|
|241|05 00173|12|A| |STAX|D|& STORE IT IN RAM TABLE|
|242|05 00174|23|A| |INX|H|MOVE POINTERS TO MS|
|243|05 00175|13|A| |INX|D|ADDR OF EVENT|
|244|05 00176|7E|A| |MOV|A,M|MOVE MS ADDR OF EVENT|
|245|05 00177|12|A| |STAX|D|TO RAM|
|246|05 00178|23|A| |INX|H|MOVES POINTERS TO|
|247|05 00179|13|A| |INX|D|LS PART OF ABS CLK COUNT|
|248|05 0017A|05|A| |DCR|B|DECREMENT LOOP COUNTER|
|249|05 0017B|C36701|N| |ENDWHILE| | |
|250| | | | | | | |

TABLE VII

| | | | | | | | |
|---|---|---|---|---|---|---|---|
|318| | | |*| | | |
|319| | | |*| |MERGE VARIABLE PITCH EVENT TABLE & FIXED EVENT| | |
|320| | | |*| |TABLE CALCULATING THE REL DIFFERENCE WITH THE| | |
|321| | | |*| |RESULTS GOING INTO THE RUN EVENT TABLE| | |
|322| | | |*| | | | |
|323|05 001FD|2A44FC|N| |LHLD|EV@RAM|INITIALIZE VAR@CLK TO ABS CLK|
|324|05 00200|225EFB|N| |SHLD|VAR@CLK|COUNT OF 1ST VAR PITCH EVENT|
|325|05 00203|2144FC|N| |LXI|H,EV@RAM|INITIALIZE VAR@ADDR TO ADDR OF|
|326|05 00206|225CFB|N| |SHLD|VAR@ADDR|1ST VAR PITCH EVENT|
|327|05 00209|211E00|N| |LXI|H,EV@ROM|INITIALIZE FIX@ADDR TO ADDR OF|
|328|05 0020C|2252FB|N| |SHLD|FIX@ADDR|1ST FIXED PITCH EVENT|
|329|05 0020F|3E80|A| |SFLG|TBLD@1ST|NOTES 1ST EVENT TO RUN TABLE|
| |05 00211|325EF4|A| | | | |
|330|05 00214|3E2C|A| |MVI|A,TABLENUM|INITIALIZE TSW@NUM TO # OF|
|331|05 00216|3265FA|N| |STA|TSW@NUM|EVENTS IN FIXED PITCH TABLE|
|332|05 00219|2A1E00|N| |LHLD|FV@ROM|INITIALIZE D&E WITH ABS CLOCK|
|333|05 0021C|EB|A| |XCHG| |COUNT OF 1ST FIXED EVENT|

```
334    05 0021D    AF          A   CFLG    VARaDONE              FLAG DENOTES VAR EVENTS
       05 0021E    3259F4      A
335    05 00221    3A59F4      A   WHILE1  FLG,VARaDONE,F        WHILE THERE ARE MORE VAR EVENTS
       05 00224    07          A
       05 00225    DA6F02      N
336    05 00228    2A5EFB      N           IF1     XWRD,VARaCLK,LE,D   IS VAR CLK CNT <= FIXED CLK CNT
       05 0022B    CD0000      N
       05 0022E    DA3402      N
       05 00231    C25902      N
337    05 00234    2A5CFB      N                   LHLD    VARaADDR      YES, H&L= VAR EVENT ADDR
338    05 00237    CD9302      N                   CALL    TBLDaUPD      PLACE VAR EVENT AT END RUN TBL
339    05 0023A    3A62FA      N                   LDA     TBLDaNUM      DECREMENT # OF
340    05 0023D    3D          A                   DCR     A             VARIABLE EVENTS LEFT
341    05 0023E    3262FA      N                   STA     TBLDaNUM      TO MERGE
342    05 00241    C24C02      N                   IF1     CC,Z,S        DID TBLDaNUM GO TO 0
343    05 00244    3E80        A                           SFLG    VARaDONE   YES,DENOTE NO MORE VAR EVENTS
       05 00246    3259F4      A
344    05 00249    C35602      N                   ELSE:
345    05 0024C    225CFB      N                           SHLD    VARaADDR   STORE ADDR OF NEXT VAR EVENT
346    05 0024F    5E          A                           MOV     E,M         UPDATE VARaCLK TO
347    05 00250    23          A                           INX     H           VALUE OF ABS CLK COUNT
348    05 00251    56          A                           MOV     D,M         OF PRESENT VARIABLE
349    05 00252    EB          A                           XCHG                EVENT
350    05 00253    225EFB      N                           SHLD    VARaCLK
351                                                ENDIF
352    05 00256    C36602      N           ELSE:
353    05 00259    2A52FB      N                   LHLD    FIXaADDR      IF FIXED TABLE CLK COUNT IS
354    05 0025C    CD9302      N                   CALL    TBLDaUPD      LESS THEN VAR TABLE UPDATE THE
355    05 0025F    2252FB      N                   SHLD    FIXaADDR      RUN TABLE WITH THAT EVENT
356    05 00262    2165FA      N                   LXI     H,TSWaNUM     UPDATE TO NEXT FIXED EVENT
357    05 00265    35          A                   DCR     M             DECREMENT # OF FIXED EVENTS
358                                        ENDIF                          LEFT
359    05 00266    2A52FB      N           LHLD    FIXaADDR
360    05 00269    5E          A           MOV     E,M                   UPDATE D&L TO =
361    05 0026A    23          A           INX     H                     ABS CLK CNT VALUE
362    05 0026B    56          A           MOV     D,M                   OF PRESENT FIXED TABLE
363    05 0026C    C32102      N   ENDWHILE
364    05 0026F    3EFF        A           MVI     A,X'FF'               CLEAR Z CONDITION
365    05 00271    B7          A           ORA     A                     BIT FOR LOOP
366    05 00272    2A52FB      N           LHLD    FIXaADDR              NO MORE VAR EVENTS, USE FIXED
367    05 00275    CA8402      N   WHILE1  CC,Z,C                        DONE WITH FIXED TABLE
368    05 00278    CD9302      N           CALL    TBLDaUPD              NO,UPDATE RUN TABLE
369    05 0027B    EB          A           XCHG                          SAVE H&L IN D&E
370    05 0027C    2165FA      N           LXI     H,TSWaNUM             DECREMENT # OF FIXED
371    05 0027F    35          A           DCR     M                     EVENTS LEFT
372    05 00280    EB          A           XCHG                          RESTORE H&L
373    05 00281    C37502      N   ENDWHILE
374    05 00284    2A58FB      N           LHLD    PaTBLaA               H&L=ADDR OF LAST MS ADDR IN RUN
375    05 00287    2B          A           DCX     H                     MOVE H&L POINTER BACK TO POINT
376    05 00288    2B          A           DCX     H                     AT THE BEGINNING OF THE LAST
377    05 00289    2B          A           DCX     H                     EVENT (OVERaRUN) & STORE IT
378    05 0028A    2264FD      N           SHLD    EVaPTR1               FOR MACH CLK INTERRUPT HANDLER
379    05 0028D    3E80        A           SFLG    TBLDaFIN              DENOTES PITCH TABLE IS COMPLETE
       05 0028F    3250F4      A
380    05 00292    C9          A           RET
382                                *
383                                *   SUBROUTINE TO CALCULATE REL DIFFERENCE BETWEEN
384                                *   2 EVENTS & MOVE REST OF TABLE TO RUN TABLE
385                                *
386    05 00293    3A5EF4      A   TBLDaUPD IF1    FLG,TBLDa1ST,T        THIS IS THE FIRST EVENT
       05 00296    07          A
       05 00297    D2AF02      N
387    05 0029A    AF          A           CFLG    TBLDa1ST              YES, CLR FLAG TO KEEP OUT
       05 0029B    325EF4      A
388    05 0029E    7E          A           MOV     A,M                   A= LS OF 1ST EVENT ABS CLK CNT
389    05 0029F    3251FA      N           STA     EVa1aTIM              USED AT PITCH PESET
390    05 002A2    5F          A           MOV     E,A                   E=LS OF 1ST EVENT ABS CLK CNT
391    05 002A3    23          A           INX     H                     H&L=ADDR OF MS ABS CLK CNT
392    05 002A4    56          A           MOV     D,M                   D=MS OF 1ST EVENT ABS CLK CNT
393    05 002A5    EB          A           XCHG                          D&E= ADDR OF MS ABS CLK CNT
394    05 002A6    2256FB      N           SHLD    LCLKaCNT              STORE ABS CLK OF 1ST EVENT
395    05 002A9    21E8FE      N           LXI     H,EVaBASE1            H&L = ADDR OF RUN TABLE
396    05 002AC    C3D802      N   ELSE:
397    05 002AF    5E          A           MOV     E,M                   E=LS CLK CNT OF NEW EVENT
398    05 002B0    23          A           INX     H                     H&L= ADDR OF MS ABS CLK CNT
399    05 002B1    56          A           MOV     D,M                   D=MS CLK CNT OF NEW EVENT
400    05 002B2    E5          A           PUSH    H                     SAVE ADDR OF MS ABS CLK CNT
401    05 002B3    2A56FB      N           IF:     XWRD,LCLKaCNT,GE,D    IS LAST CLK CNT GE NEW CLK CNT
       05 002B6    CD0000      N
       05 002B9    DAC502      N
402    05 002BC    23          A                   INX     H             H&L= LAST CLK CNT + 1
403    05 002BD    2256FB      N                   SHLD    LCLKaCNT      STORE IT FOR NEXT TIME
404    05 002C0    3E01        A                   MVI     A,1           PUT THIS EVENT AT THE NEXT CLK
405    05 002C2    C3CC02      N           ELSE:
406    05 002C5    45          A                   MOV     B,L           B=LS CLK CNT OF LAST EVENT
407    05 002C6    EB          A                   XCHG                  H&L=ABS CLK CNT OF NEW EVENT
408    05 002C7    2256FB      N                   SHLD    LCLKaCNT      STORE IT FOR THE NEXT TIME
409    05 002CA    7D          A                   MOV     A,L           A=LS CLK CNT OF NEW EVENT
410    05 002CB    90          A                   SUB     B             FIND DIFF (ONLY NEED LS IF CLK
411                                        ENDIF                         CNTS BETWEEN EVENTS <256)
412    05 002CC    D1          A           POP     D                     D&E=ADDR OF MS OF CLK OF NEW EV
413    05 002CD    2A58FB      N           LHLD    PaTBLaA               H&L= ADDR OF END OF LAST RUN EV
414    05 002D0    2B          A           DCX     H                     MOVE H&L POINTER
415    05 002D1    2B          A           DCX     H                     TO REL DIFF OF LAST
416    05 002D2    2B          A           DCX     H                     EVENT IN RUN TABLE
417    05 002D3    77          A           MOV     M,A                   MOVE REL DIFF TO RUN TABLE
418    05 002D4    23          A           INX     H                     INCREMENT RUN TABLE
419    05 002D5    23          A           INX     H                     POINTER OVER LAST
420    05 002D6    23          A           INX     H                     EVENT
421    05 002D7    23          A           INX     H
422                                ENDIF
423    05 002D8    23          A           INX     H                     H&L= ADDR OF SR# IN RUN TABLE
424    05 002D9    13          A           INX     D                     D&E= ADDR OF SR#
425    05 002DA    1A          A           LDAX    D                     MOVE SR# FROM TABLE TO
426    05 002DB    77          A           MOV     M,A                   RUN TABLE
427    05 002DC    23          A           INX     H                     MOVE POINTERS TO LS 8 BITS
```

```
428   05 002DD    13         A              INX     D                         OF EVENT ADDR
429   05 002DE    1A         A              LDAX    D                         MOVE LS 8 BITS OF ADDR
430   05 002DF    77         A              MOV     M,A
431   05 002E0    23         A              INX     H                         MOVES POINTER TO MS 8 BITS
432   05 002E1    13         A              INX     D                         OF EVENT ADDR
433   05 002E2    1A         A              LDAX    D                         MOVES MS 8 BITS OF ADDR
434   05 002E3    77         A              MOV     M,A
435   05 002E4    2258F8     N              SHLD    P@TBL@A                   STORE ADDR OF RUN TABLE
436   05 002E7    13         A              INX     D                         POINTER TO LS 8 BITS OF CLK CNT
437   05 002E8    EB         A              XCHG                              H&L= ADDR OF LS 8 BITS OF CLK
438   05 002E9    C9         A              RET
439
440                                  *
441                                  *      SUBROUTINE TO DETERMINE IF MODIFIED F0 ON EVENT
442                                  *      CLK COUNT IF CLK COUNT RESULTS ARE NEGATIVE OR 0
443                                  *
444   05 002EA    7C         A   ON@MOD     MOV     A,H                       A= MS PART OF ABS CLK COUNT
445   05 002EB    07         A              RLC                               CARRY= SIGN OF ABS CLK COUNT
446   05 002EC    D20203     N              IF:     CC,C,S                    IS THE ABS CLK CNT NEG
447   05 002EF    119603     A                 LXI     D,BASE@CNT             YES,ADD # CLK COUNTS PER PITCH
448   05 002F2    19         A                 DAD     D                      TO NEG #
449   05 002F3    118E03     A                 IF:     XWRD,H,GE,SAFE@CNT     IS RESULTS GE SAFE # CLK/PITCH
      05 002F6    C00000     N
      05 002F9    DAFF02     N
450   05 002FC    210100     A                    LXI     H,1                 YES,MOVE TO TURN ON LATER
451                                             ENDIF
452   05 002FF    C30E03     N              ORIF:   XWRD,H,EQ,0               IF RESULTS = 0, MOVE LATER IN
      05 00302    110000     A
      05 00305    C00000     N
      05 00308    C20E03     N
453   05 0030B    210100     A                 LXI     H,1                   PITCH,BECUASE FVENT MUST BE > 0
454                                          ENDIF
455   05 0030E    C9         A              RET
456                                          END

CONTROL SECTION SUMMARY:   01 00000   PT 0    02 00000   PT 0    03 00000   PT 0    04 0FFD8   PT 2
                           05 0030F   PT 1

* NO UNDEFINED SYMBOLS
*    ERROR SEVERITY LEVEL: 0
* NO ERROR LINES
```

TABLE VIII

```
219
220                                  *   PITCH RESET INTERRUPT HANDLER
221                                  *

223   06 000F9    FB         A   RSET1:    EI                                RE-ENABLE INTERRUPTS
224   06 000FA    F5         A             PUSH    PSW                      SAVE A-REG & CONDITION BITS
225   06 000FB    3A5DF4     A             IF:     FLG,TBLD@FIN,T            IS PITCH TABLE BUILD FINISHED
      06 000FE    07         A
      06 000FF    D26201     N
226   06 00102    E5         A                PUSH    H                     SAVE H&L
227                                           IF:     FLGS,SR@DONE,J        YES, IS THERE A NEW SR VALUE
228   06 00103    3A4DF4     A                        AND,910@DONE,T        YES, DID 910 EVENT GET DONE
      06 00106    216FF4     A
      06 00109    A6         A
      06 0010A    F25501     N
229   06 0010D    AF         A                    CFLG    910@DONE          YES, RESET & MACH CLK TIMING OK
      06 0010E    326FF4     A
230   06 00111    324DF4     A                    MODFLG  SR@DONE           CLR FLAG UNTIL NEXT SR EVENT
231   06 00114    2163FD     A                    LXI     H,ADR(DATA,SR@PTR1) LOAD RELATIVE
232   06 00117    7E         A                    MOV     A,M                PNTR TO SR #0
233   06 00118    C60F       A                    MODBYT  A,ADD,15           MOVE PNTR BACK
234   06 0011A    E66F       A                    MODBYT  A,AND,SR@ADJ         BY 1 (CIRCULAR)
235   06 0011C    77         A                    MOV     M,A               SAVE NEW REL SR PNTR IN SR@PTR1
236   06 0011D    26FE       A                    MVI     H,HADR(DATA,SHIFTREG) H&L= ABS ADDR
237   06 0011F    6F         A                    MOV     L,A                 OF SR #0
238   06 00120    3A69FD     A                    LDA     ADR(DATA,SR@VALU1) A= NEW SR VALUE FROM SRSK
239   06 00123    77         A                    MOV     M,A               UPDATE CONTENTS OF SR#0
240   06 00124    3A51FA     A                    LDA     ADR(DATA,EV@1@TIM) INIT MCLK:CNT
241   06 00127    326EFD     A                    STA     ADR(DATA,MCLK:CNT)   TO 1ST EVENT TIME
242   06 0012A    21E8FE     A                    LXI     H,ADR(DATA,EV@BASE1) INIT EV@PTR1
243   06 0012D    2264FD     A                    SHLD    ADR(DATA,EV@PTR1)     TO 1ST EVENT ADDR
244                                               IF:     FLGS,NORM@DN:,;    IS NORMAL SHUTDOWN REQUESTED
245                                                       AND,CYCL@DN:,;    NO, IS CYCLE-DOWN REQUESTED
246   06 00130    3AABF4     A                            AND,SD1@DLY,F     NO, IS PROC DEAD CYCLING
      06 00133    21AAF4     A
      06 00136    B6         A
      06 00137    21AFF4     A
      06 0013A    B6         A
      06 0013B    FA5201     N
247   06 0013E    2166FD     A                       LXI     H,ADR(DATA,CYCUPCT1) NO, LOAD CYCLE-UP CNTR
248   06 00141    7E         A                       IF:     XBYT,M,NE,5        IS PROC IN CYCLE-UP MODE
      06 00142    FE05       A
      06 00144    CA5201     N
249   06 00147    FE04       A                          IF:     XBYT,A,EQ,4    YES, IS IT RDY TO MAKE 1ST IMG
      06 00149    C25101     N
250   06 0014C    3E80       A                             SFLG    IMGMADE:    YES, SIGNAL 1ST IMAGE MADE
      06 0014E    32ADF4     A
251                                                       ENDIF
252   06 00151    34         A                          INR     M               INCRM CYCLE-UP CNTR (UNTIL= 5)
253                                                    ENDIF
254                                                  ELSE:                     NEW SR VALUE NOT AVAILABLE
255   06 00152    C36101     N                          SFLG    IMED@DN:       REQUEST AN IMED SHUTDOWN
256   06 00155    3E80       A
      06 00157    32A9F4     A
257   06 0015A    2132FD     A                          SFBIT,P E@PR@FLT       SIGNAL EARLY PITCH RESET FAULT
      06 0015D    3E40       A
      06 0015F    B6         A
      06 00160    77         A
258                                                  ENDIF
259   06 00161    E1         A                    POP     H                   RESTORE H&L
260                                            ENDIF
261   06 00162    3EFE       A                 MVI     A,RSETFF:             RESET PITCH RESET
262   06 00164    3200E6     A                 STA     ADR(EQU,RSINTFF:)        INT FLIP-FLOP
263   06 00167    F1         A                 POP     PSW                   RESTORE A-REG & CONDITION BITS
264   06 00168    C9         A                 RET                           RETURN TO INTERRUPTED ROUTINE
```

TABLE IX

* MACHINE CLOCK INTERRUPT HANDLER

```
57
58         * MACHINE CLOCK INTERRUPT HANDLER
59         *
61    06 0002B                    ORIGIN    X'38'                         INTERRUPT TRAP CELL LOCATION 64    06 00038   F5        A  MCLK:  PUSH    PSW                          SAVE A-REG & CONDITION CODES
65    06 00039   3A6EFD    A         LDA     ADR(DATA,MCLK:CNT)           IS THERE
66    06 0003C   3D        A         DCR     A                                         A PITCH
67    06 0003D   C26600    N         IF:     CC,Z,S                                             EVENT TO DO
68    06 00040   E5        A         PUSH    H                            YES, SAVE
69    06 00041   D5        A         PUSH    D                                   ALL REMAINING
70    06 00042   C5        A         PUSH    B                                                 REGS
71    06 00043   2A64FD    A         LHLD    ADR(DATA,EV@PTR)             H&L= 1ST LOC OF NEXT PE TO DO
72    06 00046   7E        A         MOV     A,M                          SAVE RELATIVE DIFFERENTIAL TO
73    06 00047   326EFD    A         STA     ADR(DATA,MCLK:CNT)           NEXT EVENT (# CLOCK COUNTS)
74    06 0004A   23        A         INX     H                            MOVE PNTR TO RFL SR IN TABLE
75    06 0004B   3A63FD    A         LDA     ADR(DATA,SR@PTR)             LOAD REL POSITION OF SR #0
76    06 0004E   86        A         MODBYT  A,ADD,M                      C= LS PORTION OF ADDR OF THE
77    06 0004F   E66F      A         MODBYT  A,AND,SR@ADJ:                REQUESTED SHIFT REGISTER
78    06 00051   4F        A         MOV     C,A                          POSITION (FOR USE WITHIN PE)
79    06 00052   06FE      A         MVI     B,HADR(SHIFTREG)             B&C= ADDR REQUESTED SR POSITION
80    06 00054   0A        A         LDAX    B                            A= <REQUESTED SR POSITION>
81    06 00055   23        A         INX     H                            E= LS PORTION OF ADDR OF THE
82    06 00056   5E        A         MOV     E,H                          REQUESTED PITCH EVENT
83    06 00057   23        A         INX     H                            D= HS PORTION OF ADDR OF THE
84    06 00058   56        A         MOV     D,M                          REQUESTED PITCH EVENT
85    06 00059   23        A         INX     H                            SAVE PNTR TO
86    06 0005A   2264FD    A         SHLD    ADR(DATA,EV@PTR)                          NEXT PITCH EVENT
87    06 0005D   CD0000    N         CALL    DE:IND                       VECTOR TO REQUESTED PITCH EVENT
88    06 00060   C1        A         POP     B                            RESTORE
89    06 00061   D1        A         POP     D                                    SAVED
90    06 00062   E1        A         POP     H                                          REGISTERS
91    06 00063   C37000    N         ELSE:
92    06 00066   326EFD    A         STA     ADR(DATA,MCLK:CNT)           NO PE, SAVE DECRM'D 'MCLK:CNT'
93    06 00069   0F        A         RRC                                  IS IT TIME FOR
94    06 0006A   027000    N         IF:     CC,C,S                                     A REFRESH
95    06 0006D   3202E6    A              REFRESH                         YES, REFRESH REMOTES (1 MSEC)
96                                   ENDIF
97                                   ENDIF
98    06 00070   FB        A         EI                                   RE-ENABLE INTERRUPT SYSTEM
99    06 00071   3EFD      A         MVI     A,MCLKFF:                    RESET MCLK
100   06 00073   3200E6    A         STA     ADR(EQU,RSINTFF:)                        INTERRUPT FLIP-FLOP
101   06 00076   F1        A         POP     PSW                          RESTORE A-REG & CONDITION CODES
102   06 00077   C9        A         RET                                  RETURN TO INTERRUPTED ROUTINE
```

TABLE X

* REAL TIME CLOCK INTERRUPT HANDLER

```
139
140        * REAL TIME CLOCK INTERRUPT HANDLER
141        *
143   06 00081   FB        A  RTC:   EI                                   RE-ENABLE INTERRUPTS
144   06 00082   F5        A         PUSH    PSW                          SAVE A-REG & CONDITION BITS
145   06 00083   3EF7      A         MVI     A,RTCFF:                     RESET RTC
146   06 00085   3200E6    A         STA     ADR(EQU,RSINTFF:)                        INTERRUPT FLIP-FLOP
147   06 00088   D5        A         PUSH    D                            SAVE D&E REGS
148   06 00089   E5        A         PUSH    H                            SAVE H&L REGS
149   06 0008A   C5        A         PUSH    B                            SAVE 'B' REGISTER
150                                  *
151   06 0008B   2150FD    N         DECBYT  GLB:TIMR                     DECREMENT THE CLOCK CELL
      06 0008E   35        A
152   06 0008F   7E        A         MOV     A,M                          A = <GLB:TIMR> ( 0 TO 255 )
153   06 00090   23        A         INX     H                            MEM. PTR. TO SR:RQST BYTE
154   06 00091   E601      A         IF:     XBYT,A,AND,X'01',NZ          IS IT 20 MSEC TIME YET
      06 00093   CA9D00    N
155   06 00096   7E        A              MODBYT  M,OR,10:RQST!20:RQST    YES = BOTH 10 AND 20 BKGD
      06 00097   F6C0      A
      06 00099   77        A
156   06 0009A   C3A100    N         ELSE:
157   06 0009D   7E        A              MODBYT  M,OR,10:RQST            NO = 10 BKGD ONLY
      06 0009E   F680      A
      06 000A0   77        A
158                                  ENDIF
159   06 000A1   23        A         INX     H                            MEM. PTR. TO DIVD:10 CNTR
160   06 000A2   35        A         DCR     M                            DECREMENT 10 TO 0 COUNTER
161   06 000A3   C2AD00    N         IF:     CC,Z,S                       HAS 100 MSEC PASSED
162   06 000A6   360A      A              MVI     M,10                    YES = RESET THE 10 TO 0 COUNTER
163   06 000A8   2B        A              DCX     H                       MEM. PTR. BACK TO SR:RQST
164   06 000A9   7E        A              MODBYT  M,OR,100:RQST           ADD 100 BKGD TO REQUEST BYTE
      06 000AA   F620      A
      06 000AC   77        A
165                                  ENDIF
166                                  REPEAT                               NOW CHECK FOR TIME OUTS
167   06 000AD   2150FD    N         LXI     H,GLB:TIMR                   LOAD 'B' WITH QUANTITY TO LOOK
168   06 000B0   46        A         MOV     B,M                          FOR (CLOCK CELL VALUE)
169   06 000B1   16FB      A         MVI     D,CBUNT:                     SET 'D' FOR TABLE TO SEARCH
170   06 000B3   CD0000    N         CALL    FIND:LOC                     GO LOOK IN ACTIVE LIST
171   06 000B6   CAF000    N         IF:     CC,Z,C                       HAS A MATCH BEEN FOUND
172   06 000B9   E5        A              PUSH    H                       YES = SAVE LOCATION ON STACK
173   06 000BA   26FC      A              MVI     H,ID:                   SEGWAY MEM PTR TO ID: TABLE
174   06 000BC   5E        A              MOV     E,M                     NOW ASSEMBLE
175   06 000BD   1600      A              MVI     D,0                     ADDRESS OF TIMER
176   06 000BF   21C8F4    A              LXI     H,THR:FLGS              FLAG INTO THE
177   06 000C2   19        A              DAD     D                       MEMORY POINTER
178   06 000C3   0600      A              MVI     B,0                     GET SET TO CLEAR THE FLAG
179   06 000C5   F3        A              DI                              NO INTERRUPTION'S NOW, PLEASE
180   06 000C6   7E        A              MOV     A,M                     GET FLAG
181   06 000C7   07        A              RLC                             INTO THE CARRY BIT
182   06 000C8   D2EC00    N              IF:     CC,C,S                  IS FLAG SET
183   06 000CB   70        A                   MOV     M,B                YES = RESET AND NOW
```

```
184  06 000CC  FB       A              EI                        EVERYBODY CAN INTERRUPT AGAIN
185  06 000CD  E1       A              POP       H               LOCATION FROM STACK TO MEM PTR
186  06 000CE  26FD     A              MVI       H,LS:ADDR       SEGWAY MEM PTR TO LS: TABLE
187  06 000D0  5E       A              MOV       E,M             GET LS TIME-OUT ADDRESS
188  06 000D1  24       A              INR       H               SEGWAY MEM PTR TO MS: TABLE
189  06 000D2  56       A              MOV       D,M             GET MS TIME-OUT ADDRESS
190  06 000D3  45       A              MOV       B,L             LOCATION TO 'B' TEMPORARILY
191  06 000D4  2A5FFD   N              LHLD      INPTRI          STUFF TIME-OUT ADDRESS INTO
192  06 000D7  73       A              MOV       M,E             INTO TABLE OF "TIME-OUT
193  06 000D8  23       A              INX       H               ADDRESSES THAT IS CHECKED
194  06 000D9  72       A              MOV       M,D             FOR ENTRIES EVERY 10 MSECONDS
195  06 000DA  23       A              INX       H               BY THE STATE CHECKER
196  06 000DB  7D       A              MODBYT    L,AND,TIME:MSK  FORCE A CIRCULAR TABLE
     06 000DC  E62F     A
     06 000DE  6F       A
197  06 000DF  225FFD   N              SHLD      INPTRI          SAVE NEW ADDRESS LOCATION
198  06 000E2  58       A              MOV       E,B             LOCATION BACK TO 'E'
199  06 000E3  CD0000   N              CALL      DEACTIVI        TAKE OUT OF ACTIVE TIMER LIST
200  06 000E6  CD0000   N              CALL      PUTI            AND MAKE LOCATION AVAILABLE
201  06 000E9  C3EE00   N              ELSE:                     * * * FLAG IS NOT SET SO
202  06 000EC  FB       A              EI                        LET INTERRUPTIONS OCCUR
203  06 000ED  E1       A              POP       H               MAKE THE STACK RIGHT AND
204                                    ENDIF                     FORCE NON-ZERO CONDITION TO
205  06 000EE  F601     A              MODBYT    A,OR,1          STAY IN UNTIL LOOP
206                                    ENDIF                     * * * NO MATCH - RTC COMPLETE
207  06 000F0  C2AD00   N              UNTIL:    CC,Z,S          WILL FALL THROUGH THIS CRACK
208                                 *
209  06 000F3  E1       A              POP       H               RESTORE THE
210  06 000F4  44       A              MOV       B,H             'B' REGISTER
211  06 000F5  E1       A              POP       H               RESTORE H&L REGS
212  06 000F6  D1       A              POP       D               RESTORE D&E REGS
213  06 000F7  F1       A              POP       PSW             RESTORE A-REG & CONDITION CODES
214  06 000F8  C9       A              RET                       RETURN TO 'FLOAT' BACKGROUND
215                                 *
```

TABLE XI

```
267
268                           ***********************************************************
269                           *
270                           *        TURNS OFF UNLOAD LAMPS AS MODULES ARE UNLOADED    *
271                           *                                                          *
272                           *    CALLED BY: RDY,NRDY(SLOW SCAN)                        *
273                           *
274                           ***********************************************************
275  05 0028B  3A54F4   A     BIN@CHK  IF:     FLG,SRT@SEL,T            IS SORTER SELECTED
     05 0028E  07       A
     05 0028F  D2D402   N
276  05 00292  3A32F4   A              IF:     FLG,JB@INCMP,F           IS JOB INCOMPLETE
     05 00295  07       A
     05 00296  DA9F02   N
277  05 00299  CDD802   N                      CALL    SRT@UPDT         UPDATE MODULE INFO
278  05 0029C  C3CB02   N              ORIF:   FLG,SRT@RDY,F            IS SORTER READY
     05 0029F  3A8CF7   A
     05 002A2  07       A
     C3 002A3  DAB302   N
279  05 002A6  3A50F4   A              IF:     FLG,SRT@JAM,F            NO SORTER JAM
     05 002A9  07       A
     05 002AA  DAB002   N
280  05 002AD  CDD802   N                      CALL    SRT@UPDT         NO-UPDATE MODULE INFO
281                                    ENDIF
282  05 002B0  C3CB02   N              ORIF:   IBIT,SRT#LFUL,F          IS LOWER EMPTY
     05 002B3  2E99     A
     05 002B5  CD0000   N
     05 002B8  DACB02   N
283  05 002BB  2E9B     A              ANDIF:  IBIT,SRT#UFUL,F          YES-IS UPPER EMPTY
     05 002BD  CD0000   N
     05 002C0  DACB02   N
284  05 002C3  CDD802   N                      CALL    SRT@UPDT         YES-UPDATE MODULE SELECTION
285  05 002C6  3E80     A                      SFLG    TWO@AVAL         TELL PROG TWO EMPTY
     05 002C8  3262F4   A
286                                    ENDIF
287  05 002CB  3A49FA   N                      LDA     BIN&NUMB
288  05 002CE  3254FA   N                      STA     JAM@CNT
289  05 002D1  CD2602   N                      CALL    SRT&BINS         UPDATE BINS AVAILABLE
290                                    ENDIF
291  05 002D4  CDC103   N                      CALL    LITE@OFF
292  05 002D7  C9       A                      RET
293                                 *
294                                 *
295  05 002D8  3ACAE2   A     SRT@UPDT IF:     NVBIT,SRT@UP,T           IS UPPER PREFERED
     05 002DB  E602     A
     05 002DD  CAF502   N
296  05 002E0  112600   A              ANDIF:  XWRD,QTY&SEL,LT,X'26'    SHOULD UPPER BE PREFERRED
     05 002E3  2A6EFC   A
     05 002E6  CDC000   N
     05 002E9  D2F502   N
297  05 002EC  CD3003   N                      CALL    UP@CHEK          YES-CHECK UPPER FIRST
298  05 002EF  DC1103   N                      CC      LOW@CHEK         IF UPPER WAS FULL-TRY LOWER
299  05 002F2  C3FB02   N              ELSE:
300  05 002F5  CD1103   N                      CALL    LOW@CHEK         CHECK LOWER
301  05 002F8  DC3003   N                      CC      UP@CHEK          IF LOWER IS FULL-TRY UPPER
302                                    ENDIF
303  05 002FB  D20A03   N              IF:     CC,C,S                   WAS A MODULE EMPTY
304  05 002FE  3E80     A                      SFLG    CYCL&DN:         SET CYCLE DOWN
     05 00300  32AAF4   A
305  05 00303  AF       A                      CFLG    SRT@RDY          SORTER IS NOT READY
     05 00304  328CF7   A
306  05 00307  CD0401   N                      CALL    JOBS@CLR         CANCEL JOB SUPP
307                                    ENDIF
308  05 0030A  CD7D03   N                      CALL    LITE@ON          TURN ON UNLOAD LAMPS
309  05 0030D  CDCD05   N                      CALL    BIN@CONV         SEND OUT BIN SELECTION
310  05 00310  C9       A                      RET
311                                 * CHECK LOWER MODULE AND SET UP FOR LOWER IF EMPTY
312                                 *
```

```
313  05 00311   3A52F4   A   LOWOCHEK IF:      FLG,SRTOLFUL,F         IS LOWER EMPTY
     05 00314   07       A
     05 00315   DA2F03   N
314  05 00318   3E80     A                SFLG      LOW@MOD          YES-SET FLAG FOR LOWER
     05 0031A   3237F4   A
315  05 0031D   CD0000   N                COBIT,S   SRT$DEFL         TURN OFF DEFLECTOR
     05 00320   E3EF     A
316  05 C0322   CD0000   N                COBIT,S   SRT$UMOT         TURN OFF UPPER MOTOR
     05 00325   EAEF     A
317  05 00327   CD0000   N                COBIT,S   SRT$U$L          SET UP/DOWN BIT TO LOWER
     05 0032A   F9EF     A
318  05 0032C   CD4903   N                CALL      AUTOSTRT         CALL RESTART ROUTINE
319                                  ENDIF
320  05 0032F   C9       A            RET
321
322                              • CHECK UPPER MODULE AND SET UP FOR UPPER IF EMPTY
323
324  05 00330   3A57F4   A   UPOCHEK  IF:      FLG,SRTOUFUL,F         IS UPPER EMPTY
     05 00333   07       A
     05 00334   DA4803   N
325  05 00337   AF       A                CFLG      LOW@MOD          YES-SET FLAG FOR UPPER
     05 00338   3237F4   A
326  05 0033B   CD0000   N                COBIT,S   SRT$LMOT         TURN OFF LOWER MOTOR
     05 0033E   E9EF     A
327  05 00340   CD0000   N                SOBIT,S   SRT$U$L          SET UP/DOWN BIT FOR UPPER
     05 00343   F910     A
328  05 00345   CD4903   N                CALL      AUTOSTRT         CALL RESTART ROUTINE
329                                  ENDIF
330  05 00348   C9       A            RET
331
332                              • START PROCESSOR IF CONDITIONS ARE MET
333
334  05 00349   3E80     A   AUTOSTRT SFLG      SRTORDY              SORTER IS READY
     05 0034B   328CF7   A
335  05 0034E   3A5CF4   A            IF:       FLG,STRT@SET,T       IS A NEW SET REQUESTED
     05 00351   07       A
     05 00352   D27603   N
336  05 00355   3A32F4   A                IF:       FLG,JB@INCHP,T   IS JOB FINISHED
     05 00358   07       A
     05 00359   D27203   N
337  05 0035C   3A08F4   A                   IF:      FLG,ADH@MSEL,T  NO- IS MULTIPLE FEED SEL
     05 0035F   07       A
     05 00360   D27203   N
338  05 00363   3A53FD   N                   ANDIF:  XBYT,STATE:,LT,:PRNT  YES-IN PRINT
     05 00366   FE04     A
     05 00368   D27203   N
339  05 0036B   CD0000   N                      STIMR   SRT@AUTO,1000,PRT@OK BEGIN STARTUP DELAY
     05 0036E   48       A
     05 0036F   64       A
     05 00370   0000     N
340                                        ENDIF
341                                  ENDIF
342  05 00372   AF       A            CFLG      STRT@SET
     05 00373   325CF4   A
343                                  ENDIF
344  05 00376   3E01     A            MVI       A,1
345  05 00378   3249FA   N            STA       BIN@NUMB             SELECT BIN 1
346  05 0037B   07       A            RLC                            CLEAR CARRY
347  05 0037C   C9       A            RET
```

TABLE XII

```
487
488                              • TABLE OF ARRIVAL AND DEPARTURE 'HANDLER' SUBROUTINES
489
490  05 00291   00C0    N   ARV&DPT  DW       RETURN:          NO JAM SW IN THIS POSITION
491  05 00293   F5C2    N            DW       P2@DPT          PET SW #2 DEPARTURE SUBR
492  05 00295   E002    N            DW       R1@DPT          RET SW #1 DEPARTURE SUBR
493  05 00297   D402    N            DW       J6@DPT          JAM SW #6 DEPARTURE SUBR
494  05 00299   0000    N            DW       J*START         TELL SRT TO START JAM CHECKING
495  05 0029B   CAC2    N            DW       J5@DPT          JAM SW #4 DEPARTURE SUBR
496  05 0029D   C002    N            DW       J3@DPT          JAM SW #3 DEPARTURE SUBR
497  05 0029F   86C2    N            DW       J2@DPT          JAM SW #2 DEPARTURE SUBR
498  05 002A1   0000    N            DW       RETURN:         NO JAM SW IN THIS POSITION
499  05 002A3   F002    N            DW       R2@ARV          RET SW #2 ARRIVAL SUBR
500  05 002A5   CFC2    N            DW       P1@ARV          PET SW #1 ARRIVAL SUBR
501  05 002A7   CFC2    N            DW       J6@ARV          JAM SW #6 ARRIVAL SUBR
502  05 002A9   CF02    N            DW       J5@ARV          JAM SW #5 ARRIVAL SUBR
503  05 002AB   C502    N            DW       J4@ARV          JAM SW #4 ARRIVAL SUBR
504  05 002AD   B802    N            DW       J3@ARV          JAM SW #3 ARRIVAL SUBR
505  05 002AF   8102    N            DW       J2@ARV          JAM SW #2 ARRIVAL SUBR 508  05 002B1   2188FC  N   J2@ARV   DECBYT   JAM@CNT1        SIGNAL COPY ARRIVAL FROM FDRS
     05 002B4   35      A
509  05 002B5   C9      A            RET 511  05 002B6   2189FC  N   J2@DPT   INCBYT   JAM@CNT2        SIGNAL COPY DEPART FROM JAM 2
     05 002B9   34      A
512  05 002BA   C9      A            RET 515  05 002BB   2189FC  N   J3@ARV   DECBYT   JAM@CNT2        SIGNAL COPY ARRIVAL FROM JAM 2
     05 002BE   35      A
516  05 002BF   C9      A            RET 518  05 002C0   218AFC  N   J3@DPT   INCBYT   JAM@CNT3        SIGNAL COPY DEPART FROM JAM 3
     05 002C3   34      A
519  05 002C4   C9      A            RET 522  05 002C5   218AFC  N   J4@ARV   DECBYT   JAM@CNT3        SIGNAL COPY ARRIVAL FROM JAM 3
     05 002C8   35      A
523  05 002C9   C9      A            RET 525  05 002CA   218BFC  N   J4@DPT   INCBYT   JAM@CNT4        SIGNAL COPY DEPART FROM JAM 4
     05 002CD   34      A
526  05 002CE   C9      A            RET
```

TABLE XIII

```
640
641          ************************************************************
642          *                                                          *
643          *          CALCULATES JAM DELAY AND LOADS DELAY TIMERS     *
644          *   CALLED BY: PAP                                         *
645          *                                                          *
646          ************************************************************
647
648   05 00601   2161FA   N   JM@START INCBYT   SHEETS@              INC. NO. SHEETS IN SORTER
      05 00604   34       A
649   05 00605   3A54FA   N            LDA      JAM@CNT
650   05 00608   47       A            MOV      B,A
651   05 00609   3E1B     A            MVI      A,27
652   05 0060B   90       A            SUB      B                   SUBTRACT FROM 28
653   05 0060C   5F       A            MOV      E,A
654   05 0060D   B7       A            ORA      A                   ZERO CARRY BIT
655   05 0060E   1F       A            RAR                          DIVIDE BY 2
656   05 0060F   57       A            MOV      D,A
657   05 00610   7B       A            MOV      A,E
658   05 00611   B7       A            ORA      A                   ZERO CARRY BIT
659   05 00612   17       A            RAL                          MULTIPLY BY 2
660   05 00613   83       A            ADD      E
661   05 00614   82       A            ADD      D
662   05 00615   1625     A            MVI      D,37                OVERALL JAM DELAY
663   05 00617   82       A            ADD      D
664   05 00618   57       A            MOV      D,A
665   05 00619   3A37F4   A            IFI      FLG,LOW@MOD,F       IS LOWER MODULE BEING USED
      05 0061C   07       A
      05 0061D   DA2406   N
666   05 00620   3E20     A            MVI      A,32                ADD IN VERT TRANSPORT DELAY
667   05 00622   82       A            ADD      D                   ADD IN VERT DELAY
668   05 00623   57       A            MOV      D,A
```

```
485   05 004A3   2E9A     A   UPØCHK   IFI         1BIT,SRTØUENT,T         IS SHEET ENTERING UPPER MØD
      05 004A5   CD0000   N
      05 004A8   D2B604   N
486   05 004AB   3E80     A            SFLG        UPØENT
      05 004AD   3263F4   A
487   05 004B0   CDCA06   N            CALL        SRTØJAMA                SHEET STUCK ØR ØN TIME
488   05 004B3   C3D204   N   ØRIFI    FLG,UPØENT,T                        IS THIS A TRAIL EDGE
      05 004B6   3A63F4   A
      05 004B9   07       A
      05 004BA   D2D204   N
489   05 004BD   AF       A            CFLG        UPØENT
      05 004BE   3263F4   A
490   05 004C1   3E80     A            SFLG        SRTØUFUL                SET UPPER FULL FLAG
      05 004C3   3257F4   A
491   05 004C6   2A7EFB   N            LHLD        SRTØUDEL
492   05 004C9   CD0000   N            CALL        BCDØINC                 INC UP DEL RAM CØUNTER
493   05 004CC   227EFB   N            SHLD        SRTØUDEL
494   05 004CF   CDD304   N            CALL        PAPØENT
495                                    ENDIF
496   05 004D2   C9       A            RET
497
498          ***********************************************************************
499          *                                                                     *
500          *                    SHEET ENTERED BIN RØUTINE                        *
501          *                                                                     *
502          *           CALLED BYI LØWØCHK,UPØCHK                                 *
503          *                                                                     *
504          ***********************************************************************
505
506   05 004D3   3A6DFA   N   PAPØENT  LDA         DLYØCHEK                GET CURRENT TIMER I.D.
507   05 004D6   57       A            MØV         D,A                     SAVE TIMER I.D. IN D-REG
508   05 004D7   CD4705   N            CALL        PTRØRST                 INC I.D. & CHECK WRAPARØUND
509   05 004DA   326DFA   N            STA         DLYØCHEK                SAVE NEW I.D.
510   05 004DD   5A       A            CTIMR       D                       RESET PRESENT TIMER
      05 004DE   CD0000   N
511   05 004E1   2161FA   N            DECBYT      SHEETSØ
      05 004E4   35       A
512   05 004E5   FA4305   N            IFI         CC,S,C                  IS SHEETSØ PØSITIVE
513   05 004E8   3A50F4   A                IFI     FLG,SRTØJAM,F           HAS A JAM ØCCURED
      05 004EB   07       A
      05 004EC   DA4005   N
514   05 004EF   216CFA   N                        INCBYT      DLVØ50      INC SHEET CØUNTER FØR STACKS
      05 004F2   34       A
515   05 004F3   3E03     A                        MVI         A,3         LØAD A WITH 3 FØR DELØINC
516   05 004F5   CD0000   N                        CALL        DELØINC
517   05 004F8   3A40F4   A                        IFI         FLG,ØRGØDEL,T   IS THIS LAST CØPY FØR ØRIG
      05 004FB   07       A
      05 004FC   D21405   N
518   05 004FF   3AAOF4   A                        ANDIFI      FLG,SD1ØDEL,T   IS THIS LAST SIDE 2
      05 00502   07       A
      05 00503   D21405   N
519   05 00506   3A53F4   A                            IFI           FLG,SRTØØDD,F  IS ØDD LAST ØRIG CØMING
      05 00509   07       A
      05 0050A   DA1005   N
520   05 0050D   CDBB01   N                                CALL    MØTØØFF        TURN ØFF MØTØRS
521                                                    ENDIF
522   05 00510   AF       A                                CFLG    SRTØØDD
      05 00511   3253F4   A
523                                                ENDIF
524   05 00514   3A55F4   A                        IFI         FLG,SRTØSETF,T  IS SØRTER IN SFTS MØDE
      05 00517   07       A
      05 00518   D22105   N
525   05 0051B   CD5005   N                            CALL        BINØCØNT        CALL SETS CØNTRØL
526   05 0051E   C33D05   N                        ØRIFI       FLG,ØRGØDEL,F   IS THIS LAST CØPY ØF ØRIG
      05 00521   3A40F4   A
      05 00524   07       A
      05 00525   DA3305   N
527   05 00528   3A6CFA   N                            ANDIFI      XBYT,DLVØ50,LT,50  IS THIS SHEET 50
      05 0052B   FE32     A
      05 0052D   D23305   N
528   05 00530   C33D05   N                            ELSEI
529   05 00533   AF       A                                CFLG        ØRGØDEL
      05 00534   3240F4   A
530   05 00537   326CFA   N                                STA         DLVØ50         RESET DLVØ50 TØ ZERØ
531   05 0053A   CDA705   N                                CALL        STKØCØNT
532                                                    ENDIF
533   05 0053D   CDCD05   N                            CALL        BINØCØNV
534                                                ENDIF
535   05 00540   C34605   N            ELSEI
536   05 00543   CDD506   N                CALL        JAMØSET                 SHEET LEFT ØN XPØRT
537                                    ENDIF
538   05 00546   C9       A            RET
```

TABLE XV

```
734   05 006CA   3AF6F4   A   SRTØJAMA IFI         TIMR,PAPØNØT,NZ         DID SHEET ARRIVE EARLY
      05 006CD   07       A
      05 006CE   D2D406   N
735   05 006D1   CDD506   N            CALL        JAMØSET                 YES-SET SØRTER JAM
736                                    ENDIF
737   05 006D4   C9       A            RET
738
739          ***********************************************************************
740          *                                                                     *
741          *                    SETS SØRTER JAM FLAGS                            *
742          *                                                                     *
743          *           CALLED BYI DLYØCHK                                        *
744          *                                                                     *
745          ***********************************************************************
746
747   05 006D5   3A0DF5   A   JAMØSET  IFI         TIMR,KEYØREL,NZ         IS KEY TURNED
      05 006D8   07       A
      05 006D9   D2E706   N
```

```
748   05 006DC   2E9C    A         ANDIF:    IBIT,SRT#JBYP,T              YES-IS JAM BYPASS PULLED
      05 006DE   CD0000  N
      05 006E1   D2E706  N
749   05 006E4   C34907  N         ELSE:
750   05 006E7   3E80    A             SFLG      SRT@JAM
      05 006E9   3250F4  A
751   05 006EC   3A61F4  A             IF:       FLG,TW0@ACT,T            ARE BOTH MODULES BEING USED
      05 C06EF   07      A
      05 006F0   D207C7  N
752   05 006F3   2130FD  A                 SFBIT,P   SRT@LJAM!SRT@UJAM    SET UPPER AND LOWER JAMS
      05 006F6   3E03    A
      05 005F8   B6      A
      05 006F9   77      A
753   05 006FA   CD0000  N                 S@BIT,S   SRT$UJAM             TURN ON UPPER JAM LAMP
      05 006FD   F510    A
754   05 006FF   CD0000  N                 S@BIT,S   SRT$LJAM             TURN ON LOWER JAM LAMP
      05 00702   E410    A
755   05 00704   C32907  N             ORIF:     FLG,LOW@MOD,T            IS LOWER MODULE BEING USED
      05 00707   3A37F4  A
      05 0070A   07      A
      05 0070B   D21D07  N
756   05 007CE   2130FD  A                 SFBIT,P   SRT@LJAM             SET LOWER SORTER JAM
      05 00711   3E01    A
      05 00713   B6      A
      05 00714   77      A
757   05 00715   CD0000  N                 S@BIT,S   SRT$LJAM             TURN ON LOWER JAM LAMP
      05 00718   E410    A
758   05 0071A   C32907  N             ELSE:
759   05 0071D   2130FD  A                 SFBIT,P   SRT@UJAM             SET UPPER SORTER JAM
      05 00720   3E02    A
      05 00722   B6      A
      05 00723   77      A
760   05 00724   CD0000  N                 S@BIT,S   SRT$UJAM             TURN ON UPPER JAM LAMP
      05 00727   E510    A
761                                     ENDIF
762   05 00729   3A54F4  A             IF:       FLG,SRT@SEL,T            IS SORTER SELECTED
      05 0072C   07      A
      05 C072D   D24907  N
763   05 00730   3E80    A                 SFLG      CYCL@DN:             YES-SET CYCLE DOWN
      05 00732   32AAF4  A
764   05 00735   CD0000  N                 STIMR     DEFL@DLY,380,MOT@OFF RUN PAPER OUT OF INTERFACE
      05 00738   17      A
      05 00739   26      A
      05 0073A   BB01    N
765   05 0073C   AF      A                 CFLG      SRT@RDY
      05 0073D   328CF7  A
766   05 00740   2120FC  A                 SFBIT     TS@SRTCP             BLINK SRT$CPTH
      05 00743   3E20    A
      05 00745   F3      A
      05 00746   B6      A
      05 00747   77      A
      05 00748   FB      A
767                                     ENDIF
768                                 ENDIF
769   05 00749   C9      A         RET
```

Figure 40A:
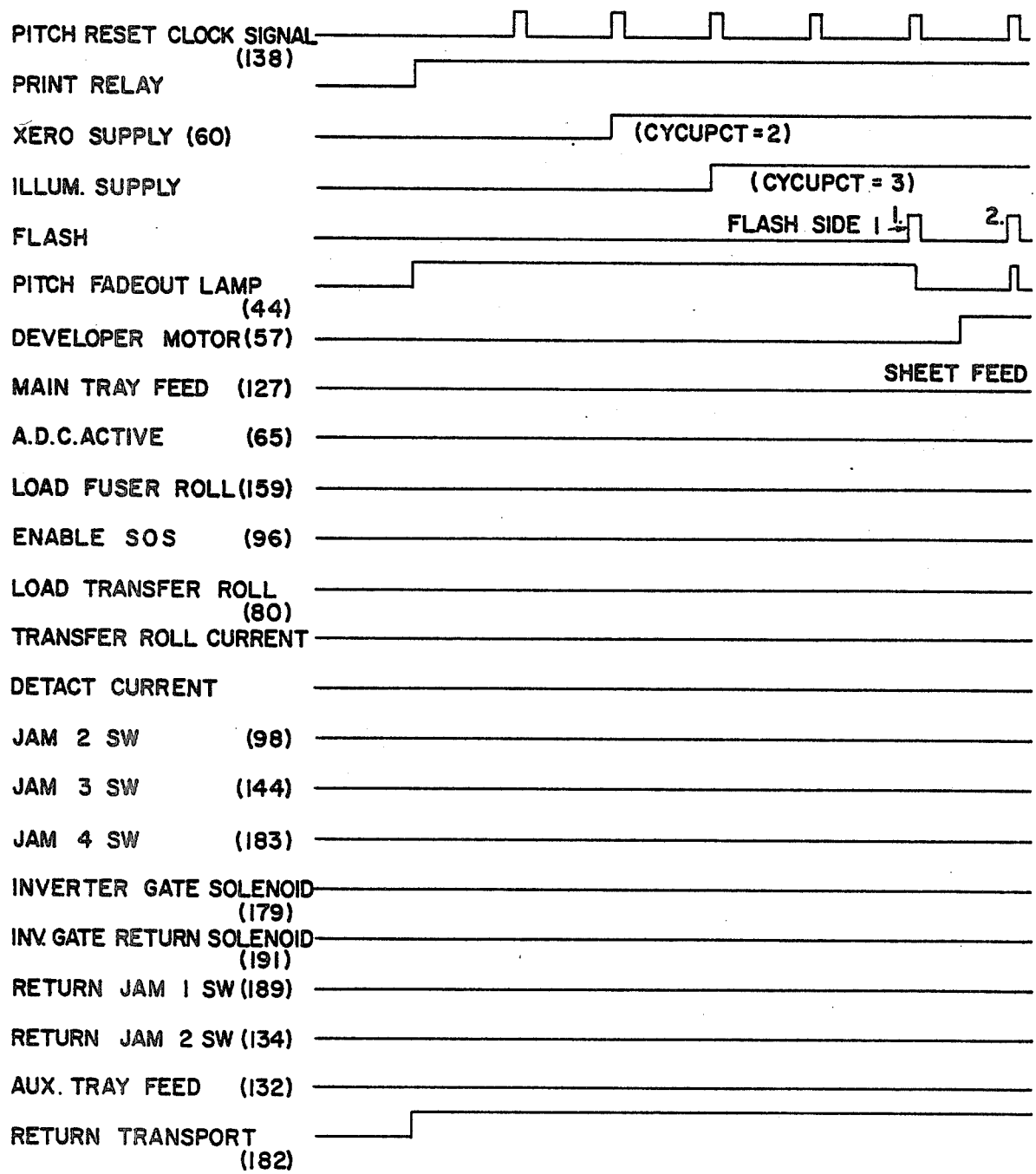
FIGS. 40a, 40b, 40c comprise a timing chart of the principal operating components of the host machine in an exemplary copy run.
Figure 40B:
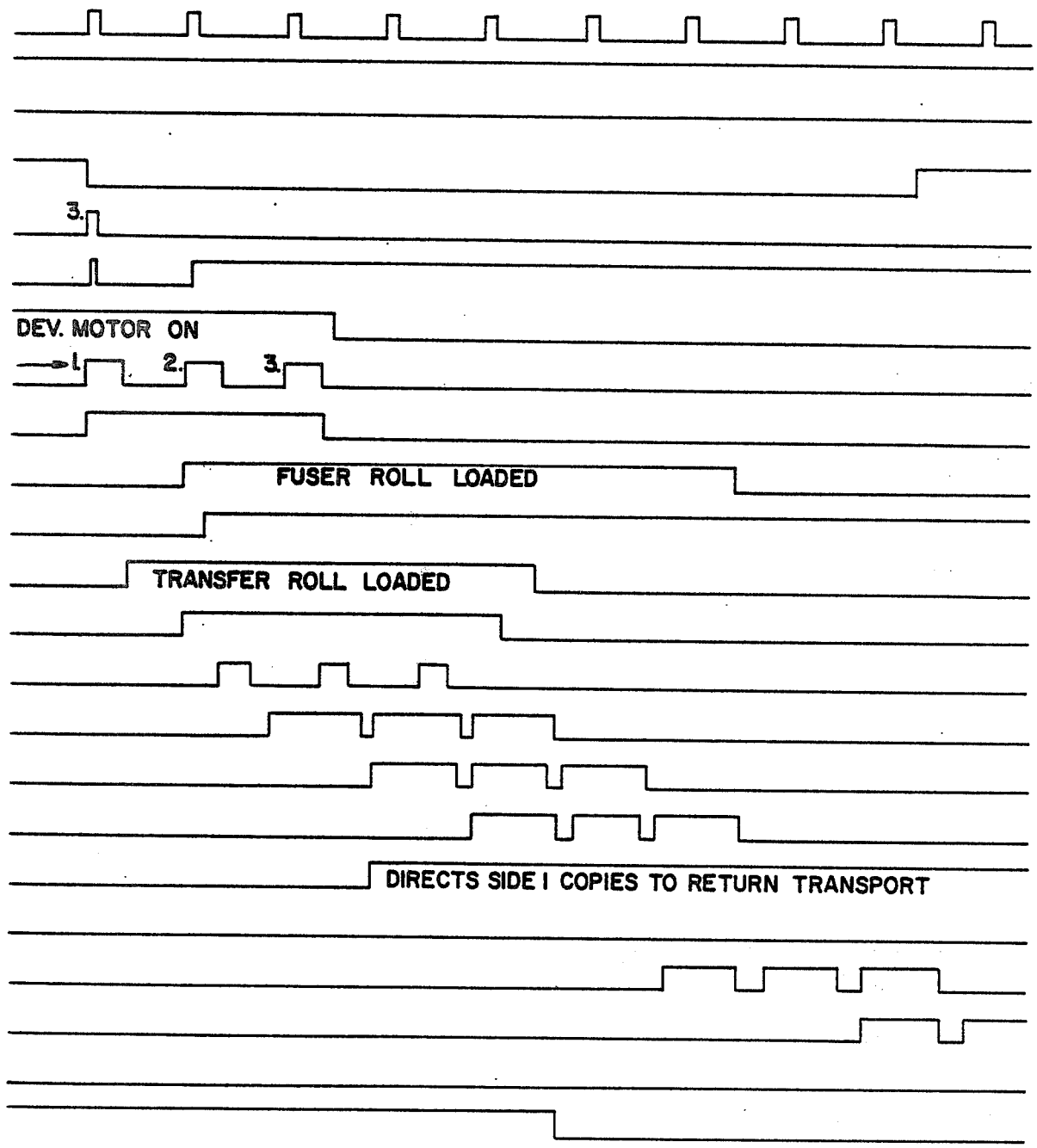
Figure 40C:
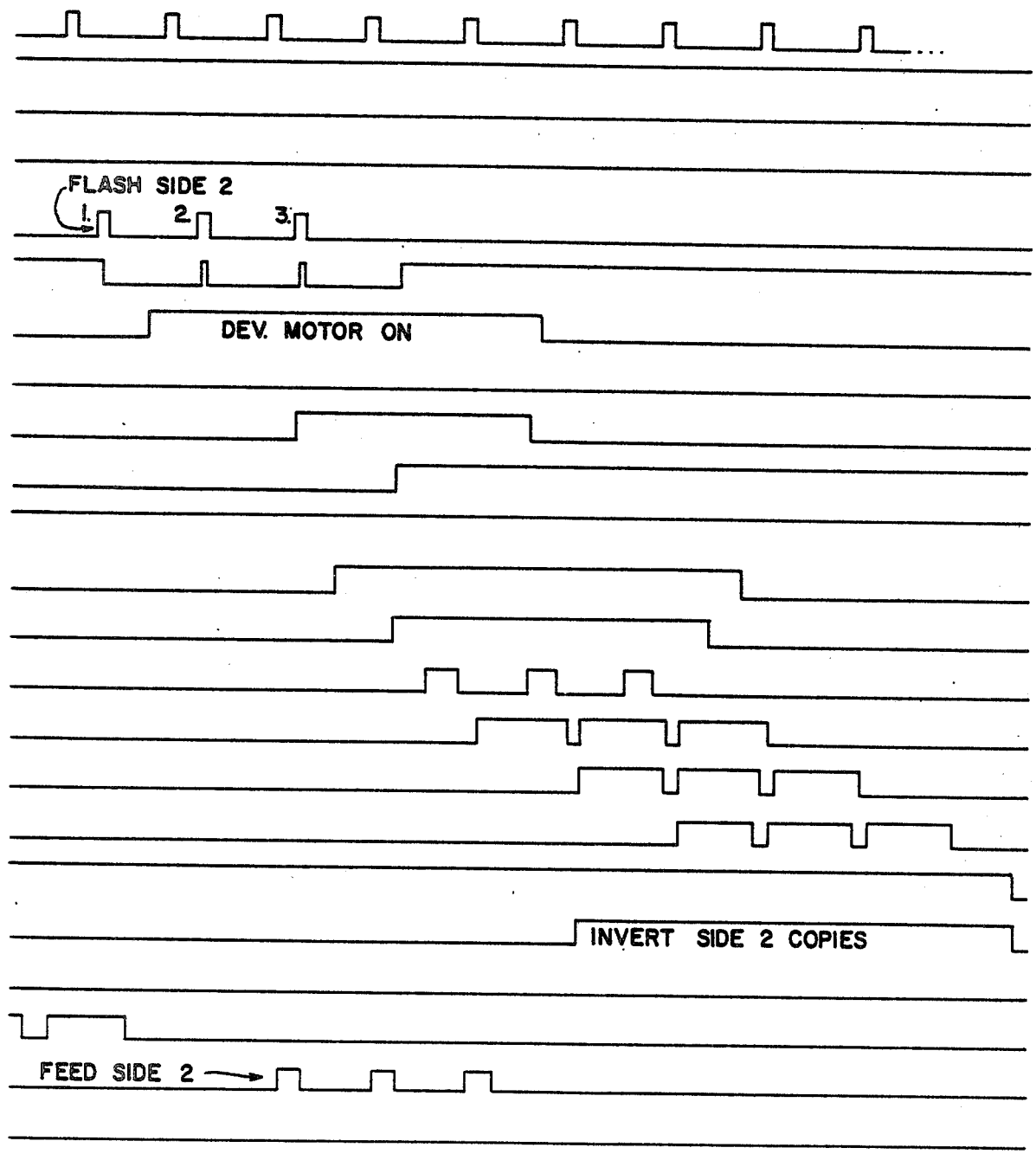

Referring particularly to the timing chart shown in FIG. 40, an exemplary copy run wherein three copies of each of two simplex or one-sided originals in duplex mode is made. Referring to FIG. 32, the appropriate button of copy selector 808 is set for the number of copies desired, i.e. 3 and document handler button 822, sorter select button 825 and two sided (duplex) button 811 depressed. The originals, in this case, two simplex or one-sided originals are loaded into tray 233 of document handler 16 (FIG. 14) and the Print button 805 depressed. On depression of button 805, the host machine 10 enters the PRINT state and the Run Event Table for the exemplary copy run programmed is built by controller 18 and stored in RAM section 546. As described, the Run Event Table together with Background routines serve, via the multiple interrupt system and output refresh (through D.M.A.) to operate the various components of host machine 10 in integrated timed relationship to produce the copies programmed.

Figure 41A:
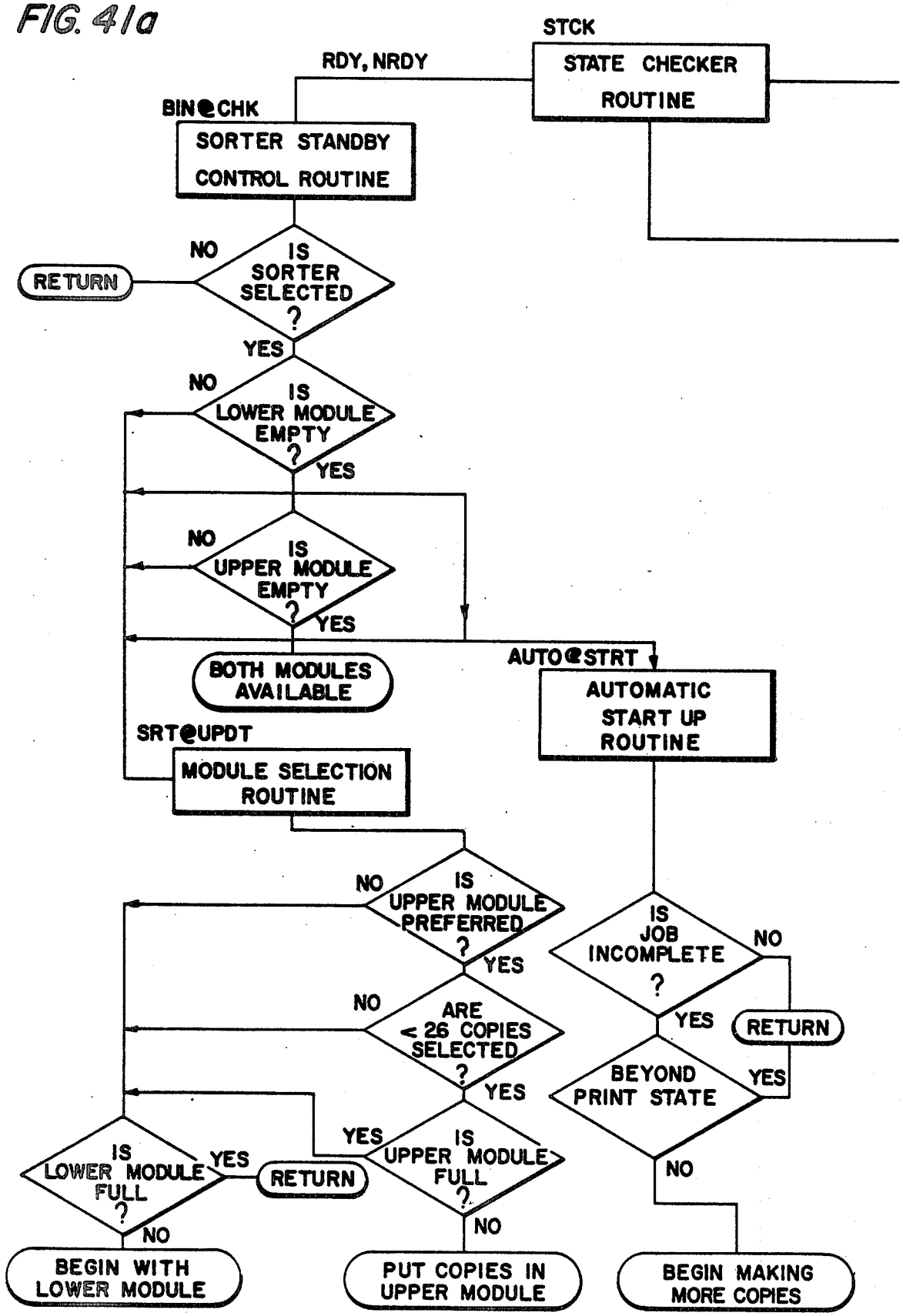
FIGS. 41a and 41b comprise a flow chart which illustrates the operation of various routines for controlling the sorter.
Figure 41B:
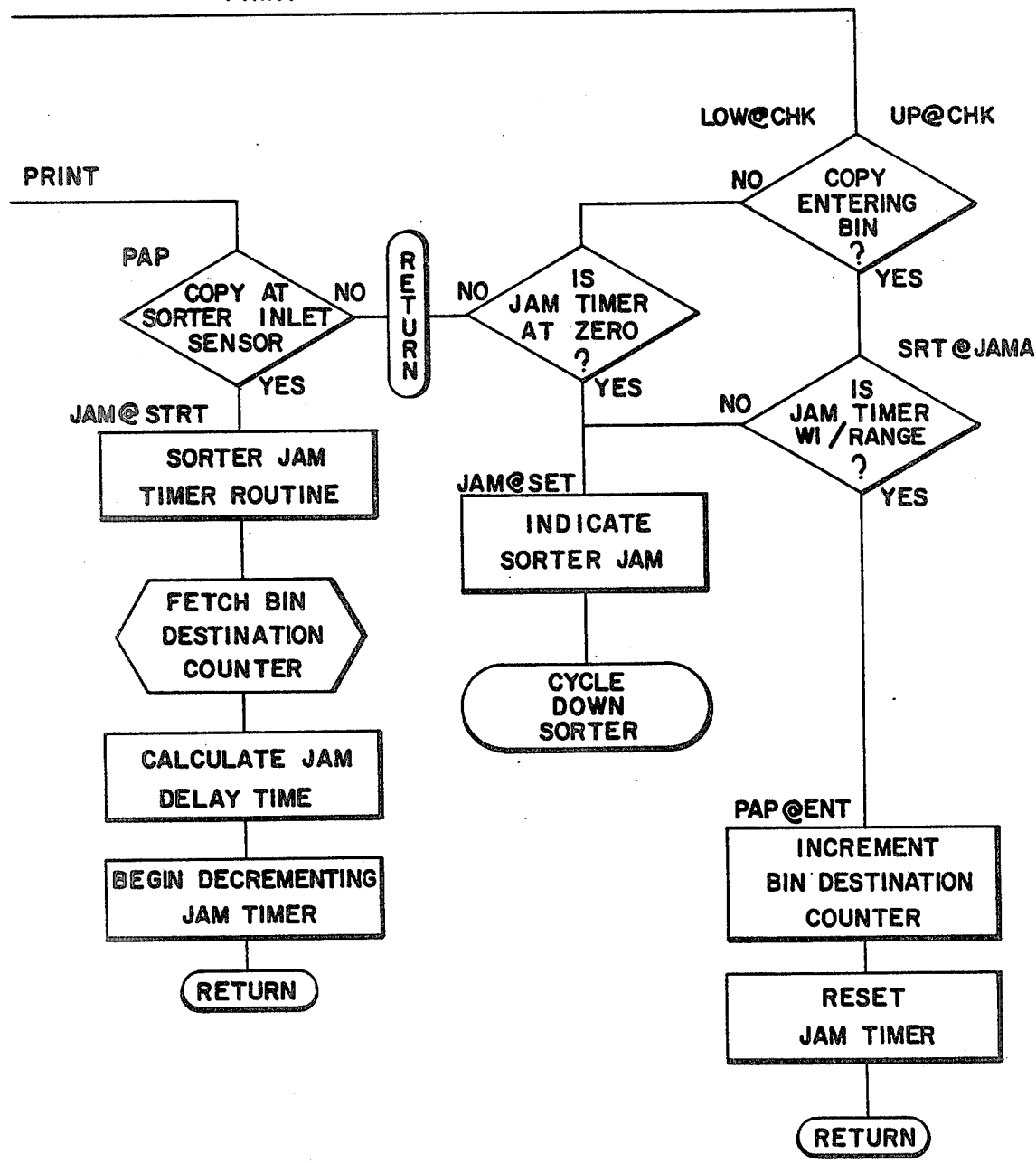

During the run, the first original is advanced onto platen 35 by document handler 16 where, as seen in FIG. 41, three exposures (1ST FLASH SIDE 1) are made producing three latent electrostatic images on belt 20 in succession. As described earlier, the images are developed at developing station 28 and transferred to individual copy sheets fed forward (1ST FEED SIDE 1) from main paper tray 100. The sheets bearing the images are carried from the transfer roll/belt nip by vacuum transport 155 to fuser 150 where the images are fixed. Following fusing, the copy sheets are routed by deflector 184 (referred to as an inverter gate in the tables) to return transport 182 and carried to auxiliary tray 102. The image bearing sheets entering tray 102 are aligned by edge pattern 187 in preparation for refeeding thereof.

Following delivery of the last copy sheet to auxiliary tray 102, the document handler 16 is activated to remove the first original from platen 35 and bring the second original into registered position on platen 35. The second original is exposed three times (FLASH SIDE 2), the resulting images being developed on belt 20 at developing station 28 and transferred to the opposite or second side of the previously processed copy sheets which are now advanced (FEED SIDE 2) in timed relationship from auxiliary tray 102. Following transfer, the side two images are fused by fuser 150 and routed, by gate 184 toward stop 190, the latter being raised for this purpose. Abutment of the leading edge of the copy sheet with stop 190 causes the sheet trailing edge to be guided into discharge chute 186, effectively inverting the sheet, now bearing images on both sides. The inverted sheet is fed onto transport 181 and into an output receptacle such as sorter 14 where, in this example, the sheets are placed in successive ones of the left most three bins 212 of either the upper of lower arrays 210, 211 respectively depending on the disposition of deflector 220.

SORTER CONTROL SYSTEM

When the sorter 14 is utilized, copies 3' leave processor 12 and enter sorter 14 as can be seen in FIG. 1. As best illustrated in FIG. 13, the copies 3' are successively placed in the individual bins 212 of either upper or lower modules 210, 211, respectively by the activation of bin deflectors 216. In normal operation, the first copy is placed in the left-most bin, with each succeeding copy being placed in adjacent bins moving rightwardly. A feature of the present invention provides a control system for insuring that copies 3' are placed in the correct bin 212 to maintain proper collation. One source of error is for the deflector 216 to fail to return to its inoperative state after placing a copy into its associated bin. For example, if the deflector 216 associated with bin 212B fails to return to its inoperative state, all of the subsequent copies would be erroneously placed in that bin. Other features of this invention are also described in the following discussion.

FIG. 41 shows a flow chart of the various control programs for sorter 14. it will be remembered that the machine is normally under the control of the background or state checker routine (STCK reproduced in Table I). In the Ready or Not Ready STATE, this routine periodically calls a Sorter Standby Control routine (BIN@CHK reproduced in Table XI). If either of the sorter buttons 825, 826 are selected, this routine instructs controller 18 to check the sorter sensors to determine if the upper 210 and lower 211 modules are empty as detected by sensors 227 and 228, respectively. Accordingly, this routine sets flags which indicate if one or both of the modules are available.

A feature of this invention permits the operator to select, in some instances, which module it is desired for the copies to be placed. Normally, the copies are first placed in the lower module 211 and then proceed to the upper module 210 if the capacity of the lower module is exceeded, i.e. if more than 25 copies per original are desired. Briefly, this is accomplished by activating module deflector 221 immediately after the 25th copy is detected by sensor 226 entering the right-most bin, thereby routing the next copy to the upper module 210. Since the length of upper conveyor 219 is such that several copies may be simultaneously in transit, there would be insufficient time to deactivate module deflector 220 in such manner to reverse module progression, i.e. by first placing the copies in upper module 210 and then placing the excess in lower module 211. However, if the number of copies desired does not exceed the capacity of upper module 210, there is no such problem. Consequently, the Module Selection routine (SRT@UPDT also reproduced in Table XI), which is called by the Sorter Standby Control routine, instructs controller 18 to check specified memory locations to see if the operator prefers to have the copies placed in upper module 210. Such a preference can be indicated by activating an appropriate button on console 800, such as bushbutton 821. Other methods of making such a selection can also be utilized. If this button is pushed, the controller 18 is instructed to check the number of copies selected by the operator via keyboard 800. This number has been previously stored in a counter by means well known in the art. If less than 26 copies have been selected, and the upper module 210 is not full, the module deflector 220 is activated by solenoid 221 so that the copies are placed in the upper module 210. Otherwise deflector 220 remains deactivated thereby placing the copies in the lower module, provided that it is not full.

It is another feature of this invention that the control system provides a means for automatically starting the machine after at least one of the modules 210, 211 have been emptied and there are more copies remaining to be made. For example, assume that 100 copies of a ten page book are desired to be made, with the number 100 being entered into keyboard 800 and that the document handler 16 has been selected. The document handler 16 will successfully place the set of originals 2 on platen 35 (see FIG. 14) and processor 12 will first make 50 copies of each original. The copies 3' will be placed first in the lower module 211 and then in the upper module 211. The set of originals are then returned to input tray 233 where they await to be recycled to make the remaining 50 copies, since further copies would exceed the capacity of sorter 14. Various means can be utilized to stop the machine processor from making further copies and forms no part of this invention. For example, a copy sheet counter (not shown) can be provided which detects the number of copies produced and which provides an appropriate signal for stopping the processor from making too many copies exceeding the capacity of the sorter. When lower module 210 is unloaded by the operator, sensor 228 will set a flag indicating that the lower module 211 is empty (see LOW@CHEK routine of Table XI). Similarly, when the upper module 210 has been unloaded, the UP@CHEK routine (reproduced in Table XI) interrogates sensor 227 and will set a flag which indicates that the upper module is empty. Both of the above routines call an Automatic Startup routine (AUTO@STRT reproduced in Table XI) which checks to see if the job is incomplete. For example, the number of copies selected can be compared with the actual number of copies delivered (e.g. as sensed by sensor 223) and if the number of copies is less than that selected, controller 18 realizes that the job is incomplete. Through the control system of the present invention, controller 18 is further instructed to determine whether the state checker routine (STCK) is beyond the PRINT state i.e. in state numbers 4 or 5, such states further indicating that there are no longer any further copies to be made. If such conditions are met, an appropriate signal is sent to the controller 18 which automatically restarts the machine to finish making the remainder of the copies desired as soon as one of the modules 210, 211 are empty.

A further feature of this invention insures that the copies 3' are placed in the correct bin thereby maintaining proper collation. Referring now especially to FIGS. 41 and 13, when a trailing edge of a copy sheet 3' is detected by sorter inlet sensor 223, a paper path control routine (PAP reproduced in Table XII) calls a Sorter Jam Timer routine (JAM@STRT reproduced in Table XIII). For purposes of illustration, assume that copies 3' are to be placed in upper module 210. As noted before, the first copy sheet 3' is always placed in the left-most bin, here designated as bin 212A. This routine utilizes a software counter, referred to as a bin destination counter to calculate the jam delay time. The jam delay time is the time it takes for a copy sheet 3' to travel between sorter inlet sensor 223 and the correct bin for maintaining proper collation. The bin destination counter, JAM@CNT, is a software counter, in this embodiment, which is a memory location or register in controller 18 which is incremented by appropriate signals as is well known in the art. Accordingly, the contents of the bin destination counter is automatically set for bin number one (212A) and then is incremented for each succeeding copy. The Sorter Jam Timer routine fetches the contents of the bin destination counter and calculates from the contents thereof the jam delay time, taking into account the extra time of travel due to conveyor 219 in the upper module 210. Again for purposes of illustration, assume that the predetermined proper time of travel to bin 212A is 10 milliseconds. This routine loads that time into a jam timer. The jam timer, in this embodiment, is also a software controlled register whose contents are charged by appropriate timing signals as known in the art. In this embodiment, the jam timer is loaded with the calculated jam delay time and then is decremented, for example, by the real time clock signal 670. Hence, every time a copy is detected by sorter inlet sensor 233, the jam delay time to the proper bin is calculated, the jam timer is loaded with that time and caused to begin running.

The trailing edge of the copy sheet 3' is detected by sensor 225 when it enters a bin 212. It should be noted, however, that sensor 225 will sense a copy sheet entering any of the bins 212 due to its simplistic and inexpensive arrangement. For example, although the particular copy sheet 3' in question is destined for bin 212A, sensor 225 would nonetheless sense the copy entering any of the bins 212, such as 212B, due to improper deactivation of deflector 216 with that associated bin. Instead of providing a sensor for each of the bins 212, the present invention utilizes only one sensor 225 for the entire series of bins in the upper module 210. However, when a copy sheet 3 is detected by sensor 225 a routine (UP@CHK reproduced in Table XIV) calls another routine, SRT@JAMA (reproduced in Table XV) which reads the current time on the jam timer. If the time remaining on the timer is within a predetermined range, controller 18 realizes that copy sheet 3 has been placed in the correct bin, here bin 212A. The range of times which indicate correct placement of copy sheet 3' can, of course, be varied as desired to provide mechanical tolerance. For purposes of illustration, if the time remaining on the jam timer is 1-2 milliseconds, the copy sheet 3' has been placed in the correct bin. If so, another routine (PAP@ENT reproduced in Table XIV) is called which increments the bin destination counter and resets the jam timer for the next copy sheet.

On the other hand, if the jam timer was not within range, the copy sheet 3' has not been placed in the correct bin. For example, if the copy sheet 3' was erroneously placed in bin 212B, the time remaining on the jam timer may be, for example, five milliseconds. Similarly, there may have been a jam along transport 214 so that copy sheet 3' has not been placed in any of the bins 212. If so, the jam timer will have timed out, i.e. been decremented to zero. If either of the jam conditions set out above are present, a fault is indicated by lighting an appropriate console lamp 830 and by cycling down the sorter 14 to a halt via routine JAM@SET reproduced in Table XV.

The various features of the present invention have been illustrated according to the patent statutes by describing a reproduction machine sorter, a programmable digital computer, and programs for instructing the computer to carry out the claimed functions. However, it should be understood that the spirit of this invention can also be performed by hardwired circuitry if it is desired to do so, for example, by integrated circuit devices which contain the same basic elements which are only temporarily utilized by the computer when instructed by the software programs. Therefore, the scope of this invention is intended to be determined by the following claims and not by the particular embodiment described herein.

What is claimed is:

1. In a sorter for receiving copies from a reproduction machine processor, the sorter including a plurality of spaced bins, the improvement comprising:
   means for selecting one of the bins;
   sorter inlet sensor means for detecting a copy sheet entering the sorter;
   a timer, said sorter inlet sensor means initiating actuation of the timer upon detection of a copy sheet entering the sorter;
   means for calculating the proper time for the copy to travel from the sorter inlet sensor means to the selected bin;
   bin entry sensor means for detecting a copy sheet entering the selected bin;
   means for loading the timer with the calculated time, said sorter inlet sensor means causing the timer to activate;
   means for reading the timer when a copy sheet has entered a bin as detected by said bin entry sensor means; and
   means for declaring a fault if the reading from said timer is not within a predetermined range.

2. The improvement of claim 1 which further comprises:
   means for declaring a fault if the timer decrements to zero before the copy enters the selected bin as detected by the bin entry sensor means.

3. The improvement of claim 2 wherein said sorter includes at least one module with a plurality of bins disposed adjacent a copy sheet conveyor, said sorter including means for deflecting the copy sheets into selected bins, and wherein said bin entry sensor means detects entry of copy sheets into each of the bins.

4. A method of operating the sorter in a reproduction machine comprising the steps of:
   storing a bin destination number in a bin destination counter;
   determining the correct time of travel to the designated bin;
   storing a manifestation of the determined time of travel in a register;
   decrementing the register by a clock signal;
   sensing the trailing edge of a copy sheet by a sorter inlet sensor;
   sensing the trailing edge of a copy sheet by a bin sensor upon entering the designated bin;
   reading the contents of the register to determine a manifestation within a predetermined range.

5. A method of operating a reproduction machine having a memory and a sorter with a plurality of bins comprising the steps of:
   selecting a bin destination;
   determining the time of travel to the selected bin;
   storing a manifestation of the determined time of travel in the memory;
   sensing a copy sheet by a sorter inlet sensor;
   sensing said copy sheet by a bin sensor upon entering the selected bin;
   reading the contents of the memory to determine a manifestation within a predetermined range.

6. The method of claim 5 wherein if the manifestation in the memory is within the predetermined range, the steps of selecting a new bin destination and determining the time of travel to the next bin destination.

7. The method of claim 5 wherein if the manifestation in the memory is not within the predetermined range;
   the step of indicating a fault by activating a console lamp.

* * * * *